United States Patent [19]

Lenz et al.

[11] 4,258,231

[45] Mar. 24, 1981

[54] REMOTE LINE SWITCHING EXTENSION FOR TELEPHONE EXCHANGE

[75] Inventors: Vernon C. Lenz, Westminster; William H. Draeger, Corona; Ronald J. Surprenant, Anaheim, all of Calif.

[73] Assignee: Lear Siegler, Inc., Santa Monica, Calif.

[21] Appl. No.: 63,456

[22] Filed: Aug. 3, 1979

[51] Int. Cl.³ .................. H04Q 3/60; H04Q 11/04
[52] U.S. Cl. .................... 179/18 FC; 179/18 ES
[58] Field of Search .......... 179/18 FC, 18 EA, 18 G, 179/18 ES, 18 FF, 18 FG, 18 F, 18 FA

[56] References Cited

U.S. PATENT DOCUMENTS

| | | | |
|---|---|---|---|
| 4,007,339 | 2/1977 | Joel, Jr. | 179/18 FC |
| 4,038,498 | 7/1977 | Boxall | 179/18 FC |
| 4,074,072 | 2/1978 | Christensen et al. | 179/18 ES |
| 4,150,258 | 4/1979 | Fujimoto et al. | 179/18 FC |

*Primary Examiner*—Thomas A. Robinson
*Attorney, Agent, or Firm*—Christie, Parker & Hale

[57] ABSTRACT

There is described a remote switching terminal which functions as a concentrator switching stage for a central office switching system, such as a standard No. 5 crossbar switch. The remote station connects subscriber phones directly into the horizontal lines of the crossbar, which are fewer in number than the subscriber lines that normally tie into the vertical lines of the crossbar. Control of the remote station is by a microprocessor which communicates over a data link to a microprocessor at the central office. Cross connections are duplicated at the remote station so as not to interfere physically or electrically with the operation of the central office equipment.

10 Claims, 10 Drawing Figures

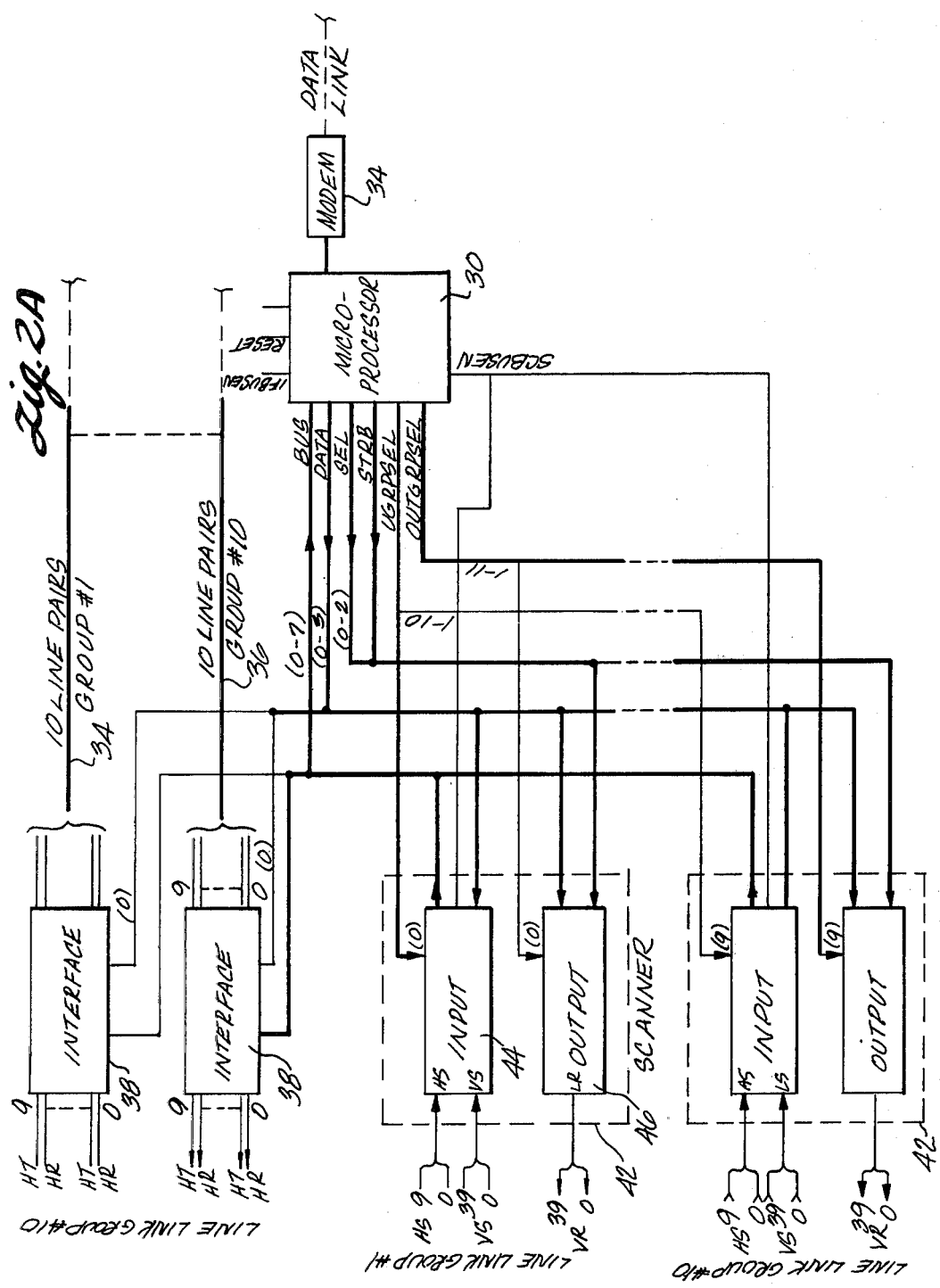

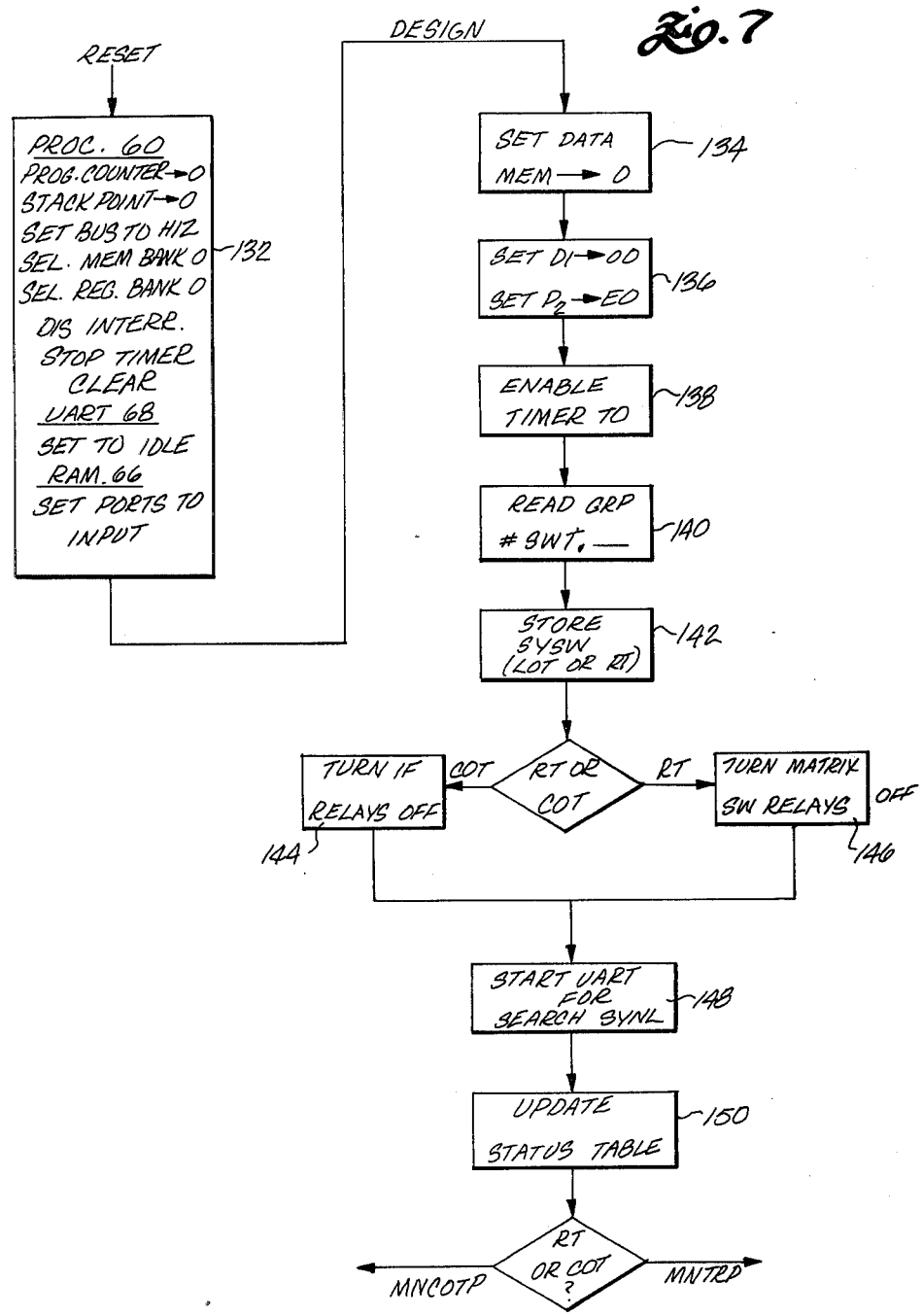

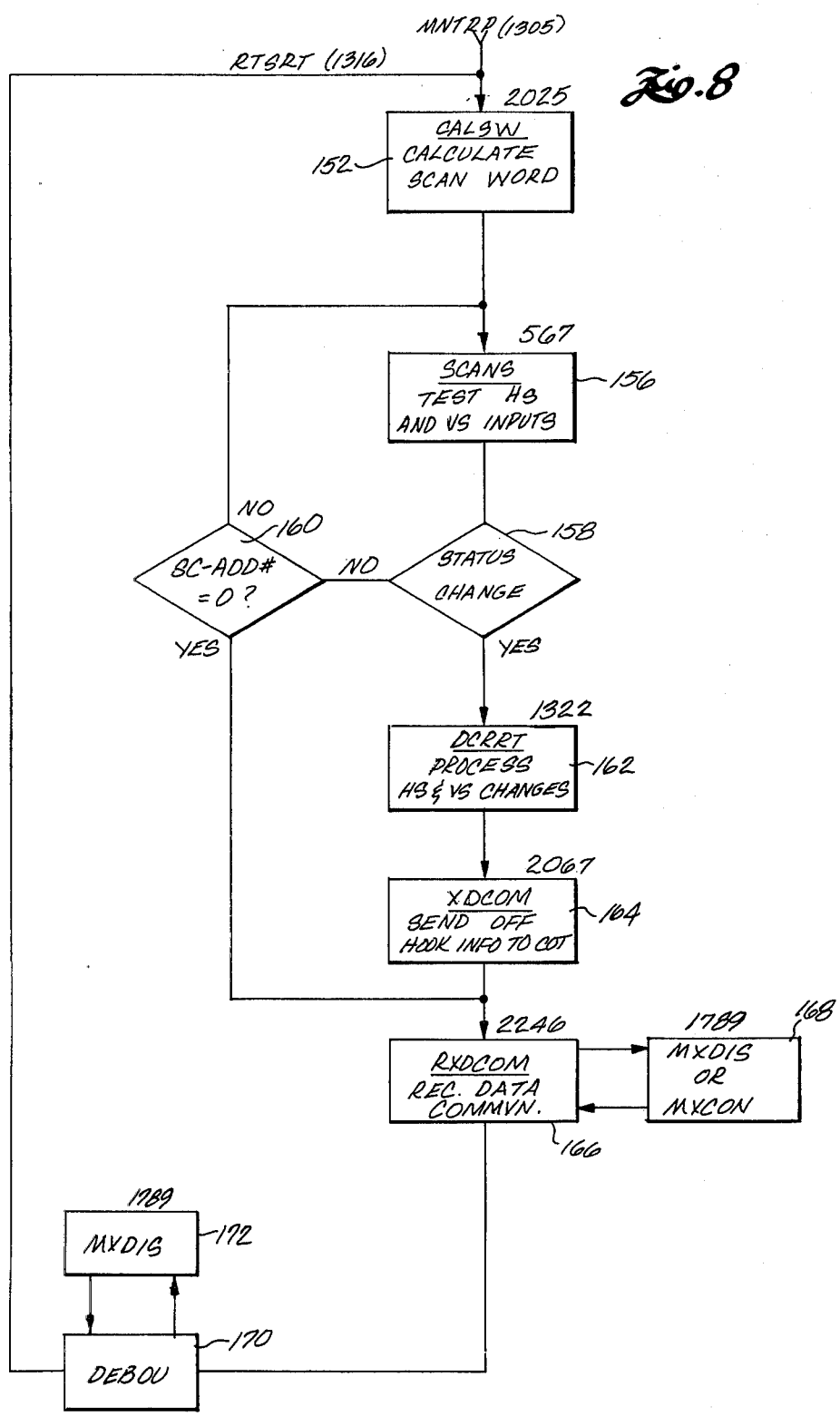

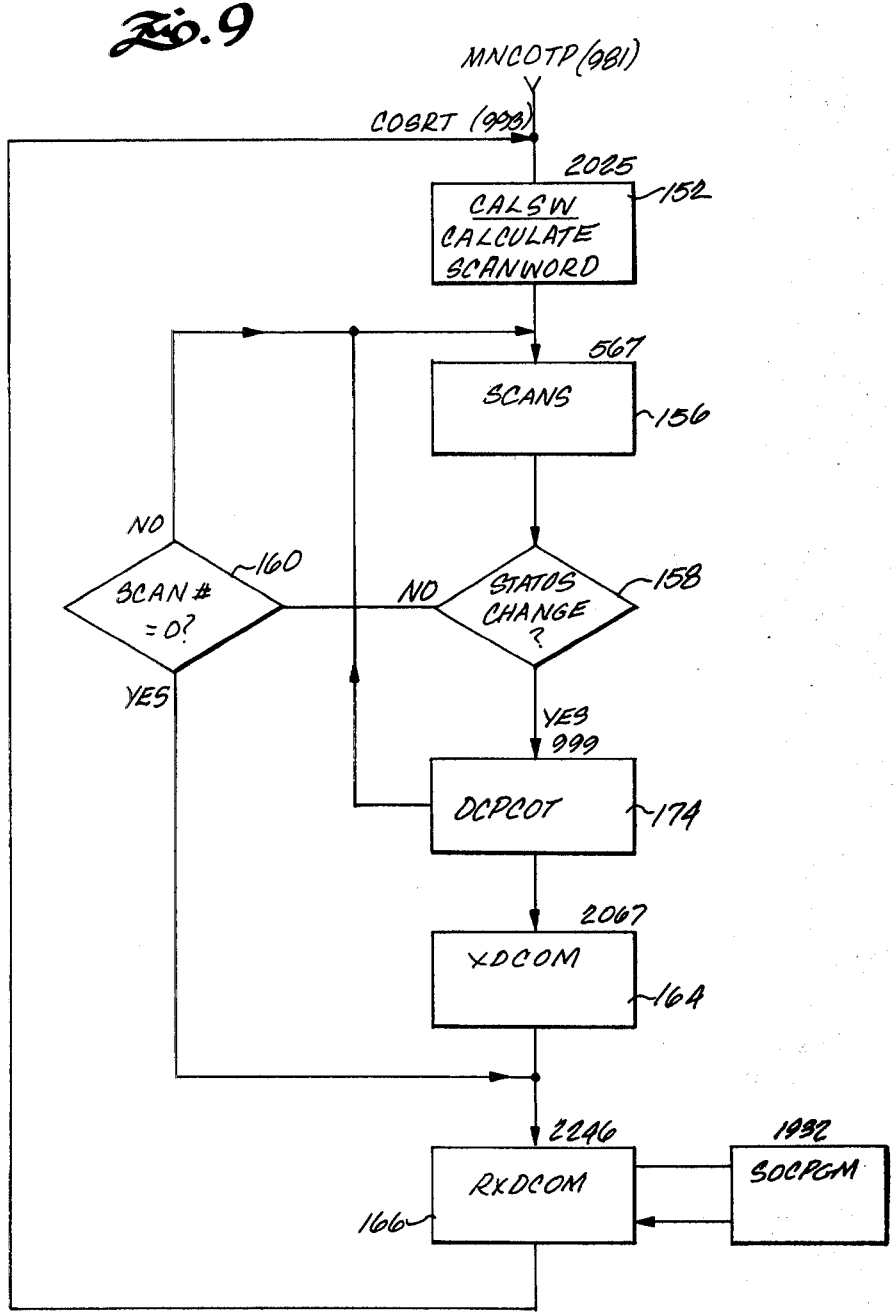

REMOTE LINE SWITCHING EXTENSION FOR TELEPHONE EXCHANGE

FIELD OF THE INVENTION

This invention relates to telephone exchange switching systems, and more particularly, is concerned with a remote switching station which operates directly into a central station.

BACKGROUND OF THE INVENTION

To reduce the number of line pairs between a central office and individual subscriber phones, various kinds of pair-gain systems have been developed. Remote concentrators have been used which connect a number of subcriber phones to a smaller number of line pairs going to the central office. The shared line pairs are then expanded back to the full complement of subscriber line pairs at the central office. These concentrators may use some priority scheme for allocating the available channels between the remote station and the central office among the larger number of subscriber phones.

Because the standard central office No. 5 crossbar switching system already includes a concentrating portion, conventional remote switching systems which provide concentration and expansion are inherently redundant. Prior attempts have been made to take advantage of the concentrating aspect of the central office switching system by physically displacing the concentrating portion of the central office to a remote location. Such a system is described, for example, in U.S. Pat. No. 4,038,498. This patent shows an arrangement which takes advantage of the concentrating effect in the link frames of a standard Western Electric No. 5 crossbar switching system of the type described in U.S. Pat. No. 2,585,904. The input stage of the standard line link frame crossbar switch selectively connects a group of up to 50 subscriber lines connected to the vertical lines of the crossbar switch to any one of a group of 10 horizontal lines of the crossbar switch, thus providing an inherent concentrator function. The output stage of the same line link frame crossbar switch connects the 10 horizontal lines to 10 vertical lines which in turn connect to a corresponding number of junctors extending to the trunk line frames of the No. 5 crossbar switching system. U.S. Pat. No. 4,038,498 provides an arrangement for physically separating the input stage with its concentration from the subscriber lines to the horizontal lines of the crossbar switch, to a remote station.

However, the basic design of the No. 5 crossbar switch makes it relatively uneconomical to detach the line link frame or any part of it for relocation to a remote site. The presence of other control circuits in the line link frame, such as portions of the marker circuit, greatly increases the complexity in cost of any interface system which is required to physically relocate any part of the line link frame to a remote location.

SUMMARY OF THE INVENTION

The present invention is directed to an improved system for providing remote line switching for use with conventional crossbar switching systems. However, the present invention does not require any portion of the line link frame of the crossbar switch to be physically moved or duplicated at the remote station. Rather the present invention provides a terminal which bridges the first stage of the line link frame at the central office, providing full control of the remote switching without interfering in any way with the operation of the crossbar switch at the central office. The line link switch is retained in the central office and uses the crosspoints in conventional manner to make and hold the connections. Call switcing status is derived from the marker at the central office, and this information is then coded and transmitted to the remote terminal for controlling actual switching.

In brief, the present invention provides apparatus for remote switching of a plurality of subscriber telephone lines at a remote location to a limited number of line pairs less than the number of subscriber lines extending to and connected through a central office switching system. The central office switching system includes a line link frame having a crossbar switch for connecting a group of vertical three-conductor lines (tip, ring, and sleeve conductors) to a smaller number of horizontal three-conductor lines at each of a matrix of cross points. The apparatus comprises a central office terminal including a first microprocessing unit, first scanner means controlled by the processing unit for scanning in sequence the voltage level status on the sleeve conductors of the horizontal and vertical crossbar lines and storing the status in the processing unit, means controlled by the processing unit for selectively "grounding" the ring conductor of any of the vertical crossbar lines to initiate a connection between the associated vertical crossbar line and one of the horizontal crossbar lines, and interface switching means controlled by the processing unit for selectively connecting any of said line pairs extending to the remote terminal to associated ones of the tip and ring conductors of the horizontal crossbar lines. The apparatus further includes a remote switching terminal including a second processing unit, second scanner means controlled by the second processing unit for scanning the remote subscriber lines to detect a change in status of the lines, matrix switching means controlled by the processing unit at the remote station for connecting a selected one of the subscriber telephone lines to one of the limited number of line pairs extending to the central office. The system further includes a data transfer link connecting the first and second processors for transferring status data on the subscriber lines from the second processing unit to the first processing unit, and for transferring status data on the sleeve conductors of the horizontal and vertical crossbar lines from the first processing unit to the second processing unit. It should be noted, however, vertical crossbar lines apply to subscribers and horizontal crossbar lines apply to trunks. Different crossbar switches and PABX's use the reverse designations, i.e., subscribers are on horizontal crossbar lines and trunks on vertical crossbar lines. Call initiation can also be obtained by placing a short across tip and ring of the subscriber crossbar line.

BRIEF DESCRIPTION OF THE DRAWINGS

For a better understanding of the invention reference should be made to the accompanying drawings, wherein:

FIG. 2A is a schematic block diagram of the central office terminal;

FIG. 7 is a flow diagram of the operation of the central processor during initialization;

FIG. 8 is a flow diagram of the operation of the central processing unit at the remote terminal; and FIG. 9 is a flow diagram of the operation of the CPU at the central office terminal.

DETAILED DESCRIPTION

The preferred embodiment of the present invention is described as an addition to the conventional crossbar switching system, which is an electromechanical switching system that has been widely adapted for central office exchanges throughout the world. This system is described in detail in U.S. Pat. No. 2,585,904, issued Feb. 19, 1952, in the name of A. J. Busch, which patent is hereby incorporated by reference.

Figure 1:
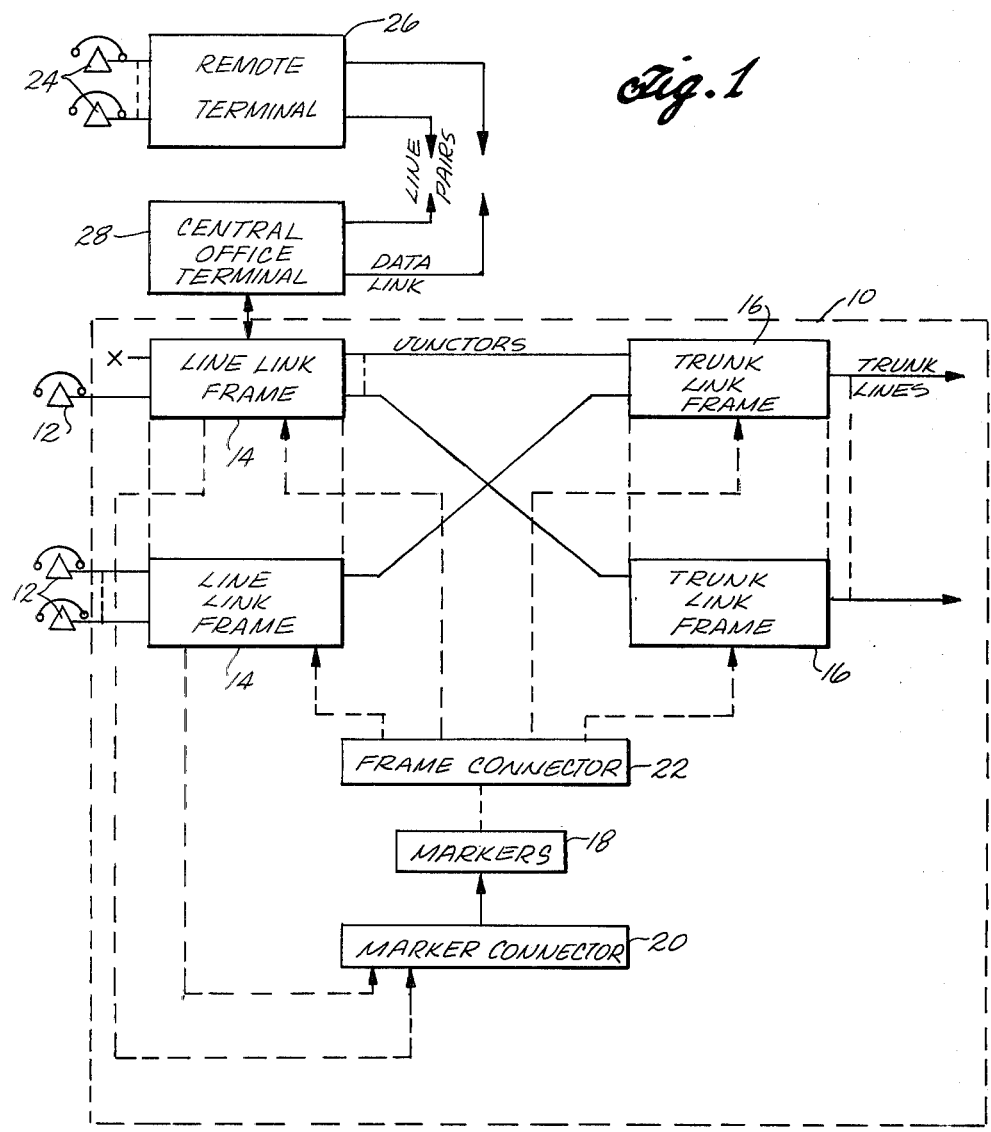
FIG. 1 is a schematic block diagram of the invention as applied to a No. 5 crossbar switching system.

The crossbar switching system, a portion of which is shown schematically at 10 in FIG. 1, operates to connect a plurality of local subscriber phones to trunk lines which in turn communicate with other central office exchanges, or to connect the local subscriber phones to other local subscriber phones by the crossbar switching system. A larger number of subscriber phones are each connected by a pair of conductors to one of a plurality of line link frames 14. Each line link frame includes a plurality of crossbar switches arranged in two stages, a line switch stage and a junctor switch stage. Each crossbar switch in a line link frame is in the form of a switching matrix in which the crosspoints between a plurality of vertical lines and a plurality of horizontal lines can be completed or disconnected by sets of relays. The crossbar switch in the line switch stage of a line link frame typically connects any one of 50 vertical lines to any one of 10 horizontal lines. Each vertical line is arranged to accommodate one line from a subscriber phone. Thus the line switching stage of the line link frame operates as a compactor, allowing connections to be completed between any 10 of 50 different subscriber lines at one time to 10 horizontal lines of the crossbar switch.

The junctor switch stage of the line link frame acts as a distributor for connecting any one of the 10 horizontal lines to any one of 10 junctors, the junctors extending to trunk link frames 16. The junctors in combination with the trunk link frames allow the subscriber phones connected to any one of the line link frames to be in turn connected to any of the trunk lines from any of the trunk line link frames. The path is established by markers 18 which are called to select and establish a path when required. After the marker establishes a path, it is released for establishing another path. A marker is connected, as needed, to a line link frame through a marker connector 20 and the marker controls the crosspoint switching in the line link frames and the trunk link frames through a frame connector 22.

The present invention is directed to an arrangement by which a number of remote subscriber phones 24 can be connected into the crossbar switching system 10 by less than one line pair per phone. A remote terminal 26 connected to the remote subscriber phones 24 communicates with a central office terminal 28 that connects directly into the horizontal lines of the crossbar switches in the line switching stage of the line link frames 14. This is accomplished without disturbing or modifying the physical or electrical configuration of the central office equipment. The central office terminal 28 ties in directly to existing readily accessible terminal points in the line link frames 14, in a manner hereinafter described in detail. Thus the present invention provides a method of reducing the number of costly conductor pairs normally required to connect a large group of remotely located subscriber phones to the central office. Typically the remote station provides from a 2:1 to a 4:1 compaction factor between the number of subscriber phones serviced at the remote station and the number of conductor pairs extending to the central office.

Figure 2B:
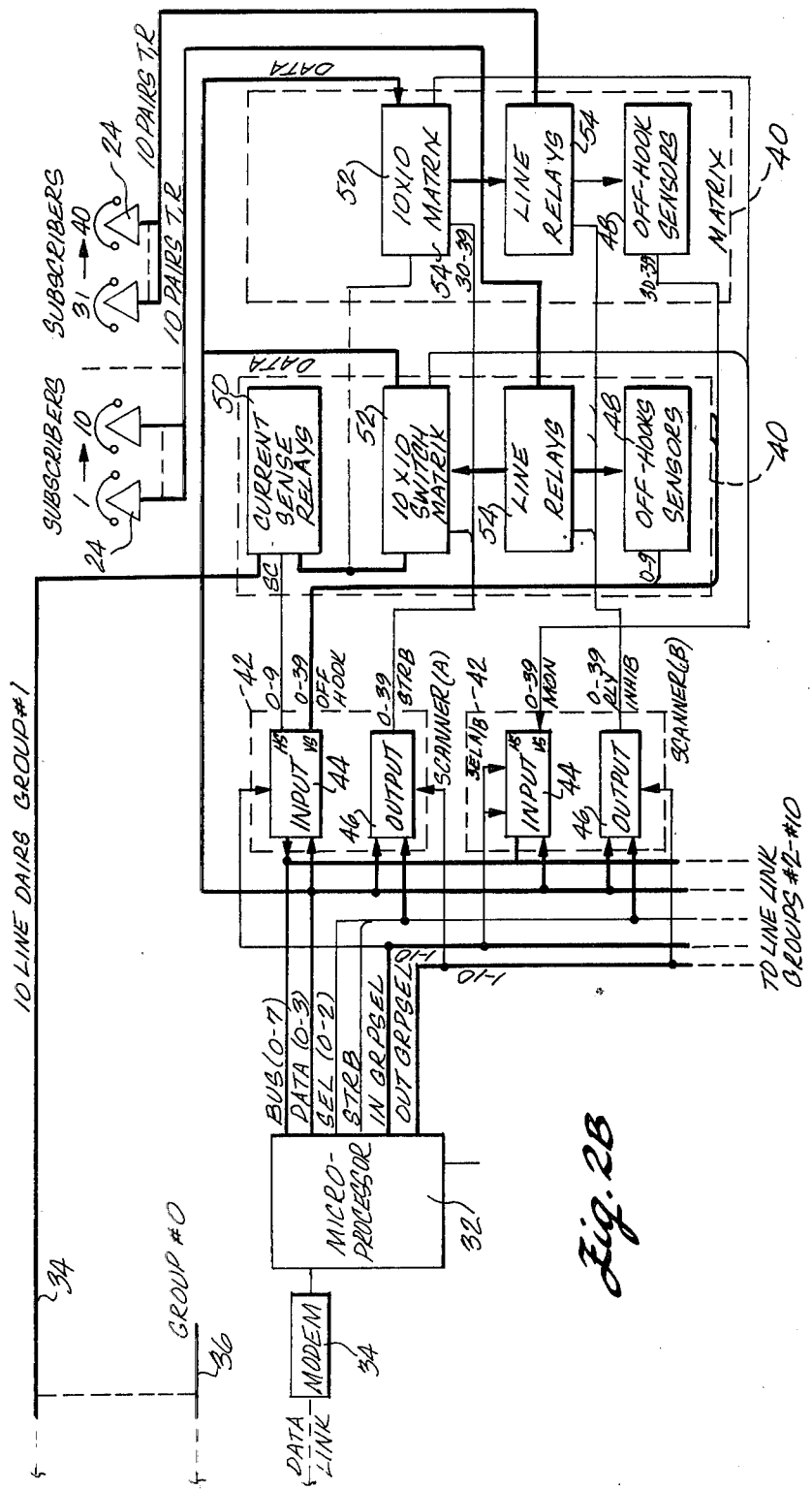
FIG. 2B is a schematic block diagram of the remote terminal.

The manner in which the remote terminal 26 and central office terminal 28 function can best be understood by reference to FIGS. 2A and 2B. Each terminal includes its own microprocessor, indicated at 30 for the central office terminal, and 32 for the remote terminal. The microprocessors communicate with each other over a data link, including a single conductor pair terminated at each end by conventional modems or line pairs 34 and 36. The single microprocessor at each terminal is shown proving control to one line link frame. However, the system can be expanded using a single microprocessor at each terminal for providing connections to as many of the line link frames 14 at the central office as may be required.

Each line link frame of the crossbar switching system is provided with up to 10 crossbar switches, each crossbar switch having 10 horizontal lines and up to 50 vertical lines. Each crossbar switch in the line link frame is referred to as a "group", and the groups are numbered 1-10. The remote terminal 26 and central office terminal 28 operate to complete connections between any one of up to 40 subscriber phones 24 and one switching group in the line link frame. Up to 10 line pairs or carrier channels are required between the remote terminal 26 and central office terminal 28 for completing the connections to one group of the line link frame. In FIGS. 2A and 2B, only the 10 line pairs or channels for group No. 1 and group No. 10 are shown, as indicated at 34 and 36.

The central office terminal 28, under the control of the microprocessor 30, operates to complete connections between the 10 horizontal lines of each crossbar group to the associated line pairs 34. This is accomplished through an interface circuit 38, shown in more detail and described below in connection with FIG. 3. It should be noted that each horizontal and vertical line of a crossbar switch in the crossbar switching system comprises three separate conductors, referred to as the tip (T), ring (R), and sleeve (S) conductors. Hereinafter the horizontal conductors of the crossbar switch will be referred to as HT, HR, and HS, respectively, and the vertical conductors will be similarly referred to as VT, VR, and VS, respectively. External connections to these conductors can be made at readily accessible terminal points on the line link frame.

At the remote terminal end, the ten line pairs or channels for each group are connected under control of the microprocessor 32 to associated ones of up to 40 subscriber phones 24 for each group of ten line pairs or channels. The connection between ten subscriber phones and a group of line pairs or channels is completed by a matrix circuit 40. Two, three, or four of such matrix circuits are provided depending upon whether the system is arranged to accommodate 20, 30, or 40 subscriber phones per group of ten line pairs or channels 34. It will be noted that in FIG. 2B only two matrix circuits are shown, respectively, for subscriber phones 1 through 10 and 31 through 40. It will be understood that to accommodate 40 subscriber phones, two additional matrix circuits 40 are required for subscribers 11 through 20, and 21 through 30, respectively.

To control the connections between the interface 38 and the line pairs for each group, and to control the matrix switch connections between the line pairs and the subscriber phones, the microprocessors 30 and 32 monitor various input conditions and control various output conditions through scanner circuits 42, which are substantially identical at both terminals and are hereinafter described in detail in connection with FIG. 4. Each scanner, in response to addresses from the associated microprocessor, scans up to 50 input terminals (10 HS terminals and 40 VS terminals) through an input section 44 and provides an output signal on any one of 40 output lines VR through an output section 46. The central office terminal requires one scanner circuit per group, with the input section 44 being connected to the ten HS conductors of a line link frame crossbar switch, and the forty VS conductors of the crossbar switch. The output section 46 of each scanner is connected to the forty VR conductors of the same crossbar switch. The remote terminal has two scanner circuits 42, designated scanner A and scanner B, for each group. The VS terminals of the input section 44 of scanner A are connected to sensors 48 in the matrix circuits 40, which sense the off-hook status of the 40 subscriber phones. The HS terminals of the input section 44 of scanner A are connected to current sense relays 50 which sense whether associated ones of the ten line pairs of the groups are idle or busy. Forty of the inputs to the input section 44 of the scanner B are used to monitor the operation of 10×10 matrix switches 52 in each of the matrix circuits 40. These matrix switches provide direct connections between selected ones of line pairs and selected ones of the subscriber phones.

The output section 46 of scanner A at the remote terminal provides up to 40 output signals for controlling the crosspoints of the matrix switches 52. The 40 outputs from the output section 46 in the B scanner are used to control line relays 54, which operate to switch the lines from the subscribers from the off-hook sensors 48 to the matrix switch 52. The line relays isolate the matrix switches 52 during a switching operation to protect the matrix switch contacts from local currents during make or break operation.

The operation of the two terminals in completing a connection between a subscriber line is as follows. When a remote subscriber phone 24 is taken off the hook, a signal is provided on a corresponding one of the 40 lines from the off-hook sensors. As the scanner A addresses each of the VS terminals in response to addresses received over the data bus from the microprocessor, the microprocessor senses when the condition of any of the 40 off-hook lines has changed since the previous scan. If it determines from the addressed VS terminal of the scanner A that the associated subscriber phone has been taken off the hook and is seeking a connection through the central office, it stores the status change and address of the particular phone and forwards this information to the microprocessor 30 at the central office terminal over the data link. The microprocessor 30 at the central office terminal then sends an address over its data bus for addressing the appropriate output line VR from the scanner at the central office terminal and establishes a "ground" on the corresponding vertical ring conductor in the line link frame crossbar switch. This activates the crossbar switching system in exactly the same manner as though one of the subscriber phones 12 had been taken off the hook, as fully described in U.S. Pat. No. 2,585,904.

The crossbar switching system then operates by means of the markers 18 to set up a path through the particular group of the line link frame 14 in the normal manner. A crosspoint connection is established between the "grounded" vertical line and an available one of the horizontal lines in the line switch stage of the appropriate group of the line link frame. The crosspoint connection results in the VS conductor and HS conductor of the two lines connected at the crosspoint to be tied to ground or other reference potential.

As the input section 44 of the scanner in the central office terminal, under control of the microprocessor 30, scans the HS and VS lines in sequence, the microprocessor 30 detects when the two input lines HS and VS from the line link frame have been grounded by the associated line link frame circuit. This status information is relayed to the microprocessor 32 at the remote station over the data link. At the same time the microprocessor 30 controls the interface circuit 38 of the same group to complete a direct connection between one of the line pairs 34 from the remote terminal and the HT and HR conductors of the selected horizontal line of the crossbar switch in the line link frame. Each line pair is connected by its own relay in the interface circuit 38 to an associated one of the horizontal lines of the crossbar switch in the line switch stage of the line link frame.

The microprocessor 32 at the remote terminal, in response to information received from the microprocessor 30 over the data link, first sets the particular crosspoint relay in the matrix switch 52 and then activates the corresponding line relay 54 to complete the connection between the pair of lines from the off-hook subscriber phone 24 and the line pair now connected to the horizontal line of the crossbar switch by the interface circuit 38. The connection to the appropriate trunk line is completed by the crossbar switch in the conventional manner.

When the subscriber hangs up, the process is repeated to initiate a disconnect by the crossbar switch at the central office and to disconnect the subscriber phone 24 at the remote station. Thus the present invention provides a remote switching station which ties in directly to the horizontal lines of the crossbar line switches in the crossbar switching system. While providing a remote switching capability, the central office terminal and remote office terminal operate in a manner which is opaque to the crossbar switching system. No mechanical or electrical modification to this central office switching system is required to provide the remote switching function.

FIGS. 3–6 show the circuit details of the interface 38, scanner 42, matrix circuit 40, and microprocessor 30 in more detail.

Figure 6:
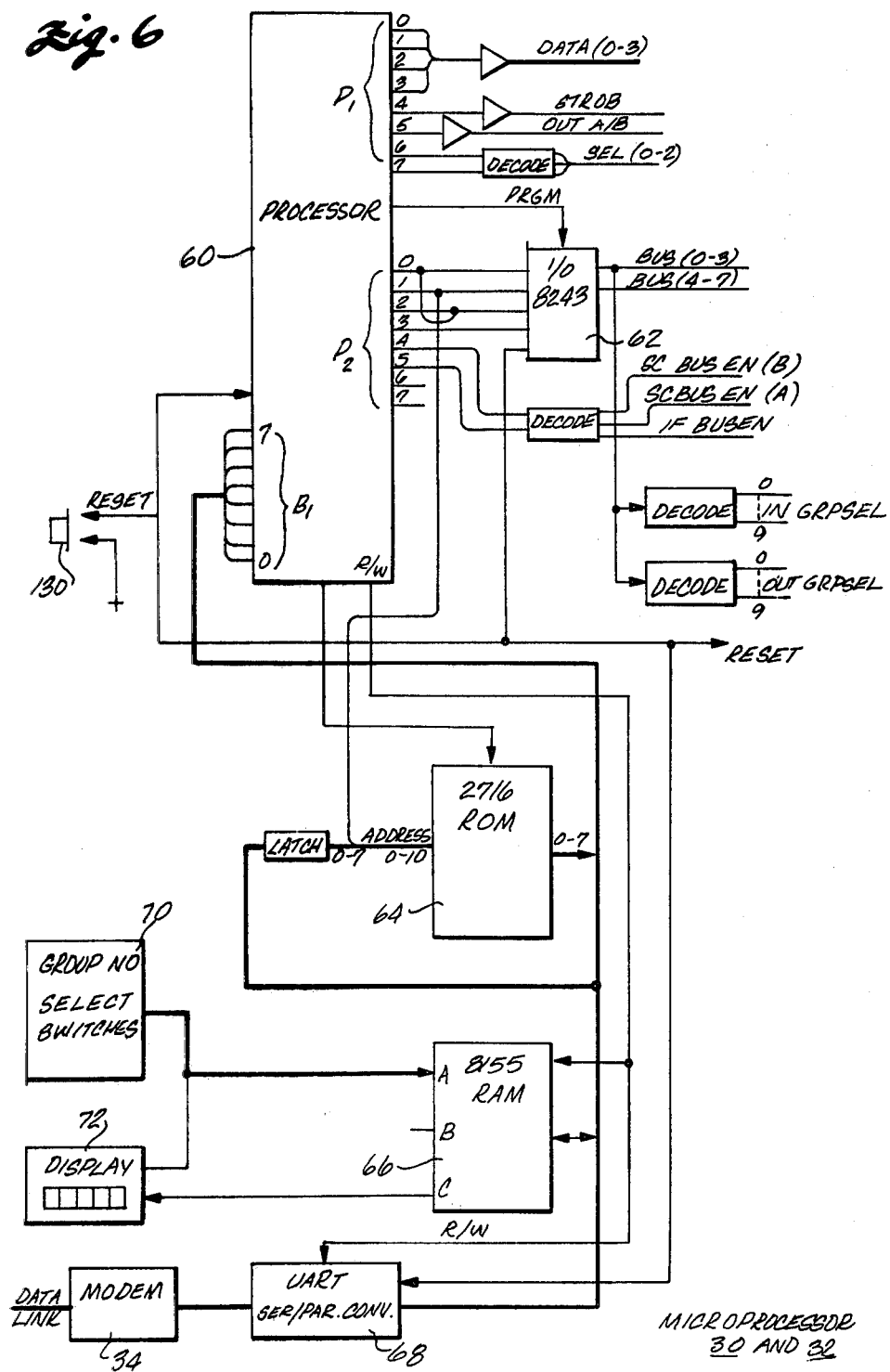
FIG. 6 is a schematic block diagram of the central processing unit.

Referring to FIG. 6, the microprocessor includes a central processing unit 60 which is described using an Intel 8748 processor chip but not limited to this processor. The processor includes a first port P1 of eight conductors. Lines P1(0) through P1(3) form an output data bus for transferring 4 bits coded as addresses and other information to the scanner circuits 42. Line P1(4) provides a scanner strobe signal to each of the scanner circuits. Output line P1(5) provides an output indicating whether the A scanner or B scanner at the remote terminal is being addressed. The pairs of bits on lines P1(6)

and P1(7) are decoded and activate one of three output lines designated SEL (0–2).

A second input/output port P2 of the computer chip has four lines 0–3 connected to an input/output circuit 62, preferably a type 8243 integrated circuit chip. In response to a control signal from the processor 60, the four lines are connected either to information bus lines 0–3 or 4–7 over which binary coded information is transmitted between the computer and the scanner circuits. Bus lines 0–3 are also applied to two output decoders for energizing one of ten output lines for selecting, respectively, the input circuit and the output circuit for one of the ten groups via the ten lines designated IN GRP SEL and OUT GRP SEL, respectively. Output lines P2 (4–5) are also applied to a decoder for energizing one of three output lines for enabling the bus connection to scanner A, to scanner B, or to the interface circuit. The three lines are designated SC BUS EN (A), SC BUS EN (B) and IF BUS EN, respectively.

Associated with the central processor unit 60 is a Read Only memory (ROM), such as a type 2716, a random access memory (RAM), such as type 8155, and a serial/parallel converter (UART), such as type 8251A, for providing serial communication between the computer and the associated modem 34. The ROM 64 is used to store the program and is addressed by the processor 60 to provide input data to the computer over the port B1 of the processor. The RAM 66 is used as external storage for information from the scanner circuits and to store information received or to send over the data link with the other processor. The RAM has several tables, including a status table and a link table. A plurality of switches, designated the group number select switches indicated at 70, are manually set to indicate which groups (minimum and maximum group numbers) are being used by the remote switching terminal. A display 72 is also controlled by the RAM 66 to provide a visual display of stored system status information. The RAM 66 communicates with the processor over the B1 input/output port, as does the serial/parallel converter circuit 68. A control signal R/W from the computer signals whether a Read or Write operation is being initiated. The microprocessor circuit configuration of FIG. 6 is a conventional processor design. Control of the microprocessor is by a program hereinafter described in more detail.

Figure 3:
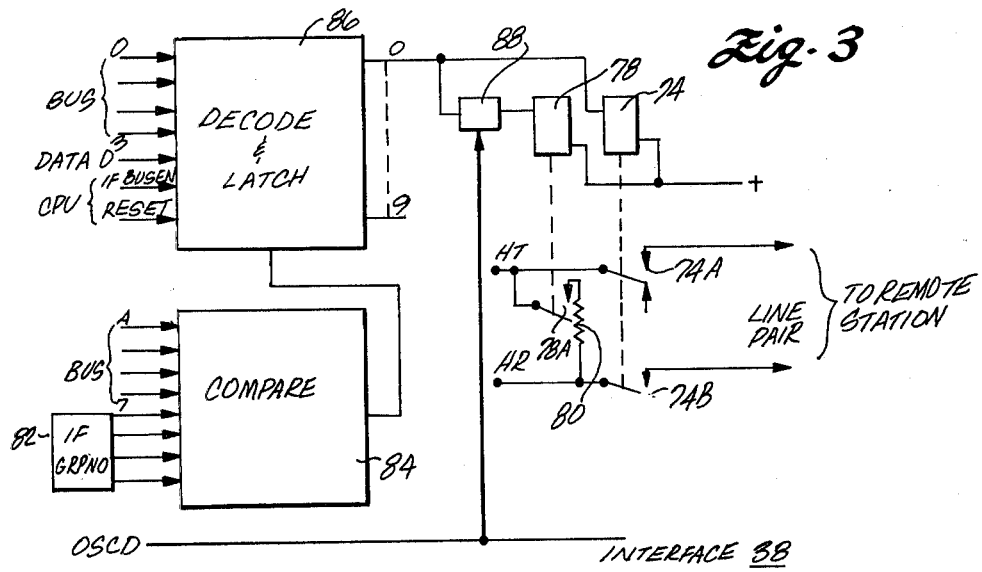
FIG. 3 is a schematic diagram of the interface circuit.

Referring to FIG. 3 there is shown in more detail the interface circuit 38 by which the microprocessor 30 controls the connection between the ten line pairs of a group and the corresponding ten horizontal lines of the line switch stage of the line link frame 14. As shown in FIG. 3, one line pair from the remote station is connected by a pair of relay-operated switches 74A and 74B, actuated by a relay solenoid 74, directly to the HT and HR conductors of an associated one of the horizontal lines of the crossbar line switch in the line link frame. When the relay 74 is energized, the normally open contacts 74A and 74B provide a direct line path between the line pair and the associated horizontal line in the crossbar line switch. When the relay 74 is de-energized, the crossbar horizontal line is isolated from the line pair going to the remote terminal. In addition, a second relay having a relay coil 78 and normally open relay contacts 78A, when energized, connects a resistance 80 across the HT and HR conductors of the horizontal line. The relay 78 is controlled, as hereinafter described, to provide an impedance across the line while the line pair is being connected to the subscriber phone at the remote station, the relay 78 being timed to remain closed for a predetermined time interval to insure that the markers 18 in the crossbar switching system do not see an open line. The pair of relays 74 and 78 are duplicated in the interface circuit 38 for each of the ten line pairs serviced by the interface for one group of the line link frame.

The relays 74 and 78 are controlled from the microprocessor 30 by means of the 8-bit word received over the information bus and the least significant bit on the data bus. The interface circuit associated with a particular group is identified by the four highest order bits on the information bus from the microprocessor 30. These bits are compared with a set of four locally coded bits from and IF group number generating circuit 82 by a compare circuit 84. If the comparison is true, indicating the particular interface circuit is being addressed, a decode and latch circuit 86 is activated. The circuit 86 decodes the lower order bits of the information bus from the microprocessor 30 and is strobed by the IF BUS EN control signal from the microprocessor 30. The selected one of the output lines from the decode and latch circuit 86 activates the relays 74 and 78 to complete the connections described above. A timing circuit 88 causes the relay 78 to drop out after a predetermined interval. The timing circuit 88 also causes the relay 78 to be disabled in response to an OSCD signal from the microprocessor, which is used to signal when the call did not originate with a subscriber phone at the remote switching terminal.

Figure 4:
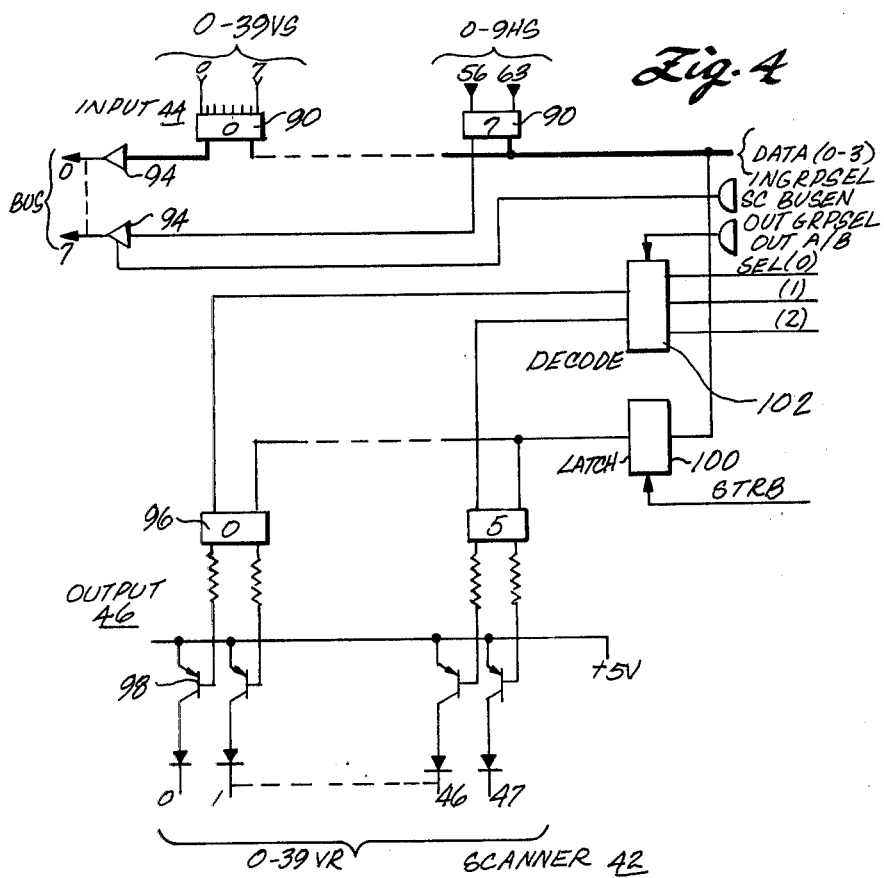
FIG. 4 is a schematic diagram of the scanner circuit.

Referring to FIG. 4, the input section 44 and output section 46 of the scanner 42 are shown in more detail. The forty input lines, such as the conductors VS from the line link group, the forty off-hook lines from the off-hook sensors 56 in the matrix circuits 40, and the forty monitor lines from the switching matrix in each of the matrix circuits 40, together with the ten input lines, such as the ten lines HS from the line link group, or the ten lines from the current sense relays 50, are arranged in groups of eight input lines going respectively to eight different switching circuits 90, two of the eight being shown in FIG. 4. Each switching circuit connects one of the eight input lines selectively to a common output line. The eight output lines from the eight switching circuits 90 are connected respectively through drivers 94 to the eight bit lines of the information bus of the associated microprocessor. The switching circuits 90 are controlled by the four bits on the data output from the microprocessor. The driver circuits 94 are strobed by the microprocessor in response to the presence of the IN GRP SEL line, which selects the appropriate scanner, and the SC BUS EN line which strobes the transfer of the binary information to the bus with the proper timing. It should be noted that the eight switching circuits 90 can accommodate sixty-four input lines. Since only fifty are needed for the VS and HS inputs, the additional lines are available for test or diagnostic purposes.

It will be seen that the scanner input, in response to an address from the microprocessor, provides an eight bit output, each bit being set by the level on one of the input terminals. Eight addresses scan all 64 possible input terminals. The three bit address is called the scan number (SC Address #). The eight bit output is called a status table word. Each bit by its position in the word and in combination with the scan number uniquely identifies one input terminal and its status.

The output section 46 of the scanner 42 includes six decoding circuits 96, designated 0 through 5. Each decode circuit has eight output lines which respectively control eight transistor switches 98 for connecting the associated output terminals to a reference potential. Forty-eight transistor switches 98 are provided in all, controlled respectively by the eight outputs of each of the six decode circuits 96. Forty of the transistor switches are connected to the forty output terminals VR of the scanner, the remaining eight switches being used to control other functions if needed.

Selective operation of any one of the forty-eight switches is controlled by a combination of the data lines and the SEL (0-2) lines from the processor. The data lines are applied to a latch circuit 100 which is activated by a strobe signal from the processor. The output of the latch applies the binary coded information received from the data lines to each of the decode circuits 96 which, in response to the information of the data lines, select one of the eight outputs. Only one of the six decode circuits is activated at a time by one of six output lines from a decode circuit which decodes the binary information on the SEL lines from the processor. The decode circuit 102 is activated in a selected one of the scanner circuits by the OUT GRP SEL line from the processor, which output selects one of the ten groups, and by the OUT A/B, which determines whether the A scanner or B scanner is being selected.

Figure 5:
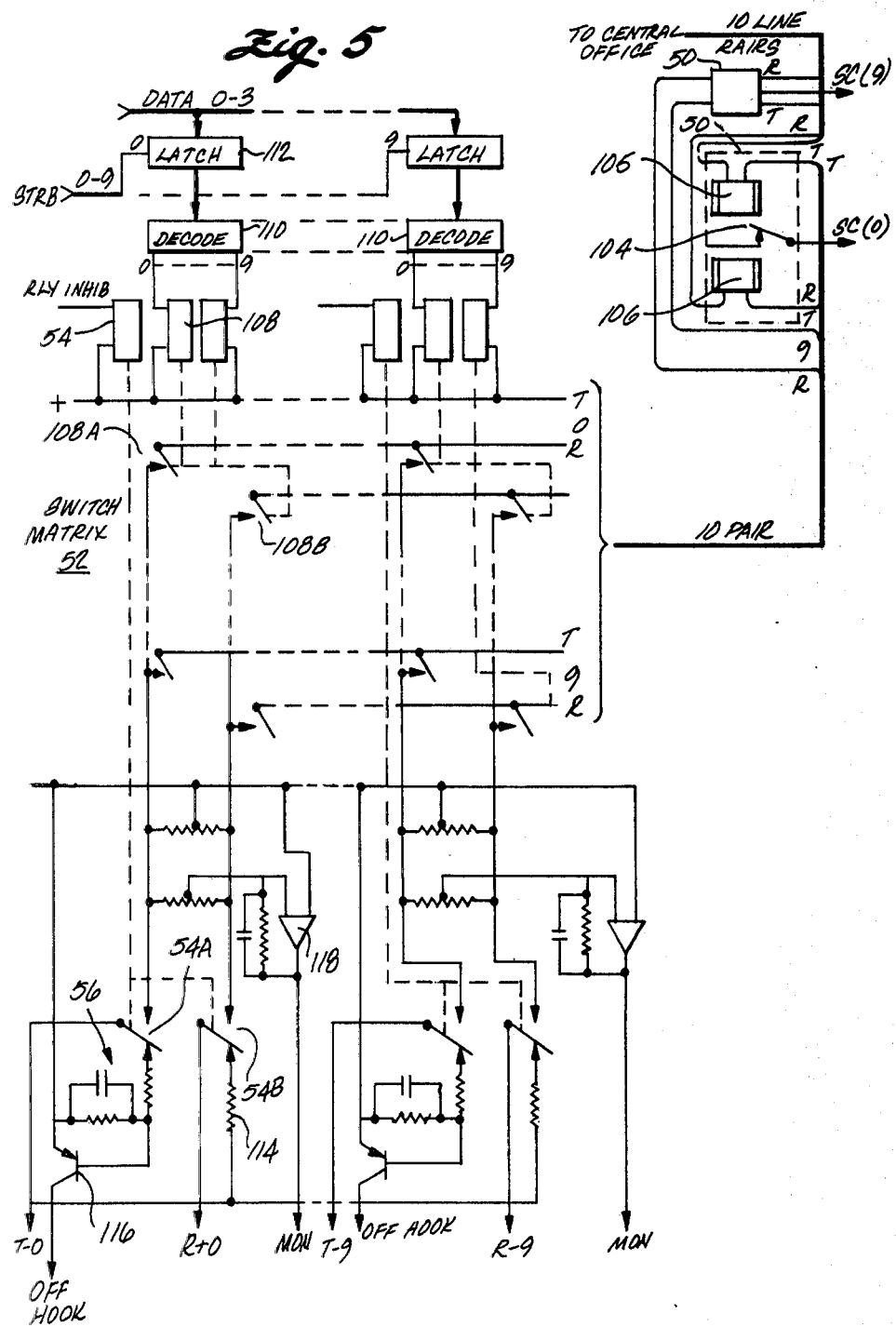
FIG. 5 is a schematic block diagram of the matrix circuit.

Details of a matrix circuit 40 are shown in the schematic diagram of FIG. 5. The ten line pairs from the central office are connected through a set of ten current sense relay circuits 50, one of which is shown in detail. The relay is balanced by having two coils 104 and 105 connected respectively in series with the R and T conductors of an associated line pair. When the the line pair is busy, current in the line activates the relay to close normally open contacts 106 to provide a reference voltage on one of ten output lines, designated SC (0-9). These lines connect to the ten HS terminals in the input section 44 of the associated scanner (A) of the remote terminal.

The ten line pairs then connect respectively to the horizontal line pairs of the 10×10 matrix switch 52. The matrix switch 52 also has ten vertical line pairs, with any one of the ten vertical line pairs being connected to any one of the horizontal line pairs by a relay-operated switch. Thus ten such relays, indicated at 108, are associated with each vertical line pair, there being ten groups of ten relays in all. Each relay operates a pair of normally open contacts 108A and 108B for completing a connection of a line pair through the matrix switch. The coils of each group of ten relays 108 is controlled by an associated decode circuit 110, there being ten such decode circuits. Each decode circuit receives a binary input from an associated latch 112 which is set by bits on the data lines from the output of the microprocessor 32. There are ten sets of latches 112 in the matrix circuit, which are selectively activated by associated ones of ten strobe lines from the output section 46 of the scanner A.

The selected vertical pair is in turn connected to the subscriber phone line pair by one of the line relay 54, there being one line relay 54 associated with each of the ten subscriber lines connected to the vertical lines of the matrix switch 52. One of the ten line relays is energized in response to a corresponding one of ten RELY INHIB lines from ten of the VR terminals of the output circuit 46 of scanner B. When the line relays are not energized, the normally closed contacts of the line relay switches 54A and 54B connect the R conductor of the subscriber phone pair to a reference potential through a resistor 114. At the same time, the T conductor is connected by the normally closed contacts to the base of a transistor switch 116. Depending upon whether the subscriber phone is on-hook or off-hook, the transistor switch 116 will be biased off or on to provide an off-hook indication which goes to the input section 44 of scanner A. A line relay is operated before a matrix switch in the same vertical column so as to interrupt any current through the matrix switch during a switching operation.

In order to monitor the matrix switch to determine if the switch contacts are making the desired connection, operational amplifiers 118, each having one input connected to one vertical pair of the switch matrix and the other input connected to a voltage reference, are provided. The level at the output of the amplifiers 118 is an indication of the status of the relay switches 108A, 108B.

Both the microprocessors 30 and 32 operate in response to a program stored in the respective ROM's 64. The same program is stored in both microprocessors. A computer printout of the program stored in the ROM 64 for operating the microprocessors at each terminal is attached as Appendix 1. The program is designed to test, during an initializing routine, whether a terminal on the microprocessor is grounded, indicating a central office terminal, or ungrounded indicating a remote terminal. This information is then stored as one bit in a system control word SYSW in the data memory DM of the processor. After the initializing, the program branches to either a central office terminal routing MNCOTP (see SEQ 981 of Appendix I) or a remote terminal routine MNTRP (see SEQ 1305 of Appendix I).

Referring to the flow diagram of FIG. 7 for the initializing routine, the microprocessor at each terminal is initialized by first operating a manual reset switch 130 (See FIG. 6). As shown in block 132 of FIG. 7, this causes the processor 60 to set a program counter to 0, a stack pointer to 0, the BUS to a high impedance, select Memory Bank ZERO (MBO), and select Register Bank ZERO (RBO), disable any interrupts, stop the timer, and clear the logic. The serial/parallel converter (or UART) 68 is set to Idle and the external RAM 66 has all ports set to input. As indicated at 134, the program then begins by setting the data memory DM in the processor to 0, setting all eight bits of the port P2 to 0, setting bits 0 through 5 to 0, and bits 5, 6, and 7 to 1 at port P1.

It should be noted that throughout the program definition, the eight bits forming a byte are divided into two groups of four bits, called "nibbles", each coded in hexadecimal. The sixteen coded states of each nibble are designated 0-9 and A-F. In setting the port P1 to E0, as indicated in block 136, the lower order four bits are set to 0 (0000 in binary) and the higher order four bits are set to E (1110 in binary). The timer T0 in the processor is enabled, as indicated at 138. The setting of the group number select switches 70 is then read into the processor, as indicated at 140, and the system word SYSW is stored indicating whether the processor is a central office terminal or a remote terminal, as indicated at 142. If the processor is part of a central office terminal, the relays in the interface circuits 38 are all turned off, as indicated at 144, but if at a remote terminal, the processor turns off the crosspoint relays of the matrix switch 52, as indicated at 146. The initializing program then initializes the parallel/serial converter or UART 68, causing it to initiate a search for sync, as indicated at 148. The program updates the status table in memory to store the current status of all input and output terminals scanned by the respective scanner circuits 42, as indicated at 150. The program then branches either to a central office routine or a remote terminal routine.

Referring to FIG. 8, the number at the top of a block indicates the starting sequence number SEQ in the program printout in appendix 1 at which the indicated routine is described. As indicated at 152, the program enters a routine CALSW to first compute a status word which identifies the group number of a scanner (4 bits) and the scan address (3 bits). The scan address points to one of the eight inputs to each of the switching circuits 90 in the input section 44 of a scanner 42. Once the status word is computed the program then sets the SC BUS EN (A) line from the microprocessor to each of the scanners to 1, and the program then enters the SCANS routine, as indicated at 156. This routine in the remote terminal looks for changes in the off-hook state as applied to the forty VS input terminals to the scanner from the off-hook sensors 48, and for a change in status of the trunk loop current as applied to the ten HS input terminals of the scanner from the current sense relays 50. This is done by using the group number of scan words to select the appropriate scanner and using the scan address to read out the appropriate eight-bit scan sample from the input section of the scanner. The eight bit sample is stored as a status word in a status table in the RAM. Each bit position in the status word identifies with one of the switching circuits 90 and thus, in combination with the scan address, uniquely identifies the status of one of the input terminals (MS and VS) of the scanner 42. The status is compared with the old sample stored during the previous scan of the same scan address. The new sample and the old sample are compared and used to generate an error word EW. Each bit position in the error word indicates whether or not the status of the corresponding input terminal changed status between scans.

The program then tests the error word, as indicated at 158 in FIG. 8. If there has been no change, (all bits are 0), a determination is made to see if the scan address portion of the scan word has been reduced to 0, as indicated at 160. If not, the scan address in the scan word is decremented and the scan routine is repeated until either a change in status is detected or the scan address is reduced to 0 before a change in status is detected.

If a change in status of one of the HS or VS input terminals is determined changes in the status of the HS and VS terminals are processed. A change to Busy at a vertical (VS) terminal indicates that an off-hook subscriber is requesting service. A vertical change to Idle indicates a central office relay has closed due to a crosspoint closure in the crossbar switch. A change to Busy at a horizontal (HS) terminal indicates current flow in the line pair to the central office. A horizontal change to Idle means a line current has been interrupted. In processing changes in the vertical or VS terminals and the horizontal or HS terminals of a scanner input, the program utilizes two tables in memory, the status table and a link table. The status table stores eight status words for each group. The status words are addressed by a status table address, four bits of which identify the group number and three bits of which identify the scan address number.

The link table contains 100 bytes, ten bytes for each of ten groups of ten line pairs per group extending from a remote terminal to the central office. Each word in the link table is addressed by a group number and a line pair number. Each byte in the link table has a format in which the highest order bit, bit position 7, indicates whether the particular line pair is busy or idle. The three bits in positions 4 through 6 of the byte identify the error bit position number, that is, one of the eight bit positions of an error word or a status word, and therefore one of eight input terminal groups. Bit positions 0, 1 and 2 are the scan address number, thus identifying one of the eight groups of input terminals. In other words, each byte in the link table identifies one of the scanner input terminals. Thus a word in the link table identifies, for example, which of the forty subscriber phones of one group at the remote station is linked with a particular one of the line pairs to the central office.

During the DCPRT routine 162, if there has been a change in an HS or horizontal terminal, the status table data is updated with the eight-bit sample from the scanner input data, and the link table data is modified to set the busy/idle bit to indicate the type of change, namely from Idle to Busy, or from Busy to Idle.

The DCPRT program routine then determines if a VS or vertical input terminal of a scanner has changed status after testing for a transient condition. If the change has been from Busy to Idle, the status table is updated and the main program is rejoined. If the status change has been from Idle to Busy, indicating a pending off-hook subscriber, the status table is updated and the program enters the XDCOM routine, indicated at 164. This routine causes the transmission of a vertical address word VAW, to the central office terminal. The VAW identifies one of the forty vertical terminals associated with the subscriber phone that went off-hook. The group number is also transmitted to the central office. A transmit stack and a receive stack are provided in memory to buffer the data link, which operates at a much lower rate than the processor.

The program then enters the RXDCOM routine, as indicated at 166. This routine decodes the data received from the central office terminal and either calls an MXDIS routine or an MXCON routine, as indicated at 168. These routines operate either to connect (MXCON) or disconnect (MXDIS) the appropriate crosspoint in the matrix switch 52. These routines use the vertical address word (VAW), which identifies a particular vertical line going to a subscriber, and a group horizontal link word (GHLW) which identifies the group number and horizontal link number, to control the scanner and provide the appropriate signals on the STRB lines and the RLY INHIB lines from the output sections of the A and B scanners to complete a connect or disconnect at the appropriate crosspoint in the matrix switch 52.

If there is no communication received but there has been a change in status of a horizontal, a debounce routine, as indicated at 170, after a delay interval, determines that there is no line current even though a connection has been completed through the matrix switch 52. If so, the MXDIS routine 172 is initiated to disconnect the crosspoint. Such a locally initiated disconnect may result from some erroneous operation at the central station resulting in a line not being connected through to a trunk, for example. The RTSRT program is then repeated to continue the scanning operation and to service changes in status originating at the remote terminal or at the central office terminal.

Referring to FIG. 9, there is shown the main flow diagram for the operation of the microprocessor at the central office terminal. Many routines of the central office terminal program are essentially identical to routines in the remote terminal program, as described in connection with FIG. 8. Thus on entry of the program, a scan word is calculated by CALSW, as indicated at 152. The input terminals VS and HS are scanned by groups, during SCANS 156, to determine if there is any status change. If a status change is detected, as indicated at 158, the program enters the routine designated DCPCOT, indicated at 174. This routine processes VS or HS transitions detected by the scanning operation. Change in status of an HS or VS terminal indicates either a disconnected or connected call. Changes in HS terminals are processed first. A group horizontal link word containing the group number and the horizontal line number is called from the data memory. If a horizontal sleeve conductor HS has been connected by the crossbar switch, the group horizontal link word GHLW is stored, the status table is updated, a timer is started, and there is a call to rescan the same group to find the corresponding vertical sleeve VS transition, which must occur within a predetermined period of time after the HS has been detected in order to be accepted.

If the change in status is an HS disconnect, the link table is set to 0 and the associated relay in the interface circuit 38 is released. The disconnect status is then transmitted to the remote terminal by calling the XDCOM routine 164.

If a vertical sleeve (VS) connect or disconnect change is determined within a predetermined time of an HS connect, the number of the VS terminal is determined and the status and link tables are updated accordingly. A determination is made of whether the call is a terminating or originating call and the OSCD signal to the interface 38 is generated so that operation of the relay 78 by timer circuits 88 is either enabled or disabled, as described above in connection with FIG. 3. Change in status of the particular VS terminal is transmitted to the remote terminal. The relays 74 in the interface circuit 38 are also controlled during this routine to either connect or disconnect the selected line pair with the HT and HR horizontal conductors of the crossbar switch. The program then enters the RXDCOM routine 166 during which it receives information from the remote terminal.

During the RXDCOM routine, the microprocessor controls the output terminals of the scanner to apply or remove a reference potential of the selected VR line in the crossbar switch, as described above in connection with FIG. 2. This is accomplished by an SOCPGM routine during which, based on the group number and vertical address word, the appropriate VR output terminal is selected and controlled, using the information received from the remote terminal. The main routine of the central office terminal then returns to the Start.

As noted, the attached printout of the program in Appendix I defines fully the program for operating the microprocessors at both the central office terminal and the remote terminal. It is believed evident from this detailed program description how the program functions to operate the processors and to control the respective terminals.

To summarize the operation of the switching system as controlled by the programmed processors, when a subscriber phone at the remote terminal goes off-hook, the change in status of the corresponding VS terminal of scanner A is detected. This change in status is processed during the DCPRT routine. The group number and vertical address word VAW are then transmitted to the central office terminal during the XDCOM routine. At the central office terminal, the received data is processed during the RXDCOM routine and a "ground" is applied to a corresponding one of the VR output terminals of the scanner at the central office terminal. This activates the crossbar switching system in the same manner as if a phone had locally gone off-hook at the line link frame. The crossbar switch completes a path through the line link frame in the process grounding the HS and VS conductors of the horizontal line in the crossbar switch. The central office terminal during the DCPCOT routine detects this change in status in the VS and HS input terminals of the scanner and activates an appropriate relay in the IF circuit 38 to connect the activated horizontal of the crossbar switch to the associate line pair back to the remote terminal station. During the RXDCOM routine the central station transmits a group horizontal link word GHLW and a vertical address word VAW back to the remote terminal.

At the remote terminal, during the RXDCOM routine the received data is used to initiate an MXCON routine to select and operate one of the relays 108 to complete a connection at the appropriate crosspoint of the matrix switch 52, thus completing the connection between the remote subscriber to a trunk line through the crossbar switch.

When the remote subscriber phone goes back on-hook, this change in status is detected during SCANS, resulting in a local disconnect of the matrix. The crossbar switch also detects this on-hook condition and removes ground from the HS and VS terminals, terminating the call connection through the central office. The central office terminal then communicates the change in status back to the remote terminal. If the call originated at the remote terminal, this information is redundant. However, if the call originated at the central office and the remote subscriber phone never went off-hook, this information from the central office terminal is used to disconnect the crosspoint in the matrix switch. Otherwise a disconnect of the subscriber phone at the matrix switch results during SCANS from the change in status of line current sensor by the interruption of line current by the disconnect at the central office terminal.

From the above description it will be seen that a remote terminal switching system is provided which is compatible with the existing electromechanical type crossbar switching systems, and which allows a number of remote subscriber phones to be serviced by such a central office switching system over a relatively few number of line pairs. The equipment is completely opaque to the crossbar switching system, and in fact the same line link frame can service both local subscriber phones and remote subscriber phones using the same crossbar switch. In other words, some of the vertical lines of a crossbar switch can be connected directly to local subscriber phones while other verticals can be, in effect, dedicated to subscriber phones serviced by the remote terminal switching system of the present invention. The central office crossbar switching system does not distinguish between a call initiated by the grounding of a VR conductor in a vertical line of the crossbar switch by an off-hook condition of a local subscriber phone, or by a ground applied by the output of a scanner circuit at the central office terminal of the remote terminal switching system of the present invention. The present invention allows solid state circuits to be used in combination with the electromechanical circuit of the existing crossbar switching systems.

ASM48 :F1:MNCOTP MACROFILE PRINT(:LP:)   APPENDIX I

ISIS-II MCS-48/UPI-41 MACRO ASSEMBLER, V2.0   PAGE   1

```
LOC  OBJ        SEQ        SOURCE STATEMENT

1 $INCLUDE(:F1:MACLIB)
             =    2
             =    3         ;CALCULATE VS ADDRESS AND UPDATE STATUS TABLE BY CALLING
             =    4         ;MACRO VAWC. THIS MACRO USES THE THREE DUMMY VARIABLES
             =    5         ;EW=ERROR WORD, SA=SCAN ADDRESS, BPC=BIT POSITION COUNTER
             =    6         ;ALL OF WHICH REPRESENT THE REGISTERS THAT MUST CONTAIN
             =    7         ;THESE WORDS IN ORDER FOR VAWC(VERTICAL ADDRESS WORD
             =    8         ;CALCULATER) TO DETERMINE THE VAWC. IT DOES SO BY
             =    9         ;USING THE SCAN ERROR WORD TO CALCULATE THE POSITION
             =   10         ;(0 TO 5) OF THE ERROR BIT IN THE 6 BIT VERTICAL FIELD.
             =   11         ;AFTER THIS BIT POSITION IS GENERATED IN BPC IT IS
             =   12         ;PUT IN THE HIGH NIBBLE AND THE SCAN ADDRESS IS ADDED
             =   13         ;TO THE LOW NIBBLE YIELDING THE VERTICAL ADDRESS WORD
             =   14         ;IN MNCOTP R2=SA, R4=EW, R6=BPC
             =   15
             =   16 VAWC    MACRO EW, SA, BPC
             =   17         LOCAL LOOP1     ;SETS UP "LOOP 1" AS A LOCAL NAME TO AVOID DOUBLE NAMES
             =   18         MOV BPC,#0FFH   ;SETS BPC UP AS A COUNTER
             =   19         MOV A,EW        ;GETS THE EW
             =   20 LOOP1:  RRC A           ;CHECK LSB
             =   21         INC BPC         ;INCREMENT COUNTER
             =   22         JNC LOOP1       ;GO UNTIL ERROR BIT IS FOUND
             =   23         MOV A,BPC       ;GET BIT ERROR POSITION #
             =   24         SWAP A          ;PUT POSITION # IN HIGH NIBBLE
             =   25         ADD A,SA        ;ADD IN SCAN ADDRESS. A=VERTICAL ADDRESS
             =   26                         ;WORD=VAW
             =   27         ENDM
             =   28
             =   29 ;XSTATUS IS A MACRO THAT RETURNS THE STATUS OF THE TRANSMIT BUFFER STATUS
             =   30 ;REG SETS WHICH REGISTER IS TO BE USED TO POINT TO DM3FH (R0,R1).
             =   31 ;MASK ALLOWS FOR SELECTIVE MASKING OF SELECTED BITS ---0FH IS STANDARD.
             =   32 XSTAUS  MACRO REG,MASK
             =   33         MOV REG,#63D    ;SET UP REG AS POINTER TO STATUS WORD
             =   34         MOV A,@REG      ;GET IT
             =   35         ANL A,#MASK     ;MASK OFF TOP NIBBLE
             =   36         ENDM
             =   37
             =   38 ;RSTAUS IS A MACRO THAT RETURN THE STATUS OF THE RECEIVE BUFFER.
             =   39 ;REG SETS WHICH REGISTER IS TO BE USED TO POINT TO DM3FH (R0,R1).
             =   40 ;MASK ALLOWS FOR SELECTIVE MASKING OF SELECTED BITS--- 0FH IS STANDARD
             =   41 RSTAUS  MACRO REG,MASK
             =   42         MOV REG,#63D    ;SETUP REG AS POINTER TO STATUS WORD
             =   43         MOV A,@REG      ;GET IT
             =   44         SWAP A          ;GET REC NIBBLE IN LOWEST POSITION
             =   45         ANL A,#MASK     ;MASK IT
             =   46         ENDM
             =   47
             =   48 ;BINDEC IS A MACRO THAT DOES A BINARY TO DEC. CONVERSION.
             =   49 ;REG SPECIFIES THE INPUT REGISTER.
             =   50 ;THE OUTPUT IS IN THE ACCUMULATOR
             =   51 BINDEC  MACRO REG
             =   52         LOCAL BDLOOP    ;SETS UP "BDLOOP" AS A LOCAL LOOP TO AVOID DOUBLE NAMES
```

ISIS-II MCS-48/UPI-41 MACRO ASSEMBLER, V2.0                    PAGE   2

```
LOC  OBJ        SEQ         SOURCE STATEMENT

=  53            CLR C           ;CLEAR CARRY BIT
              =  54            CPL C           ;SET CARRY BIT
              =  55            CLR A           ;ZERO ACCUM
              =  56  BDLOOP:   RLC A           ;ROTATE ACCUM LEFT THRU CARRY
              =  57            DJNZ REG,BDLOOP ;DEC. AND TEST REG TO SEE IF DONE
              =  58            ENDM
              =  59
              =  60 ;LESSTH IS A MACRO TO CHECK IF THE ACCUM IS LESS THAN A CONSTANT -NUMBER
              =  61 ;CARRY CONTAINS RESULTS OF OPERATION WHERE 0=LESS THAN OR EQUAL TO
              =  62 LESSTH MACRO NUMBER
              =  63            CPL A           ;COMPL. THE ACCUM
              =  64            INC A           ;INCREMENT THE ACCUM
              =  65            ADD A,#NUMBER   ;DO THE SUBTRACTION
              =  66            ENDM
              =  67
              =  68 ;SUBREG IS A MACRO TO SUBTRACT THE CONTENTS OF REG1 AND REG2 (REG1-REG2)
              =  69 ;OUTPUT IS THE ACCUM
              =  70 SUBREG MACRO REG1,REG2
              =  71            CLR C
              =  72            MOV A,REG2      ;GET CONTENTS OF REG2
              =  73            CPL A           ;COMPL. REG2
              =  74            INC A           ;INCREMENT THE ACCUM
              =  75            ADD A,REG1      ;COMPLETE SUBTRACTION
              =  76            ENDM
              =  77
              =  78 ;SUBAR IS A MACRO TO SUBTRACT THE ACCUM FROM REG
              =  79 SUBAR MACRO REG
              =  80            CLR C           ;CLEAR CARRY
              =  81            CPL A           ;COMPL. ACCUM
              =  82            ADD A,REG       ;DO IT
              =  83            ADD A,#01H      ;COMPLETE 2'S COMPLEMENT SUBTRACTION
              =  84            ENDM
              =  85
              =  86 ;SUBRA IS A MACRO TO SUBTRACT THE VALUE IN REG FROM THE ACCUM
              =  87 SUBRA MACRO REG
              =  88            XCH A,REG
              =  89            CLR C           ;CLEAR CARRY
              =  90            CPL A           ;COMPL. ACCUM
              =  91            INC A           ;COMPLETE 2'S COMPLEMENT SUBTRACTION
              =  92            ADD A,REG       ;DO IT
              =  93            ENDM
              =  94 ;BYTREV--BYTE REVERSING MACRO--XCHANGES ORDER OF NUM BITS
              =  95 ;REG 1=DESTINATION REG.,REG2=COUNTER,NUM=NUMBER OF BITS TO WORK ON
              =  96 BYTREV MACRO REG1,REG2,NUM
              =  97            MOV REG2,#NUM   ;SET UP COUNTER
              =  98            MOV REG1,#00H   ;ZERO REG1
              =  99 MLP1:      RRC A           ;GET LSB OF INPUT IN A AND SAVE IN CARRY BIT
              = 100            XCH A,REG1      ;XCHANGE ACCUM AND REG1
              = 101            RLC A           ;ADD IN LSB
              = 102            XCH A,REG1      ;GO BACK TO INPUT
              = 103            DJNZ REG2,MLP1  ;LOOP UNTIL DONE
              = 104            ENDM
                105 $INCLUDE(:F1:BEGIN)
              = 106
              = 107 ;INITILIZATION PROGRAM SEGMENT--IS ALSO USED TO LINK IN INTERUPT PGMS
0000          = 108            ORG 00H
0000 0489     = 109            JMP BEGIN
0002 00       = 110            NOP
0003 0432     = 111            JMP INTRPT      ;JMP TO HARDWARE INTERUPT ROUTINE
0007          = 112            ORG 07H         ;SET UP FOR TIMER INTERRUPT
              = 113 $INCLUDE(:F1:SEVEN)
              1= 114
```

```
                  1= 115
                  1= 116    ;THE FOLLOWING IS THE T1 INTERRUPT LEAD IN PROGRAM THAT
                  1= 117    ;BEGINS AT PM#007
                  1= 118
0007 15           1= 119 SEVEN:  DIS I        ;DISABLE INTERRUPTS
0008 D5           1= 120         SEL RB1      ;SWITCH TO RB1 OF WHICH R7 IS USED AS
                  1= 121                      ;T1'S CYCLE COUNTER
0009 AE           1= 122         MOV R6,A     ;SAVE ACC IN R6
000A EF13         1= 123         DJNZ R7,TMIREX ;LEAVE IF THE COUNT ISN'T 0
000C 27           1= 124         CLR A        ;SET A=0
000D 62           1= 125         MOV T,A      ;RESET TIMER COUNTER
000E 65           1= 126         STOP TCNT    ;STOP T1
000F B82D         1= 127         MOV R0,#32D  ;GET ADD OF T1'S TEXW
0011 046E         1= 128         JMP INBRTB   ;GO EXECUTE TEXW
0013 FE           1= 129 TMIREX: MOV A,R6     ;RESTORE THE ACC
0014 93           1= 130         RETR
                  1= 131
                   = 132         ;ADD IN MAIN INTERRUPT PGM AT THIS POINT FOR NOW
                   = 133 $INCLUDE(:F1:INTRPT)
                  1= 134 ;INTERUPT ROUTINE -- USART PORTION USES R0 TO R3
                  1= 135 ;R6 IS USED TO STORE THE ACCUMULATE VALUE ON INPUT
                  1= 136 ;R7 IS USED AS TIMER COUNTER FOR TIMER 1
                  1= 137 ;ENTRY POINT IS INTRPT
0015 B83F         1= 138 TXOUT:  MOV R0,#3FH  ;SET R0 AS POINTER TO STATUS WORD
0017 F0           1= 139         MOV A,@R0    ;GET IT
0018 530F         1= 140         ANL A,#0FH   ;GET JUST XMIT STATUS WORD
001A 9621         1= 141         JNZ XMDA     ;IF 0 GO SEND SYNC WORD TO UART
001C 232A         1= 142         MOV A,#2AH   ;A=SYNC WORD
001E 91           1= 143         MOVX @R1,A   ;LOADS UART WITH SYNC WORD TO RESET TXRDY
001F 043E         1= 144         JMP RURTS    ;GO SEE IF RCV. NEEDS SERVICING
0021 AA           1= 145 XMDA:   MOV R2,A     ;SAVE XMIT STATUS WORD IN A
0022 F0           1= 146         MOV A,@R0    ;GET COMPLETE STATUS WORD
0023 07           1= 147         DEC A        ;REDUCE XMIT STATUS WORD BY ONE
0024 A0           1= 148         MOV @R0,A    ;RESTORE THE NEW STATUS WORD
0025 C8           1= 149         DEC R0       ;SETS R0 TO TOP OF XMIT DATA STACK
0026 F0           1= 150         MOV A,@R0    ;GET TOP BYTE
0027 91           1= 151         MOVX @R1,A   ;TRANSMIT IT TO USART XMIT BUFFER REGISTER
                  1= 152 ;--NOTE MOVX @R1 IS USED TO GENERATE WRITE STROBE AND DATA/CMD MODE
                  1= 153 ;DEPENDING ON THE STATUS OF THE LSB OF R1 (0=DATA MODE)
                  1= 154 ;--------------POINT TO POP XMIT STACK--------------
0028 B93D         1= 155         MOV R1,#3DH  ;SET R1 AS SOURCE REGISTER
002A F1           1= 156 INTLP2: MOV A,@R1    ;GET DATA
002B A0           1= 157         MOV @R0,A    ;SAVE THE DATA
002C C8           1= 158         DEC R0       ;UPDATE R0
002D C9           1= 159         DEC R1       ;UPDATE R1
002E EA2A         1= 160         DJNZ R2,INTLP2 ;LOOP UNTIL DONE
0030 043E         1= 161         JMP RURTS    ;GO SEE IF RECEIVER HAS DATA
0032 15           1= 162 INTRPT: DIS I        ;DISABLE ANY FURTHER INTERUPTS
0033 D5           1= 163         SEL RB1      ;SELECT REGISTER BANK 1
0034 AE           1= 164         MOV R6,A     ;SAVE ACCUMULATOR CONTENTS IN R6
0035 8A80         1= 165 USARTS: ORL P2,#80H  ;GIVE BUSS TO UART
0037 B901         1= 166         MOV R1,#01H  ;SET R1 TO 1 TO INSURE THAT UART IS ADDRESS IN STATUS MODE
0039 81           1= 167         MOVX A,@R1   ;GET STATUS WORD
003A AB           1= 168         MOV R3,A     ;SAVE STATUS WORD IN R3
003B 19           1= 169         INC R1       ;SET R1 SO THAT UART WILL BE IN DATA MODE
003C 1215         1= 170         JB0 TXOUT    ;IF BIT 0=1 THEN OUTPUT A NEW CHAR. TO XMIT DATA BUFFER
003E FB           1= 171 RURTS:  MOV A,R3     ;RECOVER STATUS WORD
003F 37           1= 172         CPL A        ;COMPLEMENT ACCUM
0040 325A         1= 173         JB1 INLOP3   ;IF BIT 1=1 THEN NO RECEVIE DATA IS READY YET
                  1= 174 ;------AT THIS POINT THE UART HAS DATA READY FOR THE RECEIVE STACK------
                  1= 175 ;FIRST GET THE DATA THEN PUSH IT ONTO THE RECEIVE STACK AND UPDATE THE STATUS WORD
0042 B900         1= 176         MOV R1,#00H  ;SET R1 TO PUT UART IN DATA MODE
0044 81           1= 177         MOVX A,@R1   ;GET RECEIVE DATA BYTE
0045 AB           1= 178         MOV R3,A     ;SAVE IT IN R3
                  1= 179 ;SEGMENT TO PUSH THE STACK DOWN ONE
0046 BA05         1= 180         MOV R2,#05H  ;SET UP R2 AS BYTE COUNTER
0048 B833         1= 181         MOV R0,#51D  ;SET R0 TO POINT TO BOTTOM OF THE STACK
```

```
004A B934    1= 182           MOV R1,#52D      ;SET R1 AS SOURCE REGISTER
004C F1      1= 183  INLOP1:  MOV A,@R1        ;GET DATA
004D A0      1= 184           MOV @R0,A        ;SAVE IN NEXT REGISTER DOWN
004E 18      1= 185           INC R0           ;UPDATE R0
004F 19      1= 186           INC R1           ;UPDATE R1
0050 EA4C    1= 187           DJNZ R2,INLOP1   ;LOOP UNTIL DONE
0052 FB      1= 188           MOV A,R3         ;GET NEW DATA
0053 A0      1= 189           MOV @R0,A        ;SAVE IT ON TOP OF STACK
             1= 190  ;UPDATE OF RECEIVE STATUS WORD
0054 B83F    1= 191           MOV R0,#3FH      ;SETUP R0 AS POINTER TO STATUS WORD
0056 F0      1= 192           MOV A,@R0        ;GET STATUS WORD
0057 0310    1= 193           ADD A,#10H       ;ADD 1 TO MSNIBBLE
0059 A0      1= 194           MOV @R0,A        ;RESOTORE STATUS WORD
005A 9A7F    1= 195  INLOP3:  ANL P2,#7FH      ;GIVE BUS TO 8155
             1= 196
             1= 197           ;HAS T2 REACHED ITS TERMINAL COUNT?
             1= 198
005C 0A      1= 199           IN A,P2          ;GET P2
005D AA      1= 200           MOV R2,A         ;STORE P2 IN R2
005E 2340    1= 201           MOV A,#40H       ;FORMATS A FOR P2 LOADING
0060 3A      1= 202           OUTL P2,A        ;SETS P2 FOR 8155 SELECT & I/O MODE
0061 B800    1= 203           MOV R0,#00H      ;SET R0 TO POINT TO 0
0063 80      1= 204           MOVX A,@R0       ;GET THE 8155'S STATUS WORD
0064 A9      1= 205           MOV R1,A         ;STORE THE MRY SW IN R1
0065 FA      1= 206           MOV A,R2         ;GET THE ORIG P2
0066 3A      1= 207           OUTL P2,A        ;RESTORE P2
0067 F9      1= 208           MOV A,R1         ;GET THE MRY SW
0068 D26C    1= 209           JB6 T2INT        ;GO TO T2'S INTERRUPT ROUTINE IF ITS FLAG BIT=1
006A 0413    1= 210           JMP THIREX       ;LEAVE IF T2 HAS NOT TIMED OUT
             1= 211
             1= 212
             1= 213           ;NOTE THIS IS THE  END OF THE RLS INTERRUPT ROUTINE.
             1= 214           ;IT IS PROCEEDED BY YHE UART INTERRUPTS WHICH TAKE
             1= 215           ;PRECEDENT OVER THESE TIMER INTERRUPTS. IF THE PROGRAM GETS
             1= 216           ;THIS FAR, THERE MUST BE A T2 INTERRUPT.
             1= 217
             1= 218
             1= 219           ;THE FOLLOWING IS THE T2 TIMER ROUTINE WHICH BEGAN AT 003
             1= 220
006C B821    1= 221  T2INT:   MOV R0,#33D      ;GET T2'S TEXW ADD
006E F0      1= 222  INBRTB:  MOV A,@R0        ;GET THE TEXW
006F B000    1= 223           MOV @R0,#00H     ;SET TEXW TO 0 IN DM
0071 0381    1= 224           ADD A,#TJMPBR-1  ;FORMATS ADD OF THE BRANCH TABLE INSTRUCTIONS
             1= 225                            ;TO BE=#TJMPBR-1+TEXW
0073 B3      1= 226           JMPP @A          ;GO EXECUTE TEXW INSTRUCTION
0074 24EE    1= 227  BTABL0:  JMP CONNIR       ;GO TO THE RT CONNECT ROUTINE TEXW=1
0076 24FA    1= 228           JMP DISCOI       ;GO TO THE RT DISCONNECT ROUTINE.TEXW=2
0078 4460    1= 229           JMP CORCL        ;GO TO THE RT CO RLY CLOSED ROUTINE.TEXW=3
007A 447E    1= 230           JMP HOZWID       ;GO TO THE CO HORIZ WDOW TIMER ROUTINE.TEXW=4
007C 84C8    1= 231           JMP DEBOU        ;GO TO THE RT T2 DEBOUNCE ROUTINE TEXW=5
007E 4481    1= 232           JMP RGGRRL       ;GO TO THE CO RING GROUND RELEASE ROUTINE TEXW=6
0080 4485    1= 233           JMP VRECON       ;GO TO THE CO VERTICAL RECONNECT ROUTINE TEXW=7
0082 74      1= 234  TJMPBR:  DB BTABL0,BTABL0+2,BTABL0+4,BTABL0+6,BTABL0+8,BTABL0+10,BTABL0+12
0083 76      1=
0084 78      1=
0085 7A      1=
0086 7C      1=
0087 7E      1=
0088 80      1=
             1= 235
             1= 236
             = 237  ;MAIN INITILIZATION ROUTINE---
             = 238  ;--------SET DATA MEMORY TO 0--------
             = 239
0089 27      = 240  BEGIN:    CLR A            ;ZERO ACCUM
008A B83F    = 241            MOV R0,#3FH      ;R0 POINTS TO TOP OF THE DATA MEMORY
008C A0      = 242  DMZRO:    MOV @R0,A        ;SET DM TO 0
```

```
008D E88C    = 243              DJNZ R0,DMZRO    ;GO TILL ALL OF DM=0
008F A8      = 244              MOV R0,A         ;ZERO R0
             = 245
             = 246 ;----------FORMAT P1 & P2----------
             = 247
0090 3A      = 248              OUTL P2,A        ;ZERO P2
0091 23E0    = 249              MOV A,#0E0H      ;FORMAT A FOR P1'S INITIAL CONDITIONS
0093 39      = 250              OUTL P1,A        ;INITIALIZE P1
             = 251
             = 252 ;----------SETUP F1 & ENABLE T0----------
             = 253
0094 B5      = 254              CPL F1           ;SETS F1 TO 1 TO ENABLE OFF HOOK VERTICALS TO
             = 255                               ;BE PROCESSED ASSUMES F1 WAS CLEARED BY RESET.
0095 75      = 256              EN T0 CLK        ;ENABLE T0
             = 257
             = 258 ;----------SETUP 8155 AND GET READING OF BCD SWS AND STORE IN DM 38----------
             = 259 $INCLUDE(:F1:RDGRN)
            1= 260
            1= 261              ;THE PURPOSE OF RDGRN IS TO READ
            1= 262              ; THE MIN/MAX GR # FROM THE EXTERNAL SWITCHES THRU PORT A
            1= 263              ;OF THE 8155. IT STORES THIS MIN/MAX GR# IN DM#38. IT ALSO
            1= 264              ;STORES THIS # PLUS 1 IN DM#39 WHERE IT IS USED AS THE LAST
            1= 265              ;GR# SCANNED. THE PLUS 1 MAKES UP FOR THE FIRST DECREMENT.
            1= 266
            1= 267              ;READ MIN/MAX GR# FROM PORT A OF 8155
            1= 268
            1= 269
0096 8A40   1= 270  RDGRN:      ORL P2,#40H      ;SETS P2-6 TO 1 WHICH SELECTS THE I/O MODE
            1= 271                               ;OF THE 8155 A&B=I,C=0.
0098 230C   1= 272              MOV A,#0CH       ;LOADS A WITH THE C/S WORD NAMING PORTS A&B AS
            1= 273                               ;INPUT PORTS & C AS AN OUTPUT
009A 90     1= 274              MOVX @R0,A       ;LOADS C/S WORD INTO 8155
009B B903   1= 275              MOV R1,#03H      ;SET R1 TO POINT TO PORT C'S ADDRESS
009D 27     1= 276              CLR A            ;A=0
009E 91     1= 277              MOVX @R1,A       ;ZERO PORT C
009F 18     1= 278              INC R0           ;SET R0 TO POINT TO PORT A
00A0 80     1= 279              MOVX A,@R0       ;LOADS THE MIN/MAX GROUP# FROM PORT A TO ACC
00A1 37     1= 280              CPL A            ;COMPLIMENTS INVERTED SWITCH INPUTS.
            1= 281
            1= 282              ;STORE MIN/MAX GR # INTO DM#38 & MIN/MAX GR # + 1 INTO DM#39
            1= 283
00A2 B926   1= 284              MOV R1,#38       ;LOAD R1 WITH DM ADD. OF MIN/MAX GR #
00A4 A1     1= 285              MOV @R1,A        ;STORE MIN/MAX GR# IN DM#38
00A5 19     1= 286              INC R1           ;LOAD R1 WITH DM#39
00A6 17     1= 287              INC A            ;LOAD A WITH MIN/MAX GR# + 1
00A7 A1     1= 288              MOV @R1,A        ;LOAD DM#39 WITH LAST GR# SCANNED PLUS OFFSET
             = 289
             = 290 ;----------GET RT/COT STATUS BIT AND SAVE IN DM 34----------
00A8 18      = 291              INC R0           ;SET R0 TO POINT TO PORT B
00A9 80      = 292              MOVX A,@R0       ;READ STATUS
00AA 5340    = 293              ANL A,#40H       ;SAVE JUST RT/COT BIT. IF RT, BIT6=1
00AC B922    = 294              MOV R1,#34D      ;SET R1 TO POINT TO DATA MEMORY
00AE A1      = 295              MOV @R1,A        ;SAVE STATUS BIT
             = 296 ;----------SET PORT C TO 01H AND ALL DISPLAY DIGITS TO 8----------
00AF 2301    = 297              MOV A,#01H       ;SET UP DATA FOR PORT C
00B1 18      = 298              INC R0           ;SET R0 TO 03H
00B2 90      = 299              MOVX @R0,A       ;DO IT
00B3 B800    = 300              MOV R0,#00H      ;SET R0 TO CONTROL REG ADD
00B5 230D    = 301              MOV A,#0DH       ;SET A&C AS OUTS AND B=IN
00B7 90      = 302              MOVX @R0,A       ;DO IT
00B8 18      = 303              INC R0           ;LOAD R0 WITH 01
00B9 2388    = 304              MOV A,#88H       ;SET UP DATA
00BB BA08    = 305              MOV R2,#08H      ;SET UP R2 AS A DIGIT COUNTER
00BD 90      = 306  BEGIN1:     MOVX @R0,A       ;STORE ACCUM IN PORT A
00BE 0310    = 307              ADD A,#10H       ;INCREMENT MS NIBBLE
00C0 EABD    = 308              DJNZ R2,BEGIN1   ;LOOP UNTIL DO ALL 8 DIGITS
             = 309 ;----------RESTORE PORT 2 TO 0----------
```

```
00C2 9ABF    = 310          ANL P2,#08FH      ;GIVE BUS TO 8155 RAM
             = 311
             = 312 ;CLEAR LINK AND STATUS TABLE
             = 313
00C4 B8FF    = 314 CLRRAM:  MOV R0,#0FFH      ;SET R0 TO POINT TO THE TOP OF THE RAM
00C6 27      = 315          CLR A             ;ZERO THE ACCUM
00C7 90      = 316 CLRRA1:  MOVX @R0,A        ;ZERO RAM
00C8 E8C7    = 317          DJNZ R0,CLRRA1    ;LOOP UNTIL CLEAR LOCATION 1
00CA 90      = 318          MOVX @R0,A        ;ZERO LOCATION 0
             = 319
             = 320          ;AM I AN RT OR COT ?
             = 321
00CB F1      = 322          MOV A,@R1         ;GET THE SYSW
00CC D200    = 323          JB6 RRIZ          ;GO TO REED RLY IZ IF RT
00CE 2402    = 324          JMP IFRYIZ        ;GO TO IF RLY IZ IF COT
             = 325
             = 326          ;REED RELAY INITIALIZATION PROGRAM---THIS PROGRAM FORCES ALL OF
             = 327          ;THE CROSSPOINT REED RELAYS TO THEIR IDLE, DEENERGIZED, STATE.
             = 328          ;IT DOES SO BY APPLYING THE DISCONNECT PORTION OF THE MXDIS
             = 329          ;PROGRAM TO EACH VERTICAL IN EVERY GROUP. R7 IS USED AS THE
             = 330          ;GR# COUNTER WHICH IS SET TO THE MAX GR# AND DECREMENTED AFTER
             = 331          ;EACH GROUP OF 40 VERTICALS HAS BEEN DISCONNECTED. R6 IS USED
             = 332          ;AS THE VERTICAL COUNTER IN THE FORM OF THE VAW. EACH RELEASE
             = 333          ;TAKES 20 MSEC.
             = 334
             = 335          ;INITIAL SETTINGS
             = 336
00D0 89C0    = 337 RRIZ:    ORL P1,#0C0H      ;SIGNIFIES TIMERS ARE IDLE WHICH ALLOWS MXCON TO
             = 338                            ;PROCEED
00D2 B826    = 339          MOV R0,#38D       ;GET DM ADD OF MIN/MAX GR#
00D4 F0      = 340          MOV A,@R0         ;GET MIN/MAX GR#
00D5 530F    = 341          ANL A,#0FH        ;KILLS MIN GR#, A=(0)(MAX GR#)
00D7 47      = 342          SWAP A            ;A=(GR#)(0)=GHLW FORMAT FOR MXDIS
00D8 AF      = 343          MOV R7,A          ;LOAD R7 WITH MAX GR#
00D9 BE00    = 344          MOV R6,#00        ;SETS INITIAL VAW TO 0
             = 345
             = 346          ;SET F0 TO 1 FOR DISCONNECT & TEST IF VAW=8
             = 347
00DB 85      = 348 RRIZLP:  CLR F0            ;SET F0=0
00DC 95      = 349          CPL F0            ;SET F0=1 FOR DISCONNECT FLAG
00DD FE      = 350          MOV A,R6          ;GET VAW
00DE 72EB    = 351          JB3 SCADIZ        ;GP TO SCADIZ IF SCAN ADD=8.
             = 352
             = 353          ;DO A REED RELAY RELEASE
             = 354
00E0 B479    = 355 RELRLY:  CALL MXCON        ;GO TO DISCONNECT PORTION OF MXDIS
             = 356
             = 357          ;HAS T1 TIMED OUT?(TEST P1-7,6)
             = 358
00E2 09      = 359 TSTP1:   IN A,P1           ;GET P1
00E3 37      = 360          CPL A             ;DO IT
00E4 53C0    = 361          ANL A,#0C0H       ;A=XX000000
00E6 96E2    = 362          JNZ TSTP1         ;LOOP BACK UNTIL T1 HAS TIMED OUT
             = 363
             = 364          ;INCREMENT SCANWORD AND DO ANOTHER RELEASE
             = 365
00E8 1E      = 366          INC R6            ;INCREMENT SCAN ADD
00E9 04DB    = 367          JMP RRIZLP        ;RELEASE ANOTHER REED
             = 368
             = 369          ;SET SCAN ADD TO 0 AND TEST FOR BIT POSITION=8
             = 370
00EB 53F0    = 371 SCADIZ:  ANL A,#0F0H       ;SET SCAN ADD TO 0
00ED F2F4    = 372          JB7 BTPOIZ        ;DOES THE BIT POS = 8?
00EF 0310    = 373          ADD A,#10H        ;INCREMENT THE BIT POSITION #
00F1 AE      = 374          MOV R6,A          ;PUT NEW VAW INTO R6
00F2 04E0    = 375          JMP RELRLY        ;DO ANOTHER REED RELEASE
             = 376
```

```
                = 377           ;RESET BIT POSITION # TO 0
                = 378
00F4 530F       = 379 BTPOIZ: ANL A,#0FH    ;SET BIT POSITION TO 0
00F6 AE         = 380         MOV R6,A      ;STORE NEW YAW IN R6
                = 381
                = 382           ;DOES GR#=0?
                = 383
00F7 FF         = 384         MOV A,R7      ;GET GHLW
00F8 96FC       = 385         JNZ SYNCON    ;CONTINUE IF GHLW IS NOT=0.
00FA 2421       = 386         JMP SYNIZ     ;GO TO SYNC INIZ PROGRAM IF GHLW=0
00FC 47         = 387 SYNCON: SWAP A        ;A=(0)(GR#)
00FD 07         = 388         DEC A         ;REDUCE GR# BY 1
00FE 47         = 389         SWAP A        ;RESTORE A TO ITS GHLW FORMAT
00FF AF         = 390         MOV R7,A      ;PUT NEW GHLW INTO R7
0100 04E0       = 391         JMP RELRLY    ;DO ANOTHER REED RELEASE
                = 392
                = 393           ;IF RELAY INITIALIZATION PROGRAM----THIS SETS ALL OF THE
                = 394           ;IF RELAYS TO THEIR IDLE-OFF-STATE. IT BEGINS WITH GR#9&LK#9
                = 395           ;AND PROCEEDS THROUGH ALL 10 LINKS OF ALL 10 GROUPS UNTIL
                = 396           ;GR#0 AND LK#0 ARE REACHED
                = 397
                = 398           ;INITIALIZE GR# AND LINK# COUNTERS
                = 399
0102 B80A       = 400 IFRYIZ: MOV R0,#0AH   ;GR#=10
0104 B90A       = 401         MOV R1,#0AH   ;LK#=10
                = 402
                = 403           ;DISABLE TSOS
                = 404
0106 2304       = 405         MOV A,#04     ;FORMATS A FOR P6 CODING
0108 8E         = 406         ORLD P6,A     ;SETS P6-2 TO 1 FOR TSOS DISABLE
                = 407
                = 408           ;SET P1 TO DISCONNECT CODE
                = 409
0109 99FE       = 410         ANL P1,#0FEH  ;SETS P1-0 TO 0 FOR IF DISCONNECT CODE
                = 411
                = 412           ;DOES LK#=0?
                = 413
010B F9         = 414 IFRYLP: MOV A,R1      ;GET LK#
010C C613       = 415         JZ GRTST      ;GO TO GR# TEST IF LK#=0
                = 416
                = 417           ;UPDATE LK#
                = 418
010E 07         = 419         DEC A         ;DECREMENT LK#
010F A9         = 420         MOV R1,A      ;UPDATE LINK# IN R1
0110 3C         = 421         MOVD P4,A     ;LOAD NEW LK# INTO IF BOARD
0111 241B       = 422         JMP IFRYRL    ;RELEASE IF RLY
                = 423
                = 424           ;RESET LK# TO 10 AND TEST FOR GR#=0
0113 B90A       = 425 GRTST:  MOV R1,#0AH   ;RESET LINK # TO 10 IN R1
0115 F8         = 426         MOV A,R0      ;GET GR#
0116 C621       = 427         JZ SYNIZ      ;GO TO SYNC INIZ IF GR#=0
                = 428
                = 429           ;LOAD NEW GR# INTO IF BOARD
                = 430
0118 07         = 431         DEC A         ;DEC GR#
0119 A8         = 432         MOV R0,A      ;UPDATE GR# IN R0
011A 3D         = 433         MOVD P5,A     ;LOAD NEW GR# INTO IF BD.
                = 434
                = 435           ;RELEASE IF RLY
                = 436
011B 8A30       = 437 IFRYRL: ORL P2,#030H  ;SETS P2-5,4 TO 1,1 FOR IF BOARD ENABLE
011D 9ACF       = 438         ANL P2,#0CFH  ;SETS P2=5,4 TO 0,0 WHICH LATCHES GHLW INTO IF BD
011F 240B       = 439         JMP IFRYLP    ;RELEASE NEXT IF RLY
                = 440
                = 441
                = 442
```

```
01D7 9ABF     = 710          ANL P2,#0BFH    ;SETS P2-6 TO 0 FOR THE RAM SELECT.
01D9 83       = 711          RET
              = 712  $INCLUDE(:F1:FTM1)
              = 713          ;FTM1 IS A TIMER FORMATING PROGRAM WHICH FIRST TESTS TIMER 1
              = 714          ;FOR ITS AVAILABILITY. IF IT IS IN USE THEN IT TRIES TO GET
              = 715          ;TIMER 2 IN THE 8155. IF IT TOO IS IN USE,IT GOES BACK TO
              = 716          ;TEST FOR TIMER 1 ETC. EACH TIMER'S AVAILABILITY IS DETERMINED BY
              = 717          ;THE PRESENCE(NOT AVAILABLE) OR ABSENCE(AVAILABLE) OF
              = 718          ;THEIR RESPECTIVE TEXW'S IN RAM. WHEN EITHER TIMER FINALLY
              = 719          ;BECOMES AVAILABLE, THE NEW TEXW,WHICH IS INITALLY PUT INTO
              = 720          ;R1, IS LOADED INTO RAM. THEN THE ACTUAL PROGRAM THAT
              = 721          ;SETS UP THE TIMER,SETT1 OR SETT2, IS CALLED. FTM1
              = 722          ;REQUIRES THE FOLLOWING INPUT DATA:
              = 723          ;    R1=TEXW(TIMER EXIT WORD)
              = 724          ;    R2=THE LOW COUNT LENGTH BYTE IN T1'S EXACT FORMAT
              = 725          ;    R3=THE HIGH COUNT LENGTH BYTE IN T2'S EXACT FORMAT
              = 726
01DA B820     = 727  FTM1:   MOV R0,#032D    ;LOADS R0,WITH 32D
01DC F0       = 728          MOV A,@R0       ;LOADS A WITH CONTENTS OF DM#32
01DD 96E4     = 729          JNZ FTM2        ;TESTS IF TIMER1 IS AVAILABLE
01DF F9       = 730          MOV A,R1        ;LOADS A WITH APPROPRIATE TEXW
01E0 A0       = 731          MOV@R0,A        ;LOADS DM #32 WITH TEXW
01E1 34B9     = 732          CALL SETT1      ;JUMPS TO SETT1 ROUTINE
01E3 83       = 733          RET
01E4 B821     = 734  FTM2:   MOV R0,#33D     ;LOADS R0 WITH 33D
01E6 F0       = 735          MOV A,@R0       ;LOADS A WITH CONTENTS OF DM#33
01E7 96DA     = 736          JNZ FTM1        ;TESTS IF TIMER 2 IS AVAILABLE
01E9 F9       = 737          MOV A,R1        ;LOADS A WITH APPROPRIATE TEXW
01EA A0       = 738          MOV@R0,A        ;LOADS DM#33 WITH TEXW
01EB 34C5     = 739          CALL SETT2      ;CALLS SETT2 ROUTINE
01ED 83       = 740          RET
              = 741  $INCLUDE(:F1:CONNIR)
              = 742          ;CONNIR IS TEXW#1'S INTERRUPT BRANCH TABLE PROG. WHICH RESULTS
              = 743          ;FROM A MATRIX CONNECT OPERATION AT THE RT. IT BEGINS BY
              = 744          ;SETTING P1-6,7 TO 1,1. THIS WILL DISABLE THE SOSEL INPUT
              = 745          ;BITS OF SCAN BOARD B OUTPUT WHICH HAD BEEN ON DURING
              = 746          ;THE REED RLY CLOSURE INTERVAL IN ORDER TO HOLD THE CO
              = 747          ;RELAY OFF. THIS WILL REMOVE THE CO RLY INHIBIT SIGNAL
              = 748          ;FROM THE MATRIX BOARD ALLOWING THE CO RELAY TO BEGIN
              = 749          ;CLOSING. NEXT THE HIGH AND LOW COUNT LENGTH BYTES FOR
              = 750          ;A 30 MSEC. CO RELAY CLOSURE INTERVAL ARE FORMED
              = 751          ;ALONG WITH THE TEXW#3 TO GO WITH IT. FTM1 IS THEN CALLED
              = 752          ;IT WILL LOAD THE TEXW AND CALL SETT1 WHICH WILL LOAD AND
              = 753          ;START THE 30 MSEC T1 INTERVAL. AFTER THIS 30 MSEC INTERVAL,
              = 754          ;TEXW#3 WILL CALL THE CONVER PROGRAM WHICH IS THE FINAL
              = 755          ;STEP OF THE CONNECT OPERATION. THIS PROGRAM USES R1,2,&3.
              = 756
01EE 89C0     = 757  CONNIR: ORL P1,#0C0H    ;SETS P1-6,7 TO 1,1 WHICH RESETS SCAN
              = 758                          ;BOARD B AND TURNS THE CO RLY INHIBIT LINE
              = 759                          ;OFF,THUS ALLOWING THE CO RLY TO START CLOSING.
01F0 BA80     = 760          MOV R2,#80H     ;FORMATS THE LOW COUNT LENGTH BYTE FOR A 30
              = 761                          ;MSEC. TOTAL TIME.
01F2 BB81     = 762          MOV R3,#081H    ;FORMATS THE HIGH COUNT LENGTH BYTE FOR A 30
              = 763                          ;MSEC TOTAL TIME.
01F4 B903     = 764          MOV R1,#03      ;SETS THE TEXW # TO 3
01F6 34DA     = 765          CALL FTM1       ;START T1 FOR A 30 MSEC TOTAL CO RLY OPERATE TIME
01F8 0413     = 766          JMP THIREX      ;LEAVE
              = 767  $INCLUDE(:F1:DISCOI)
              = 768          ;DISCOI IS TEXW#2'S INTERRUPT BRANCH TABLE PROGRAM WHICH RESULTS
              = 769          ;FROM A MATRIX DISCONNECT OPERATION AT THE RT. IT BEGINS BY
              = 770          ;FORMATING P1 SO THAT THE A SCAN BOARD WILL STROBE THE MATRIX
              = 771          ;BOARD , AFTER THE 20 MSEC. INTERVAL DURING WHICH THE CO RLY.
              = 772          ;HAS BEEN TURNING OFF,AND LOAD IT WITH 0F. THIS WILL START TO TURN
              = 773          ;THE REED OFF AND KEEP THE CO RLY OFF. THIS IS FOLLOWED BY
              = 774          ;REFORMATTING P1 TO TURN THE SCAN BOARD OFF,WHICH COMPLETES THE DISCONNECT OPERATION.
              = 775          ;LASTLY, THE LINK TABLE AND DATA MEMORY ARE UPDATED. A,R0,&R1 ARE USED
              = 776
```

```
01FA 892F     = 777 DISCO1: ORL P1,#02FH    ;LOADS P1 WITH XX011111. THIS WILL PULSE THE A
              = 778                          ;STROBE LINE AND LOAD FH INTO THE MATRIX BOARD.
              = 779                          ;THE REED WILL START TO TURN OFF. THE CO RLY
              = 780                          ;WILL REMAIN OFF.
01FC 89C0     = 781          ORL P1,#0C0H   ;THIS SETS P1-6,7 TO 1,1 WHICH RESETS BOTH SCAN BDS.
01FE B825     = 782          MOV R0,#37D    ;GETS ADD OF GHLW OF THE DISCONNECTED LOOP.
0200 F0       = 783          MOV A,@R0      ;GET THE GHLW OF THIS DISCONNECT
0201 0350     = 784          ADD A,#50H     ;FORMATS THE LINK TABLE ADD.
0203 A9       = 785          MOV R1,A       ;PUTS L.T.A. INTO R1
0204 27       = 786          CLR A          ;SETS A=0
0205 91       = 787          MOVX @R1,A     ;SETS L.T. TO 0
0206 A0       = 788          MOV @R0,A      ;SETS DM#37 TO 0
0207 0413     = 789          JMP TMIREX     ;LEAVE
              790 $INCLUDE(:F1:CONVER)
              = 791          ;CONVER IS A ROUTINE THAT IS CALLED AT THE END OF THE FINAL
              = 792          ;CONNECT TIMER INTERRUPT ROUTINE AT THE RT. IT GETS THE GHLW
              = 793          ;OF THE CONNECT IN PROGRESS FROM RAM. IT THEN CALCULATES THE
              = 794          ;LINK # FROM THE GHLW AND SETS F0=0. IT NEXT CALCULATES THE
              = 795          ;SCAN ADDRESS FROM THE LINK #. THE GROUP # IS FETCHED AND IT
              = 796          ;PLUS THE SCAN ADDRESS ARE USED TO DETERMINE THE SPECIFIC
              = 797          ;SCAN BOARD AND SCAN INPUT WHICH CORRESPONDS TO THE TRUNK BEING
              = 798          ;USED BY THIS CONNECT. THE SCAN SAMPLE IS TAKEN AND THE BIT
              = 799          ;CORRESPONDING TO THE CONNECTED TRUNK'S RLY. CONTACT IS CHECKED
              = 800          ;IF IT INDICATES A VALID CONNECTION, THEN THE LINK TABLE IS
              = 801          ;UPDATED AND THE RAM STORAGE LOCATIONS FOR THE GHLW &VAW ARE
              = 802          ;RESET TO 0. IF THE CONNECT IS NOT VERIFIED, THEN THE ALARM
              = 803          ;SECTION IS CALLED. UPON RETURN,THE GHLW&VAW DM LOCATIONS ARE
              = 804          ;RESET TO 0 FOLLOWED BY A RETURN TO THE MAIN PROGRAM
              = 805          ;F0 IS SET TO 1 IF THE LINK # IS>6. A,R1,R2,R0,&R3 ARE USED.
              = 806
              = 807          ;GET THE GHLW OF THE LAST COT CONNECT FROM RAM.
              = 808
0209 B828     = 809 CONVER: MOV R0,#40D     ;LOAD R0 WITH THE ADD. OF THE GHLW OF THE
              = 810                          ;CONNECT IN PROGRESS.
020B F0       = 811          MOV A,@R0      ;GET THE GHLW
020C AA       = 812          MOV R2,A       ;STORE THE GHLW IN R2
              = 813
              = 814          ;CALCULATE THE LK. # AND CLEAR F0.
              = 815
020D 530F     = 816          ANL A,#0FH     ;KILL OFF THE GR #. SAVE LINK #
020F A9       = 817          MOV R1,A       ;STORE LK # IN R1
0210 85       = 818          CLR F0
              = 819
              = 820          ;IS LINK # < 7?
              = 821
0211 B806     = 822          MOV R0,#06     ;LOAD R0 WITH 6
              = 823          SUBAR R0       ;CALL MACRO WHICH SUBTRACTS THE LINK# FROM 6
0213 97       = 824+         CLR C          ;CLEAR CARRY
0214 37       = 825+         CPL A          ;COMPL. ACCUM
0215 68       = 826+         ADD A,R0       ;DO IT
0216 0301     = 827+         ADD A,#01H     ;COMPLETE 2'S COMPLEMENT SUBTRACTION
              = 828                          ;AND STORES ANSWER IN ACC.
0218 E61E     = 829          JNC LKHI       ;LINK # IS >6 IF C=0
              = 830
              = 831          ;FORMAT SCAN ADDRESS IF LINK# IS <7
              = 832
021A F9       = 833          MOV A,R1       ;GET LK #
021B 17       = 834          INC A          ;FORM SCAN ADDRESS IN A
021C 4427     = 835          JMP CONVEC     ;GO TO NEXT STEP
              = 836
              = 837          ;FORMAT SCAN ADD. FOR LINK# >6.
              = 838
021E 95       = 839 LKHI:   CPL F0          ;SET F0 TO 1 INDICATING A LINK# > 6
021F F9       = 840          MOV A,R1       ;GET LK# & PUT INTO A
0220 B806     = 841          MOV R0,#06     ;LOAD R0 WITH 6
              = 842          SUBAR R0       ;CALL MACRO WHICH WILL SUBTRACT 6 FROM THE LK#
0222 28       = 843+         XCH A,R0
```

```
= 576 ;TO SELECT THE APPROPRIATE SCAN BOARD. NEXT THE 3 BIT SCAN ADDRESS IS
= 577 ;CALCULATED AND PRESENTED TO THE SCAN BOARD. THEN THE NEW 8 BIT SCAN
= 578 ;SAMPLE IS TAKEN. THE
= 579 ;NEW SAMPLE IS THEN OBTAINED AND STORED AFTER WHICH THE OLD SAMPLE IS
= 580 ;FETCHED FROM XRAM. THE TWO ARE THEN COMPARED AND IF DIFFERENT THE
= 581 ;ROUTINE IS EXITED WITH THE FOLLOWING REGISTER STATUS
= 582                  ;ACC=ERROR WORD=EW
= 583                  ;R0=XRAM STATUS TABLE ADDRESS=STA
= 584                  ;R1=NEW DATA SAMPLE=ND
= 585                  ;R2=SCAN ADDRESS#=SA
= 586 ;IF THE SAMPLES ARE THE SAME, INDICATING NO CHANGE, THE SCAN 3 BIT
= 587 ;BYTE CODE IS TESTED FOR 0. IF 0 THE ROUTINE IS EXITED WITH THE ABOVE
= 588 ;REGISTER STATUS. IF NOT =0, A NEW SCAN WORD IS GENERATED AND ANOTHER
= 589 ;SCAN IS TAKEN
= 590
= 591         ;SELECT GROUP #
= 592
= 593
0185 AA     = 594 SCANS:  MOV R2,A       ;MOVES SCANWORD TO R2
0186 53F0   = 595         ANL A,#0F0H    ;SAVE GROUP #
0188 17     = 596         INC A          ;SET BIT 0 TO 1
0189 8E     = 597         ORLD P6,A      ;SETS P6-0 TO 1 WHICH ENABLES THE STROBE ON THE
            = 598                        ;IN GR SEL DECODER
018A 07     = 599         DEC A          ;RESTORES A
018B 77     = 600         RR A           ;MULTIPLY GROUP # BY 8
018C A8     = 601         MOV R0,A       ;SAVE IN R0
018D E7     = 602         RL A           ;RESTORE GROUP # IN MSNIBBLE
018E 47     = 603         SWAP A         ;PUTS GROUP # IN LOW NIBBLE
018F 3C     = 604         MOVD P4,A      ;LOADS GR # INTO DECODER
0190 230E   = 605         MOV A,#0EH     ;FORMATS LOW NIBBLE FOR P6 CODING
0192 9E     = 606         ANLD P6,A      ;SETS P6-0 TO 0 WHICH LATCHES GR# INTO DECODER
            = 607
            = 608         ;FORMAT SCAN ADDRESS
            = 609
            = 610
0193 FA     = 611         MOV A,R2       ;MOVES SCANWORD FROM R2
0194 530F   = 612         ANL A,#00FH    ;SETS HIGH NIBBLE TO 0. LEAVES SCAN ADDRESS
0196 AA     = 613         MOV R2,A       ;SAVE JUST SCAN COUNT
0197 48     = 614         ORL A,R0       ;FORM TABLE STATUS ADDRESS
0198 17     = 615         INC A          ;INCREMENT TO CORRECT FOR FIRST DECREMENT
0199 A8     = 616         MOV R0,A       ;SAVE ADDRESS IN R0
            = 617
            = 618         ;LOAD SCAN ADDRESS INTO SCAN BOARD & ENTER OP AMP DELAY LOOP
            = 619
019A 15     = 620 RESCAN: DIS I          ;DISABLE EXTERNAL INTERRUPTS
019B 35     = 621         DIS TCNTI      ;DISABLE T1 INTERRUPTS
019C 09     = 622         IN A,P1        ;GET PORT 1 STATUS
019D 53F8   = 623         ANL A,#0F8H    ;KILL LAST 3 BITS
019F 4A     = 624         ORL A,R2       ;ADD IN SCAN COUNT
01A0 39     = 625         OUTL P1,A      ;PUTS THE SCAN ADDRESS TO SCANNER BOARD ON P1
01A1 25     = 626         EN TCNTI       ;ENABLE T1 INTERRUPTS
01A2 05     = 627         EN I           ;ENABLE EXTERNAL INTERRUPTS
01A3 BC2F   = 628         MOV R4,#2FH    ;SETS OP AMP LOOP DELAY COUNTER TO 4
01A5 00     = 629 AMPDLY: NOP            ;LOOP POINT
01A6 ECA5   = 630         DJNZ R4,AMPDLY ;DECREMENT PORTION OF OP AMP DELAY LOOP
            = 631
            = 632         ;READ NEW SCAN DATA
            = 633
01A8 0D     = 634         MOVD A,P5      ;READ HIGH NIBBLE OF NEW SCAN DATA
01A9 47     = 635         SWAP A         ;PUT HIGH DATA NIBBLE INTO HIGH NIBBLE OF A
01AA A9     = 636         MOV R1,A       ;R1=(HND)(0)
01AB 0C     = 637         MOVD A,P4      ;GET LOW DATA NIBBLE
01AC 49     = 638         ORL A,R1       ;A=(HND)(LND)=ND
01AD 37     = 639         CPL A          ;MAKES + INPUTS=1
01AE A9     = 640         MOV R1,A       ;PUTS N.D. INTO R1
            = 641
            = 642         ;TEST FOR A DATA CHANGE
```

```
                = 643
01AF C8         = 644           DEC R0          ;UPDATE ADDRESS TO STATUS TABLE
01B0 80         = 645           MOVX A,@R0      ;LOADS A WITH THE OLD STATUS WORD
01B1 D9         = 646           XRL A,R1        ;EXCLUSIVELY OR'S A & R1 TO OBTAIN THE ERROR
                = 647                           ;WORD
01B2 96B8       = 648           JNZ SCEXT       ;LEAVES THE SCAN ROUTINE IF THERE IS A DATA
                = 649                           ;CHANGE
01B4 EA9A       = 650           DJNZ R2,RESCAN  ;DECREMENT SCAN AND RETURN IF <>0
01B6 9ACF       = 651           ANL P2,#0CFH    ;SETS P2-4,5 TO 0,0 WHICH SHUTS SCAN BOARD OFF
01B8 83         = 652 SCEXT:    RET
                  653 $INCLUDE(:F1:SETT1)
                = 654                           ;SETT1 PROGRAM FORMATS THE 8048'S INTERNAL
                = 655                           ;TIMER FOR A TIME INTERVAL THAT IS A FUNCTION OF
                = 656                           ;   THE LOW COUNT LENGTH BYTE IN R2
                = 657                           ;   THE HIGH COUNT LENGTH BYTE IN R3
                = 658                           ;THE PROGRAM CONVERTS THE HIGH COUNT LENGTH BYTE FROM
                = 659                           ;T2'S FORMAT TO T1'S FORMAT AND THEN LOADS IT
                = 660                           ;INTO R7 OF RB1. THE LOW GOES TO THE TIMER COUNTER REGISTER
                = 661                           ;THE COUNTER INTERRUPT IS ENABLED AND THE
                = 662                           ;COUNTER IS STARTED.
                = 663
01B9 FB         = 664 SETT1:    MOV A,R3        ;LOADS A WITH THE HIGH COUNT LENGTH BYTE
01BA 533F       = 665           ANL A,#3FH      ;REMOVES TIMER MODE BITS OF T2
01BC 17         = 666           INC A           ;ADDS 1 COUNT OFFSET FOR T1'S TIMER
01BD B81F       = 667           MOV R0,#31D     ;LOADS R0 WITH ADD. OF HIGH BYTE OF T1'S COUNT
                = 668                           ;LENGTH WORD=R7 OF RB1
01BF A0         = 669           MOV@R0,A        ;STORES HIGH COUNT LENGTH BYTE IN R7 OF RB1
01C0 FA         = 670           MOV A,R2        ;LOADS A WITH LOW COUNT LENGTH BYTE.
01C1 62         = 671           MOV T,A         ;LOADS THE LOW COUNT LENGTH BYTE INTO T1'SREGISTER
01C2 25         = 672           EN TCNTI        ;ENABLE THE TIMER INTERRUPT.
01C3 55         = 673           STRT T          ;START TIMER 1.
01C4 83         = 674           RET
                  675 $INCLUDE(:F1:SETT2)
                = 676                           ;SETT2 PROGRAM FORMATS TIMER 2 IN THE 8155
                = 677                           ;FOR A TIME INTERVAL THAT IS A FUNCTION OF
                = 678                           ;THE FOLLOWING INFORMATION USING A AND R0
                = 679                           ;   LOW COUNT LENGTH BYTE IN R2
                = 680                           ;   HIGH COUNT LENGTH BYTE IN R3. THIS
                = 681                           ;   BYTE INCLUDES THE TIMER FORMAT WHICH IS
                = 682                           ;   TYPICALLY 1,0-SINGLE PULSE WITH NO RELOAD
                = 683                           ;THE COMMAND STATUS C/S WORD IS SET TO DO:
                = 684                           ;   BIT0=DEFINE PORTA=1=OUTPUT
                = 685                           ;   BIT1= "     "  B=0=INPUT
                = 686                           ;   BITS2,3=DEFINE PORTC=0,0=INPUT
                = 687                           ;   BITS4,5=PORTA,B INTERRUPTS=0,0=DISABLE
                = 688                           ;   BITS6,7=TIMER COMMAND=1,1=LOAD MODE,
                = 689                           ;   COUNT LENGTH WORD AND START TIMER
                = 690                           ;THE PROGRAM FORMATS P2 FOR BOTH THE I/O
                = 691                           ;MODE AND 8155 CHIP ENABLE. THE LOWER AND
                = 692                           ;UPPER COUNT LENGTH BYTES ARE THEN FORMED
                = 693                           ;AND LOADED FOLLOWED BY THE LOADING OF THE
                = 694                           ;C/S WORD WHICH STARTS THE TIMER. LASTLY,
                = 695                           ;P2 IS RESET TO THE MRY. MODE.
                = 696
01C5 8A40       = 697 SETT2:    ORL P2,#040H    ;SETS P2-6 TO 1 WHICH SELECTS THE I/O MODE
01C7 9A7F       = 698           ANL P2,#07FH    ;SETS P2-7 TO 0 FOR THE 8155 CHIP ENABLE
01C9 FA         = 699           MOV A,R2        ;LOADS A WITH THE LOW COUNT LENGTH BYTE
01CA 37         = 700           CPL A           ;CHANGES LOW COUNT LENGTH TO T2'S FORMAT
01CB B804       = 701           MOV R0,#004H    ;LOADS R0 WITH XRAM ADDRESS OF LOW COUNT LENGTH BYTE
01CD 90         = 702           MOVX@R0,A       ;LOADS THE LOW COUNT LENGTH BYTE INTO 8155
01CE FB         = 703           MOV A,R3        ;LOADS A WITH THE HIGH COUNT LENGTH BYTE.
01CF B805       = 704           MOV R0,#005H    ;LOADS R0 WITH XRAM ADDRESS OF HIGH COUNT LENGTH
                = 705                           ;BYTE.
01D1 90         = 706           MOVX@R0,A       ;LOADS THE HIGH COUNT LENGTH BYTE INTO 8155.
01D2 B800       = 707           MOV R0,#000H    ;LOADS R0 WITH XRAM ADDRESS OF THE C/S WORD.
01D4 23C1       = 708           MOV A,#0C1H     ;LOADS A WITH THE C/S WORD.
01D6 90         = 709           MOVX@R0,A       ;LOADS THE C/S WORD INTO 8155. TIMER T2 STARTS.
```

```
0223 97      = 844+            CLR C           ;CLEAR CARRY
0224 37      = 845+            CPL A           ;COMPL. ACCUM
0225 17      = 846+            INC A           ;COMPLETE 2'S COMPLEMENT SUBTRACTION
0226 68      = 847+            ADD A,R0        ;DO IT
             = 848                             ;THE HI LK#. A=SCAN ADDRESS.
             = 849
             = 850             ;STORE SCAN ADD. & CALCULATE GR#.
             = 851
0227 A8      = 852 CONVEC:     MOV R0,A        ;STORE S.A. IN R0
0228 FA      = 853             MOV A,R2        ;GET GHLW
0229 53F0    = 854             ANL A,#0F0H     ;KILL OFF LK#. LEAVE GR#.
             = 855
             = 856             ;LOAD & LATCH GR# INTO DECODING LATCH.
             = 857
022B 17      = 858             INC A           ;SETS BIT 0 TO 1 FOR P6 FORMATING
022C 8E      = 859             ORLD P6,A       ;SETS P6-0 TO 1 WHICH ENABLES THE STROBE ON THE
             = 860                             ;IN GRP SEL DECODER
022D 47      = 861             SWAP A          ;PUTS THE GR# INTO LOWER NIBBLE
022E 3C      = 862             MOVD P4,A       ;LOADS GR# INTO DECODER
022F 230E    = 863             MOV A,#0EH      ;FORMATS LOW NIBBLE FOR P6 CODING
0231 9E      = 864             ANLD P6,A       ;SETS P6-0 TO 0 WHICH LATCHES GR# INTO DECODER
             = 865
             = 866
             = 867             ;FORMAT P1 WITH SCAN ADDRESS
             = 868
0232 09      = 869             IN A,P1         ;GET P1'S STATUS
0233 53F0    = 870             ANL A,#0F0H     ;KILL LOWER NIBBLE
0235 48      = 871             ORL A,R0        ;ADD IN SCAN ADDRESS
0236 39      = 872             OUTL P1,A       ;PUTS THE SCAN ADDRESS TO SCAN BOARD ON P1
             = 873
             = 874             ;FORMAT P2 FOR SCAN BOARD INPUT ENABLE & TAKE SCAN DATA.
             = 875
0237 8A20    = 876             ORL P2,#20H     ;SETS P2-5,4 TO 1,0 WHICH DECODES TO 2 TO ENABLE SCAN BD
                                               ;TO
0239 B804    = 877             MOV R3,#04H     ;SETS UP SETTLING TIME COUNTER TO 4
023B 00      = 878 CVDLY:      NOP             ;LOOP POINT
023C EB3B    = 879             DJNZ R3,CVDLY   ;DECREMENT SETTLING TIME COUNTER
023E 0D      = 880             MOVD A,P5       ;READ HIGH NIBBLE OF SCAN DATA
023F 47      = 881             SWAP A          ;PUTS HIGH DATA NIBBLE INTO A'S HIGH NIBBLE BUSY DATA=0
0240 9ACF    = 882             ANL P2,#0CFH    ;SETS P2-5,4 TO 0,0 WHICH SHUTS SCAN BD OFF
             = 883
             = 884             ;DETERMINE WHICH BIT OF THE N.D. TO CHECK. CHECK & RESPOND TO IT.
             = 885
0242 B648    = 886             JF0 BIT7        ;IF F0=1 CHECK BIT 7 OF N.D.
0244 D256    = 887             JB6 ALR1        ;IF BIT 6=1,THE TRUNK RLY DID NOT CLOSE.GO TO ALRM
0246 444A    = 888             JMP LKTB        ;CONNECT HAS BEEN VERIFIED. UPDATE LK. TB.
0248 F256    = 889 BIT7:       JB7 ALR1        ;IF BIT 7=1,THE TRUNK RLY DID NOT CLOSE. GO TO ALRM
             = 890
             = 891             ;CONNECT HAS BEEN VERIFIED. UPDATE LINK TABLE. INCLUDING BIT 7
             = 892
024A FA      = 893 LKTB:       MOV A,R2        ;GET GHLW
024B 0350    = 894 LKTC:       ADD A,#50H      ;FORMAT LK. TB. ADD. IN A
024D A9      = 895             MOV R1,A        ;PUT L.T.A. IN R1
024E B829    = 896             MOV R0,#41D     ;GET ADD OF VAW
0250 F0      = 897             MOV A,@R0       ;GET VAW
0251 4380    = 898             ORL A,#80H      ;SETS BIT 7 =1 FOR BUSY STATUS
0253 91      = 899             MOVX@R1,A       ;UPDATE LINK TABLE
0254 4458    = 900             JMP CLDM        ;GO TO THE CLEAR DM SECTION
             = 901
             = 902             ;CALL ALARM ROUTINE
             = 903
0256 445E    = 904 ALR1:       JMP ALRDR       ;GO TO ALARM DIAGNOSTIC ROUTINE
             = 905
             = 906             ;CLEAR DM
             = 907
0258 27      = 908 CLDM:       CLR A           ;A=0
```

```
0259 B829   = 909          MOV R0,#41D     ;PUT DM ADR OF VAN IN R0
025B A0     = 910          MOV@R0,A        ;SET DM#41 TO 0
025C C8     = 911          DEC R0          ;PUT DM #40 ADD IN R0
025D A0     = 912          MOV@R0,A        ;SETS DM#40 TO 0
025E 0413   = 913 ALRDR:   JMP THIREX      ;LEAVE
            914 $INCLUDE(:F1:CORCL)
            = 915          ;CORCL IS TEX#3'S INTERRUPT BRANCH PROGRAM WHICH RESULTS FROM
            = 916          ;THE LAST ACTION IN A MATRIX CONNECT OPERATION WHICH GIVES THE
            = 917          ;CO RLY 30 MSEC. TO CLOSE. THIS PROGRAM DOES TWO THINGS
            = 918          ;IT FIRST DETERMINES IF THE CONNECT JUST MADE WAS TO THE VERTICAL
            = 919          ;THAT LAST WENT OFF HOOK. IF IT IS THEN F1 IS SET TO 1 TO PERMIT
            = 920          ;MORE VERTICALS TO BE SERVICED AND THE VAN AND GHLN KRY. LOCATIONS
            = 921          ;ARE RESET. FOLLOWING THIS IT CALLS
            = 922          ;CONNECT VERIFY PROGRAM, CONVER, WHICH TESTS FOR LOOP CURRENT
            = 923          ;FLOW IN THE TRUNK THAT HAS CONNECTED TO THE VERTICAL THROUGH
            = 924          ;THE REED IN QUESTION.
            = 925          ;IF THIS CONNECT IS NOT TO THE PENDING OFF HOOK VERTICAL, ONLY THE
            = 926          ;LINK TABLE IS UPDATED AND THE DM IS CLEARED. CONVER IS NOT CALLED
            = 927
            = 928          ;DOES THIS COT CONNECT VAN & GRN=THAT OF THE PENDING OFF HOOK REQUEST?
            = 929
0260 B824   = 930 CORCL:   MOV R0,#36D     ;GET DM ADD OF PENDING VAN
0262 F0     = 931          MOV A,@R0       ;GET THE PENDING VAN
0263 B829   = 932          MOV R0,#41D     ;R0=DM ADD OF VAN OF COT CONNECT
0265 D0     = 933          XRL A,@R0       ;COMPARE THE TWO VAN'S
0266 9679   = 934          JNZ CORCL1      ;LEAVE IF THE VAN'S ARE NOT =
0268 C8     = 935          DEC R0          ;R0=40D
0269 F0     = 936          MOV A,@R0       ;GET THE GHLN OF COT CONNECT
026A 53F0   = 937          ANL A,#0F0H     ;KILL LKS. A=GR0
026C B823   = 938          MOV R0,#35D     ;R0=DM ADD OF GR0 OF PENDING OFF HOOK REQUEST
026E D0     = 939          XRL A,@R0       ;COMPARE THE TWO GR0'S
026F 9679   = 940          JNZ CORCL1      ;LEAVE IF GR0'S ARE NOT =
            = 941
            = 942          ;SET F1 TO 1 AND DM#35&36 TO 0 SINCE THE PENDING VERTICAL HAS BEEN SERVICED
            = 943
0271 A5     = 944          CLR F1          ;F1=0
0272 B5     = 945          CPL F1          ;F1=1
0273 27     = 946          CLR A           ;A=0
0274 A0     = 947          MOV @R0,A       ;DM#35=0
0275 18     = 948          INC R0          ;R0=36D
0276 A0     = 949          MOV @R0,A       ;DM#36=0
            = 950
            = 951          ;GO TO THE CONNECT VERIFY ROUTINE
            = 952
0277 4409   = 953          JMP CONVER      ;GOES TO THE CONNECT VERIFY PROGRAM
            = 954
            = 955          ;GO UPDATE LINK TABLE AND DM AND RETURN FOR TERMINATING CALL
            = 956
0279 B828   = 957 CORCL1:  MOV R0,#40D     ;R0 POINTS TO DM#40D
027B F0     = 958          MOV A,@R0       ;GET THE GHLN
027C 444B   = 959          JMP LKTC        ;GO UPDATE THE LINK TABLE
            960 $INCLUDE(:F1:HOZWID)
            = 961          ;HOZWID IS TEX#4'S INTERRUPT BRANCH PROGRAM WHICH RESULTS
            = 962          ;FROM A HORIZONTAL SLEEVE THAT HAS BEEN BUSY FOR 50 MSEC.
            = 963          ;DURING WHICH TIME NO VERTICAL SLEEVE HAS GONE BUSY. THIS
            = 964          ;MEANS THAT THE VERTICAL THAT WAS CONNECTED TO THIS HORIZ.
            = 965          ;WAS NOT ASSIGNED TO THE RLS. THIS PROGRAM SIMPLY SETS F1
            = 966          ;TO 1 WHICH CLOSES THE VS CONNECT WINDOW AND PREVENTS ANY
            = 967          ;CONNECTION TO THIS HORIZ.
            = 968
027E B5     = 969 HOZWID:  CPL F1          ;SETS F1 TO 1
027F 0413   = 970          JMP THIREX      ;LEAVE
            971 $INCLUDE(:F1:RGGRRL)
            = 972          ;RGGRRL IS TEX# 6'S INTERRUPT BRANCH TABLE PROGRAM. IT OCCURS
            = 973          ;50 MSEC AFTER AN ORIGINATING CALL HAS BEEN COMPLETED AT THE COT
            = 974          ;THE ONLY ACTION OF THE PROGRAM IS TO TURN THE SCAN BOARD'S OUTPUT
            = 975          ;OFF. THIS WILL RELEASE THE GROUND FROM THE RING LEAD AT THE CO
```

```
                        = 976
0281 89C0               = 977  RGGRRL:  ORL  P1,#0C0H    ;SETS P1-7,6 TO 1,1. THIS RESETS THE SCAN BOARD AND
                        = 978                             ;REMOVES THE GROUND FROM THE RING LEAD AT THE CO
0283 0413               = 979           JMP  TMIREX      ;LEAVE
                          980 $INCLUDE(:F1:VRECON)
                        = 981           ;VRECON IS TEXW 7'S INTERRUPT BRANCH TABLE PROGRAM
                        = 982           ;IT OCCURS 50MSEC AFTER A VERTICAL SLEEVE LEAD HAS GONE
                        = 983           ;IDLE. ITS ONLY ACTION IS TO SET THE VAW AND GR# OF THE
                        = 984           ;LAST DISCONNECTED VERTICAL TO 0 IN DM#41&40. THIS WILL
                        = 985           ;REMOVE THIS VERTICAL FROM ANY FURTHER RECONNECT CONSIDERATIONS
                        = 986
0285 B828               = 987  VRECON:  MOV  R0,#40D     ;SET R0 TO POINT TO DM#40D
0287 27                 = 988           CLR  A           ;DO IT
0288 A0                 = 989           MOV  @R0,A       ;SETS GR#OF DISCONNECTED VERTICAL TO 0
0289 18                 = 990           INC  R0          ;R0 POINTS TO DM#41D
028A A0                 = 991           MOV  @R0,A       ;SETS VAW OF DISCONNECTED VERTICAL TO 0
028B 0413               = 992           JMP  TMIREX      ;LEAVE
                          993
                          994
                          995           ;MNCOTP IS THE MAIN PROGRAM USED BY THE COT. IT BEGINS BY CALLING RDGRN
                          996           ;WHICH READS THE MIN/MAX GR.# FROM THE EXTERNAL SWITCHES THRU PORT A
                          997           ;OF THE 8155. RDGRN THEN STORES THIS MIN/MAX GR# IN DM#38. IT ALSO
                          998           ;STORES THIS # PLUS 1 IN DM#39 WHERE IT IS USED AS THE LAST
                          999           ;GR# SCANNED AND IT CALLS CALSW WHICH FORMATS THE NEW SCANWORD
                         1000           ;THIS LEADS US TO "COSRT:" WHICH IS THE RETURN POINT FROM
                         1001           ;THE END OF THE MAIN PROGRAM. SCANS IS THEN CALLED AFTER WHICH
                         1002           ;THE ERROR WORD IS CHECKED FOR 0. IF IT IS 0,THE RCDCOM SECTION
                         1003           ;IS ENTERED FOLLOWED BY A RETURN TO "COSRT". IF IT IS NOT 0, THE
                         1004           ;DCPCOT PROGRAM IS ENTERED AND THE CHANGED IS RESPONDED TO.
                         1005
                         1006
028D B4E0                1007  COSRT:   CALL CALSW       ;CALCULATE THE NEXT SCANWORD
028F 8A20                1008           ORL  P2,#20H     ;SETS P2-5,4 TO 1,0 WHICH DECODES TO #2 & SETS SC BUS
                         1009                            ;ENABLE-A ON
0291 3485                1010           CALL SCANS       ;GO SCAN
0293 C6D0                1011  SCNRT:   JZ   EW0         ;GO TO RXDCOM IF EW=0(NO SCAN CHANGES)
                         1012
                         1013           ;DCPCOT PROCESSES A VERTICAL OR HORIZONTAL SLEEVE LEAD
                         1014           ;TRANSITION DETECTED BY SCANS WHICH SIGNIFIES EITHER A
                         1015           ;DISCONNECTED OR CONNECTED CALL
                         1016           ;HORIZONTIAL CHANGES ARE PROCESSED FIRST. THE GROUP HORIZONTAL
                         1017           ;LINK (GHL) ROUTINE IS CALLED. IT STORES THE GHL WORD=(G#)(HL#)
                         1018           ;IN R0.
                         1019           ;AN HS CONNECT OR DISCONNECT OPERATION IS DETERMINED. CONNECTS
                         1020           ;HAVE PRIORITY AND CONSIST OF RETURNING TO THE MAIN PROGRAM
                         1021           ;IF ANOTHER CONNECT IS STILL IN PROGRESS. IF NOT,THE GHL WORD
                         1022           ;IS STORED IN DM#37D,THE STATUS TABLE IS UPDATED,F1 IS CLEARED
                         1023           ;THE HS CONNECT WINDOW TIMER IS SET TO 50 MSEC AND STARTED.
                         1024           ;THIS SECTION ENDS WITH A CALL TO RESCAN THE SAME GROUP.
                         1025           ;FOR HS DISCONNECTS THE LINK TABLE IS SET TO 0,THE IF RELAY
                         1026           ;IS RELEASED AND THE DATA COM IS INFORMED
                         1027           ;THIS PROGRAM USES THE FOLLOWING DATA:
                         1028           ;    ACC=ERROR WORD=E.W.
                         1029           ;    R0=XRAM STATUS TABLE ADDRESS=S.T.A.=0,G3,G2,G1,G0,S2,S1,S0
                         1030           ;    R1=NEW DATA=N.D.
                         1031           ;    R2=SCAN ADDRESS=S.A.
                         1032           ;ALL OF RB1 IS USED
                         1033
                         1034           ;STORE DATA & DETERMINE IF A VERT. OR HORIZ. CHANGE HAS OCCURED
                         1035
                         1036
0295 AC                  1037  DCPCOT:  MOV  R4,A        ;STORES E.W. IN R4
0296 53C0                1038           ANL  A,#0C0H     ;KILL VS DATA A=HORIZONTAL ERROR WORD=H.E.W.
0298 AD                  1039           MOV  R5,A        ;STORE H.E.W. IN R5
0299 C6EB                1040           JZ   VSROUT      ;JUMP TO THE VERTICAL SLEEVE ROUTINE IF NO
                         1041                            ;HS CHANGES
                         1042
```

```
                1043        ;UPDATE HORIZ. DATA OF STATUS TABLE
                1044
029B 97         1045        CLR C           ;DO IT
029C 0340       1046        ADD A,#40H      ;FORCE A CARRY IF TWO HORIZ. HAVE CHANGED
029E E6A7       1047        JNC SINHO       ;GO TO SINOR IF CARRY=0(ONE HORZ. CHANGE)
02A0 F9         1048        MOV A,R1        ;GET N. D.
02A1 DC         1049        XRL A,R4        ;A=ND XOR EW=OD
02A2 F7         1050        RLC A           ;PUT MSB OF OD INTO CARRY
02A3 A7         1051        CPL C           ;CHANGE MSB OF OD TO NEW VALUE
02A4 67         1052        RRC A           ;PUT ND INTO CARRY WITH JUST ONE CHANGED HORIZ BIT
02A5 44AA       1053        JMP UPHRS       ;GO TO UPDATE HORIZ STATUS TABLE SECTION
02A7 F9         1054 SINHO: MOV A,R1        ;GET ND
02A8 DC         1055        XRL A,R4        ;A=ND XOR EW=OD
02A9 DD         1056        XRL A,R5        ;A=OD XOR NEW=HND
02AA 90         1057 UPHRS: MOVX @R0,A      ;UPDATE STATUS TABLE
02AB FC         1058        MOV A,R4        ;GET NEW
                1059
                1060
                1061
                1062        ;HORIZONTIAL SLEEVE ROUTINE
                1063
02AC B448       1064        CALL GHLRUT     ;CALL THE GROUP HORIZONTAL LINK ROUTINE
                1065                        ;STORE GHL WORD IN R0
                1066
                1067        ;IS CHANGE AN HS CONNECT OR DISCONNECT?
                1068
02AE FD         1069        MOV A,R5        ;GET H.E.W.
02AF 59         1070        ANL A,R1        ;A=CONNECT/DISCONNECT TEST WORD
02B0 96CE       1071        JNZ HSCONN      ;JUMP TO CONNECT ROUTINE IF=1
                1072
                1073        ;SET LINK TABLE TO 0 FOR HS DISCONNECT
                1074
02B2 F8         1075        MOV A,R0        ;GET GHL WORD
02B3 0350       1076        ADD A,#050H     ;ADD S.T. OFFSET TO OBTAIN LINK TABLE ADDRESS
02B5 A9         1077        MOV R1,A        ;STORES L.T.A. IN R1 KILLS N.D.
02B6 27         1078        CLR A           ;A=0
02B7 91         1079        MOVX @R1,A      ;UPDATE LINK TABLE TO 0
                1080
                1081        ;RELEASE IF RELAY
                1082
02B8 99FE       1083        ANL P1,#0FEH    ;SETS P1-0 TO 0 FOR IF DISCONNECT CODE
02BA F8         1084        MOV A,R0        ;GET GHL WORD
02BB 3C         1085        MOVD P4,A       ;LOADS LK # INTO P4
02BC 47         1086        SWAP A          ;PUTS GR# IN LOW NIBBLE
02BD 3D         1087        MOVD P5,A       ;LOADS GR# INTO P5
02BE 8A30       1088        ORL P2,#030H    ;SETS P2-5,4 TO 1,1 FOR IF BOARD ENABLE
02C0 9ACF       1089        ANL P2,#0CFH    ;SETS P2-5,4 TO 0,0 WHICH LATCHES GHLW INTO IF BD
02C2 0C         1090        MOVD A,P4       ;DUMMY READ-SETS P4 TO INPUT
02C3 0D         1091        MOVD A,P5       ;DUMMY READ-SETS P5 TO INPUT
                1092
                1093        ;FORMAT REGISTERS FOR A DISCONNECT XMDCOM. OPERATION
                1094
02C4 BD44       1095        MOV R5,#44H     ;FORMAT R5 FOR A XMDCOM DISCONNECT OPERATION
02C6 F8         1096        MOV A,R0        ;GET GHLW
02C7 AE         1097        MOV R6,A        ;STORE GHLW IN R6
02C8 BF00       1098        MOV R7,#000     ;SET R7 TO 0
02CA D41D       1099        CALL XDCOM2     ;CALL TRANSMIT DATA COM PROGRAM FOR A 2 BYTE CODE
02CC 648F       1100        JMP GOTORD      ;JUMP TO RECEIVE DATA COM PROG.
                1101
                1102        ;HS CONNECT. IS ANOTHER CONNECT IN PROGRESS?
                1103
02CE 76D2       1104 HSCONN: JF1 HSCNT1     ;IS ANOTHER HS CONNECT IN PROGRESS?
02D0 648F       1105 EW0:   JMP GOTORD
                1106
                1107        ;STORE GHL WORD IN DM#37D
                1108
02D2 F8         1109 HSCNT1: MOV A,R0       ;GET GHL WORD
```

```
0203 AE       1110        MOV R6,A       ;STORE GHL WORD IN R6
0204 B825     1111        MOV R0,#37D    ;GET DM ADDRESS
0206 A0       1112        MOV @R0,A      ;STORE GHL WORD IN DM#37D
              1113
              1114
0207 A5       1115        CLR F1         ;SETS F1 TO 0 INDICATING AN HS CONN HAS OCCURED
              1116
              1117        ;SET HS CONN TIMER WINDOW INTERVAL
              1118
0208 B904     1119        MOV R1,#004H   ;LOADS R1 WITH TEXW FOR ENDING THE HS CONN
              1120                       ;WINDOW(SET F1 TO1)
02DA BAF0     1121        MOV R2,#0F0H   ;LOADS R2 WITH LOW COUNT LENGTH BYTE( 100 MSEC
              1122                       ;TOTAL TIME) IN T1'S UP COUNT FORMAT.
02DC BB85     1123        MOV R3,#085H   ;LOADS R3 WITH HIGH COUNT LENGTH BYTE IN T2'S
              1124                       ;DOWN COUNT FORMAT
              1125
02DE 34DA     1126        CALL FTM1      ;CALLS THE TIMER FORMAT PROGRAM
              1127
              1128        ;GO RESCAN SAME GROUP
              1129
02E0 FE       1130        MOV A,R6       ;GET GHL WORD
02E1 53F0     1131        ANL A,#0F0H    ;KILLS LOW NIBBLE
02E3 0307     1132        ADD A,#007     ;SETS LOW NIBBLE FOR SCAN ADDRESS=7. A=SCAN WORD
02E5 8A20     1133        ORL P2,#20H    ;SETS P2-5,4 TO 1,0 WHICH DECODES TO #2 & SETS SC BUS
              1134                       ;ENABLE-A  ON
02E7 3485     1135        CALL SCANS     ;RESCAN SAME GROUP
02E9 4493     1136        JMP SCNRT      ;RETURN TO THE NORMAL END OF SCANS
              1137
              1138        ;A VERTICAL SLEEVE (VS) CONNECT OR DISCONNECT CHANGE
              1139        ;IS DETERMINED. CONNECTS HAVE PRIORITY AND CONSIST OF
              1140        ;RETURNING IF NO HS CONNECT HAS BEEN DETECTED. IF ONE
              1141        ;HAS THEN THE HS TIMER WINDOW IS RESET AND F1 IS SET TO 1.
              1142        ;THE YAW IS CALCULATED FOLLOWED BY THE
              1143        ;UPDATING OF THE STATUS AND LINK TABLES. A DETERMINATION
              1144        ;OF THE TYPE OF CALL (TERMINATING OR ORIGINATING) IS
              1145        ;MADE. IF TERMINATING, A FURTHER TEST IS MADE TO DETERMINE
              1146        ;IF THIS IS A RECONNECT OR NOT. IF IT ISN'T THEN
              1147        ; THE IF RELAY IS ENERGIZED BUT
              1148        ;THE TEMPORARY SEIZURE ONE SHOT (TSOS) IS DISABLED
              1149        ;IF IT IS THE TSOS IS ENABLED AND THE IF RELAY IS ENERGIZED
              1150
              1151        ;IF ORIGINATING, THE IF RELAY IS ENERGIZED AND THE
              1152        ;TSOS IS ENABLED FOLLOWED BY THE STARTING OF THE
              1153        ;RING LEAD GROUND  DISCONNECT TIMER. THE DATA
              1154        ;COM IS UPDATED IN ALL CASES.
              1155        ;A VERTICAL DISCONNECT CAUSES AN UPDATING OF THE STATUS TABLE
              1156        ;FOLLOWED BY STORING THE YAW AND GR# OF THIS DISCONNECT IN DM
              1157        ;AND THE STARTING OF THE VERTICAL DISCONNECT WINDOW. THIS
              1158        ;ALLOWS THIS VERTICAL TO BE PROCESSED AS A RECONNECTED VERTICAL
              1159        ;IF A HORIZONTAL IS RECONNECTED TO IT WITHIN 50 MSEC
              1160
              1161        ;IS CHANGE A VS CONNECT OR DISCONNECT?
              1162
02EB F9       1163 VSROUT: MOV A,R1      ;GET N.D.
02EC 5C       1164        ANL A,R4       ;CHECKS FOR 0=DISCONNECT,1=CONNECT
02ED C6F1     1165        JZ VSDIS       ;JUMPS TO DISCONNECT ROUTINE IF=0
02EF 6416     1166        JMP VSCONN     ;JUMPS TO CONNECT ROUTINE IF=1
              1167
              1168        ;UPDATE STATUS TABLE FOR A DISCONNECT
              1169
02F1 F9       1170 VSDIS: MOV A,R1       ;GET N.D.
02F2 90       1171        MOVX@R0,A      ;UPDATE STATUS TABLE
              1172
              1173        ;CALCULATE THE GR# AND STORE IT IN DM#40
              1174
02F3 F8       1175        MOV A,R0       ;GET THE S.T.A
02F4 E7       1176        RL A           ;PUT GR# IN HIGH NIBBLE
```

```
02F5 53F0       1177              ANL A,#0F0H      ;KILL LOW NIBBLE  A=(GR#)(0)
02F7 B828       1178              MOV R0,#40D      ;SET R0 TO POINT TO DM#40D
02F9 A0         1179              MOV @R0,A        ;STORE THE GR# OF THIS MOST RECENT VERTICAL
                1180                               ;DISCONNECT IN DM#40D
02FA 6400       1181              JMP CVRW         ;JUMP ACROSS END OF PAGE
0300            1182              ORG 300H         ;PAGE
                1183
                1184              ;CALCULATE THE VRW AND STORE IN DM#41D
                1185
                1186 CVRW:        VRWC R4,R2,R6    ;CALL VRWC MACRO
0300 BEFF       1187+             MOV R6,#0FFH     ;SETS BPC UP AS A COUNTER
0302 FC         1188+             MOV A,R4         ;GETS THE EW
0303 67         1189+??0001: RRC A                 ;CHECK LSB
0304 1E         1190+             INC R6           ;INCREMENT COUNTER
0305 E603       1191+             JNC ??0001       ;GO UNTIL ERROR BIT IS FOUND
0307 FE         1192+             MOV A,R6         ;GET BIT ERROR POSITION #
0308 47         1193+             SWAP A           ;PUT POSITION # IN HIGH NIBBLE
0309 6A         1194+             ADD A,R2         ;ADD IN SCAN ADDRESS. A=VERTICAL ADDRESS
                1195+                              ;WORD=VRW
030A 18         1196              INC R0           ;SET R0 TO POINT TO DM#41D
030B A0         1197              MOV @R0,A        ;STORE THE VRW OF THIS MOST RECENT VERTICAL
                1198                               ;DISCONNECT IN DM#41D
                1199
                1200              ;SET THE VERTICAL TIMER TO 50MSEC
                1201
030C B907       1202              MOV R1,#007      ;LOAD R1 WITH TEXW FOR RESETTING DM#40&41 TO 0
030E BA80       1203              MOV R2,#080H     ;LOAD R2 WITH LOW COUNT LENGTH BYTE FOR 50 MSEC TOTAL TIME
0310 BB82       1204              MOV R3,#082H     ;LOAD R3 WITH HIGH COUNT LENGTH BYTE
0312 34DA       1205              CALL FTM1        ;CALL THE TIMER FORMAT PROGRAM. DM#40&41 WILL BE
                1206                               ;SET TO 0 IN 50MSEC. THIS WILL REMOVE THIS
                1207                               ;VERTICAL FROM ANY FURTHER RECONNECT CONSIDERATIONS
                1208
0314 648F       1209              JMP GOTORD
                1210
                1211              ;IS AN HS CONNECT IN PROGRESS?
                1212
0316 761C       1213 VSCONN:      JF1 RROG         ;GO TO RESCAN REST OF GROUP IF F1=1
                1214
                1215              ;NOTE: AT THIS POINT A ROUTINE COULD BE ADDED TO DETERMINE
                1216              ;IF TWO VS CONNECTS HAVE OCCURED
                1217
0318 F8         1218              MOV A,R0         ;GET S.T.A.
0319 AF         1219              MOV R7,A         ;STORE S.T.A. IN R7
031A 642E       1220              JMP STOTMR       ;GO TO STOP TIMER ROUTINE SINCE F1=0
                1221
                1222              ;GO RESCAN REST OF GROUP
                1223
031C FA         1224 RROG:        MOV A,R2         ;GET CURRENT S A
031D 07         1225              DEC A            ;DETERMINE IF S A=1
031E 9622       1226              JNZ SCAGR1       ;GO TO SCAN ADD. >1 IF A NOT=0
0320 648F       1227              JMP GOTORD       ;IF A=0,THE LAST SCAN ADDRESS HAS BEEN SCANED. SO LEAVE
0322 F8         1228 SCAGR1:      MOV A,R0         ;GET S T A
0323 E7         1229              RL A             ;PUTS GR# IN HIGH NIBBLE
0324 53F0       1230              ANL A,#0F0H      ;KILLS LOWER NIBBLE
0326 6A         1231              ADD A,R2         ;FORMS OLD SCANWORD
0327 07         1232              DEC A            ;FORMS NEW SCAN WORD
0328 8A20       1233              ORL P2,#20H      ;SETS P2-5,4 TO 1,0 WHICH DECODES TO #2 & SETS SC BUS
                1234                               ;ENABLE-A ON
032A 3485       1235              CALL SCANS       ;RESCAN NEXT S A OF SAME GROUP
032C 4493       1236              JMP SCNRT        ;RETURN TO THE END OF SCANS
                1237
                1238              ;DETERMINE WHICH TIMER IS IN USE AND STOP IT
                1239
032E B820       1240 STOTMR:      MOV R0,#32D      ;LOAD R0 WITH ADDRESS OF T1'S TEXW
0330 F0         1241              MOV A,@R0        ;GET T1'S TEXW
0331 D304       1242              XRL A,#004       ;TESTS FOR TEXW =004 =TIMER EXIT WORD OF
```

```
                   1243                        ;HS CONNECT WINDOW
0333 C637          1244          JZ T1RST      ;IF NOT 0, THEN T2 IS IN USE. GO RESET IT
0335 643C          1245          JMP T2RST     ;GO RESET T2 SINCE T1 IS NOT BEING USED
0337 27            1246 T1RST:   CLR A         ;DO IT
0338 A0            1247          MOV @R0,A     ;SET T1'S TEXW TO 0 @ DM#32D
0339 65            1248          STOP TCNT     ;STOP T1
033A 644A          1249          JMP VSCNT1    ;JUMP TO VS CONTINUE 1
033C 18            1250 T2RST:   INC R0        ;LOAD R0 WITH ADDR. OF T2'S TEXW (DM#33)
033D 27            1251          CLR A         ;DO IT
033E A0            1252          MOV @R0,A     ;SET T2'S TEXW TO 0 @ DM#33D
033F 8A40          1253          ORL P2,#040H  ;SETS P2-6 TO 1 WHICH SELECTS THE I/O MODE
                   1254                        ;OF 8155
0341 9A7F          1255          ANL P2,#07FH  ;SETS P2-7 TO 0 FOR 8155 CHIP SELECT
0343 2341          1256          MOV A,#041H   ;LOADS A WITH THE C/S STOP T2 WORD
0345 B800          1257          MOV R0,#000   ;LOADS R0 WITH THE XRAM ADDRESS OF THE C/S WORD
0347 90            1258          MOVX@R0,A     ;LOADS THE C/S WORD INTO THE 8155. STOPS T2
0348 9ABF          1259          ANL P2,#0BFH  ;SETS P2-3 TO 0 FOR RAM SELECT
                   1260
034A B5            1261 VSCNT1:  CPL F1        ;SETS F1 TO 1
                   1262
                   1263          ;CALCULATE VAW & STORE IN R6
                   1264
                   1265
                   1266          VAWC R4,R2,R6 ;CALL VAWC MACRO.
034B BEFF          1267+         MOV R6,#0FFH  ;SETS BPC UP AS A COUNTER
034D FC            1268+         MOV A,R4      ;GETS THE EW
034E 67            1269+??0002:  RRC A         ;CHECK LSB
034F 1E            1270+         INC R6        ;INCREMENT COUNTER
0350 E64E          1271+         JNC ??0002    ;GO UNTIL ERROR BIT IS FOUND
0352 FE            1272+         MOV A,R6      ;GET BIT ERROR POSITION #
0353 47            1273+         SWAP A        ;PUT POSITION # IN HIGH NIBBLE
0354 6A            1274+         ADD A,R2      ;ADD IN SCAN ADDRESS. A=VERTICAL ADDRESS
                   1275+                       ;WORD=VAW
0355 AE            1276          MOV R6,A      ;STORE VAW IN R6
                   1277
                   1278          ;UPDATE STATUS TABLE
                   1279
0356 FF            1280          MOV A,R7      ;GET THE S.T.A.
0357 A8            1281          MOV R0,A      ;PUT S.T.A. IN R0
0358 F9            1282          MOV A,R1      ;GET ND
0359 90            1283          MOVX@R0,A     ;UPDATE STATUS TABLE
                   1284
                   1285          ;CALCULATE LINK TABLE ADDRESS AND UPDATE WITH VAW
                   1286
035A B825          1287          MOV R0,#37D   ;GET ADDRESS OF GHL WORD
035C F0            1288          MOV A,@R0     ;GET GHL WORD
035D AF            1289          MOV R7,A      ;STORE GHL WORD IN R7
035E 0350          1290          ADD A,#050H   ;ADD IN S.T.A. OFFSET TO GET LINK TABLE ADD.
0360 A8            1291          MOV R0,A      ;LOAD R0 WITH LK. ADD.
0361 FE            1292          MOV A,R6      ;GET VAW
0362 90            1293          MOVX@R0,A     ;UPDATE LINK TABLE
                   1294
                   1295          ;IS THIS AN ORIGINATING OR TERMINATING CALL?
                   1296
0363 B823          1297          MOV R0,#35D   ;GET ARRRESS OF GROUP # OF LAST
                   1298                        ;OFF HOOK CHANNEL
0365 F0            1299          MOV A,@R0     ;GET THIS GROUP#
0366 DF            1300          XRL A,R7      ;COMPARE THIS GROUP# TO THE HS CONNECT
                   1301                        ;GHLW
0367 53F0          1302          ANL A,#0F0H   ;KILL LOW NIBBLE
0369 9693          1303          JNZ TERM1     ;JUMP TO TERMINATING MODE SINCE THE GROUP
                   1304                        ;#'S ARE NOT =
036B 18            1305          INC R0        ;GET ADDRESS OF VAW OF LAST OFF HOOK CHANNEL
036C F0            1306          MOV A,@R0     ;GET THIS VAW
036D DE            1307          XRL A,R6      ;COMPARE THIS VAW TO THE CONNECT VAW
036E 9693          1308          JNZ TERM1     ;JUMP TO TERMINATING MODE SINCE THE VAW'S
                   1309                        ;ARE NOT =
                   1310
```

```
                 1311           ;SET DM#35D&36D TO 0
                 1312
0370 27          1313           CLR A           ;A=0
0371 A0          1314           MOV @R0,A       ;DM#36D=0
0372 C8          1315           DEC R0          ;SET DM ADD TO 35D
0373 A0          1316           MOV @R0,A       ;DM #35=0
                 1317
                 1318           ;SET RING LEAD GROUND RELEASE TO 50MSEC
                 1319
0374 B906        1320           MOV R1,#006     ;LOAD R1 WITH TEXW FOR TURNING THE SCAN BOARD OFF
                 1321                           ;BY MAKING P1-6,7=1,1
0376 BA80        1322           MOV R2,#080H    ;LOAD R2 WITH LOW COUNT LENGTH BYTE FOR 50MSEC TOTAL TIME
0378 BB82        1323           MOV R3,#082H    ;LOAD R3 WIYH HIGH COUNT LENGTH BYTE
037A 340A        1324           CALL FTM1       ;CALL TIMER FORMAT PROGRAM. RING LEAD GROUND WILL
                 1325                           ;RELEASE IN 50MSEC
                 1326
                 1327           ;ENERGIZE IF RELAY AND ENABLE TSOS FOR ORIGINATING CALL
                 1328
037C 8901        1329 TSOSE:    ORL P1,#001     ;SET P1-0 TO 1 FOR IF CONNECT CODE
037E 23FB        1330           MOV A,#0FBH     ;PREPARES A FOR P6 FORMATING
0380 9E          1331           ANLD P6,A       ;SETS P6-2 TO 0 FOR TSOS ENABLE
0381 FF          1332           MOV A,R7        ;GET GHL WORD
0382 3C          1333           MOVD P4,A       ;LOADS P4 WITH LK#
0383 47          1334           SWAP A          ;PUTS GR# IN LOW NIBBLE
0384 3D          1335           MOVD P5,A       ;PUTS GR# INTO P5
0385 8A30        1336           ORL P2,#030H    ;SETS P2-5,4 TO 1,1 FOR IF BUS ENABLE
0387 9ACF        1337           ANL P2,#0CFH    ;SETS P2-5,4 TO 0,0 WHICH LATCHES GHLW INTO IF BD
0389 0C          1338           MOVD A,P4       ;DUMMY READ-SETS P4 TO INPUT
038A 0D          1339           MOVD A,P5       ;DUMMY READ-SETS P5 TO INPUT
                 1340
                 1341           ;FORMAT REGISTERS FOR A CONNECT XMDCOM OPERATION
                 1342
038B BD64        1343 TERCON:   MOV R5,#64H     ;FORMAT R5 FOR A CONNECT OPERATION
038D D422        1344 GOTOXD:   CALL XDCOM3     ;DO IT
038F F408        1345 GOTORD:   CALL RXDCOM     ;DO IT
0391 4480        1346           JMP COSRT       ;GO START THE MAIN COT PROGRAM AGAIN
                 1347
                 1348           ;IS THIS A RECONNECT TO THE PENDING DISCONNECTED VERTICAL?
                 1349
0393 B828        1350 TERM1:    MOV R0,#40D     ;R0 POINTS TO DM ADDRESS OF MOST RECENT DISCONNECTED
                 1351                           ;VERTICAL
0395 F0          1352           MOV A,@R0       ;GET THIS GR#
0396 DF          1353           XRL A,R7        ;COMPARE THIS GR# TO THE GHLW OF THE HS CONN
0397 53F0        1354           ANL A,#0F0H     ;KILL LOW NIBBLE
0399 96A2        1355           JNZ TERM2       ;JUMP TO TERMINATING CALL SINCE GR#'S ARE NOT=
039B 18          1356           INC R0          ;GET DM ADDRESS OF VAW OF MOST RECENT VERTICAL
                 1357                           ;DISCONNECT
039C F0          1358           MOV A,@R0       ;GET THIS VAW
039D DE          1359           XRL A,R6        ;COMPARE THIS VAW TO THE CONNECT VAW
039E 96A2        1360           JNZ TERM2       ;JUMP TO TERMINATING CALL SINCE THE VAW'S ARE NOT=
03A0 647C        1361           JMP TSOSE       ;JUMP TO TSOSE SINCE THIS IS A RECONNECT TO THE
                 1362                           ;PENDING DISCONNECTED VERTICAL
                 1363
                 1364           ;ENERGIZE IF RELAY AND DISABLE TSOS FOR TERMINATING CALL
                 1365
03A2 8901        1366 TERM2:    ORL P1,#001     ;SET P1-0, TO 1 FOR IF CONNECT CODE
03A4 2304        1367           MOV A,#04       ;PREPARES A FOR P6 FORMATING
03A6 8E          1368           ORLD P6,A       ;SETS P6-2 TO 1 FOR TSOS DISABLE
03A7 FF          1369           MOV A,R7        ;GET GHL WORD
03A8 3C          1370           MOVD P4,A       ;LOADS LK# INTO P4
03A9 47          1371           SWAP A          ;PUTS GR# INTO LOW NIBBLE
03AA 3D          1372           MOVD P5,A       ;LOADS GR# INTO P5
03AB 8A30        1373           ORL P2,#030H    ;SETS P2-5,4 TO 1,1 FOR IF BUS ENABLE
03AD 9ACF        1374           ANL P2,#0CFH    ;SETS P2-5,4 TO 0,0 WHICH LATCHES GHLW INTO IF BD
03AF 0C          1375           MOVD A,P4       ;DUMMY READ-SETS P4 TO INPUT
03B0 0D          1376           MOVD A,P5       ;DUMMY READ-SETS P5 TO INPUT
                 1377
```

```
0381 6488      1378         JMP TERCON      ;GO TO XDCOM FORMATING SECTION
0400           1379         ORG 400H        ;LEAVES ROOM FOR DIAGNOSTICS
               1380 $INCLUDE(:F1:MNRTP)
               =1381
               =1382
               =1383        ;MNRTP IS THE MAIN PROGRAM USED BY THE RT. IT BEGINS BY CALLING
               =1384        ; CALSW WHICH FORMATS THE NEW SCANWORD
               =1385        ;THIS LEADS TO "RTSRT:" WHICH IS THE RETURN POINT FROM
               =1386        ;THE END OF THE MAIN PROGRAM. SCANS IS THEN CALLED AFTER WHICH
               =1387        ;THE ERROR WORD IS CHECKED FOR 0. IF IT IS 0,THE RCDCRT SECTION
               =1388        ;IS ENTERED FOLLOWED BY A RETURN TO "RTSRT". IF IT IS NOT 0, THE
               =1389        ;DCPRT PROGRAM IS ENTERED AND THE CHANGE IS RESPONDED TO.
               =1390
0400 B4E0      =1391 RTSRT: CALL CALSW      ;CALCULATE THE NEXT SCANWORD
0402 8A20      =1392         ORL P2,#20H    ;SETS P2-5,4 TO 1,0 WHICH DECODES TO #2 & SETS SC
               =1393                        ;BUS ENABLE-A ON
0404 3485      =1394         CALL SCANS     ;GO SCAN
0406 C661      =1395         JZ RCDCON      ;JUMP TO RXDCOM IF EW=0(NO SCAN CHANGES)
               =1396
               =1397        ;DCPRT PROCESSES VERTICAL AND HORIZONTIAL TRANSITIONS IN THE
               =1398        ;RT AS DETECTED BY SCANS. VERTICAL CHANGES TO BUSY INDICATE
               =1399        ;AN OFF HOOK SUBSCRIBER REQUESTING SERVICE. VERTICAL CHANGES
               =1400        ;TO IDLE INDICATE A C.O. RELAY HAS CLOSED DUE TO A XPOINT
               =1401        ;CLOSURE. HORIZONTAL BUSY CHANGES INDICATE LOOP CURRENT FLOW
               =1402        ;ON THE TRUNK. IDLE CHANGES MEAN LOOP CURRENT HAS STOPPED
               =1403        ;FLOWING.
               =1404        ;HORIZONTAL CHANGES ARE PROCESSED FIRST FOLLOWED BY VERTICAL
               =1405        ;CHANGES,IF ANY. A HORIZONTAL CHANGE CAUSES AN UPDATE OF THE
               =1406        ;STATUS TABLE FOLLOWED BY A CALL OF GHLRUT. NEXT A
               =1407        ; DETERMINATION ,BUSY OR IDLE,OF THE TYPE OF CHANGE IS MADE.
               =1408        ;A BUSY CAUSES A FLAG TO BE SET WHICH IS THEN USED TO SET
               =1409        ;BIT 7 OF THE LINK TABLE TO 1, INDICATING A BUSY HORIZ
               =1410        ;. A TRUNK GOING IDLE CAUSES A FLAG TO BE SET WHICH WILL FORCE
               =1411        ;BIT 7 OF THE LINK TABLE DATA TO BE SET TO A 0. A CHECK IS THEN MADE
               =1412        ;FOR A TRUE ON HOOK VS. A DIAL PULSE BY USING T2 AS A DEBOUNCER
               =1413        ;WHICH WILL IGNORE ANY IDLES UNLESS THEY LAST FOR AT LEAST
               =1414        ;120 MSEC. EACH GROUP HAS A DOWN COUNTER IN DM WHICH IS JAMMED
               =1415        ;TO A COUNT OF 6 FOR EVER IDLE TRANSITION OF ANY OF THE TEN
               =1416        ;TRUNKS IN A GIVEN GROUP. IT IS DECREMENTED BY T2 EVERY 20
               =1417        ;MSEC. WHEN ANY OF THESE COUNTERS REACHES 0, A
               =1418        ;ROUTINE IS ENTERED WHICH CAUSES THE STATUS OF ALL THE BUSY
               =1419        ;TRUNKS IN THE COUNTER'S GROUP TO BE CHECKED. ANY THAT THE
               =1420        ;STATUS TABLE SAYS SHOULD BE IDLE ARE DISCONNECTED.
               =1421        ;THE VERTICAL SECTION FIRST DETERMINES IF A VERTICAL HAS
               =1422        ;INDEED CHANGED. IF ONE HAS, THE DEBOUNCE VERTICAL BITS
               =1423        ;IN THE SYSW ARE CHECKED FOR 0. IF NOT 0, THEN A VERTICAL
               =1424        ;CHANGE IS BEING PROCESSED AND NO ACTION IS TAKEN. IF 0
               =1425        ;THEN THE VERTICAL RESCAN FLAG,BIT 0 OF THE SYSW, IS TESTED
               =1426        ;FOR BEING = 1. IF IT IS 1, IT MEANS THAT THE PENDING ACTIVE
               =1427        ;VERTICAL IS READY TO BE RESCANED. THIS IS DONE AND IF AT
               =1428        ;LEAST 1 OF THE NEW VERTICAL CHANGES=THAT OF THE PENDING,
               =1429        ;THE CHANGE IS PROCESSED. IF NOT=1, IT WAS A TRANSIENT AND
               =1430        ;IS IGNORED. IF BIT 2 =0, THEN THIS IS THE FIRST OCCURANCE
               =1431        ;OF A CHANGED VERTICAL AND ITS EW AND STA ARE STORED IN
               =1432        ;DM WHERE IT BECOMES THE PENDING ACTIVE VERTICAL.
               =1433        ;FOLLOWING ALL THIS IF THE VERTICAL IS TO BE PROCESSED
               =1434        ;THE TYPE OF CHANGE,BUSY OR
               =1435        ;IDLE, IS DETERMINED. IF IDLE, THE STATUS TABLE IS UPDATED
               =1436        ;AND THE MAIN PROGRAM IS REJOINED. IF BUSY, A CHECK IS MADE
               =1437        ;TO DETERMINE IF THE LAST BUSY VERTICAL HAS BEEN SERVICED.
               =1438        ;IF NOT, THE MAIN PROGRAM IS REJOINED. IF IT HAS, F1 IS
               =1439        ;CLEARED INDICATING A PENDING OFF HOOK SUBSCRIBER, THE
               =1440        ;STATUS TABLE IS UPDATED, AND THE DATA COM IS CALLED.
               =1441        ;THE PROGRAM IS ENTERED WITH THE FOLLOWING DATA AVAILABLE:
               =1442        ;    ACC=ERROR WORD=EW
               =1443        ;    R0=XRAM STATUS TABLE ADDRESS=STA
               =1444        ;    R1=NEW DATA=ND
```

```
                =1445          ;    R2=SCAN ADDRESS=5A
                =1446          ;.   ACC THRU R4 ARE USED
                =1447          ;BIT 2 OF THE SYSW IS RESET TO 0 IF ANY ACTION IS TAKEN
                =1448
                =1449          ;STORE DATA AND DETERMINE IF A VERTICAL OR HORIZ. HAS CHANGED
                =1450
0408 AD         =1451 DCPRT:   MOV R5,A         ;STORE EW IN R5
0409 F9         =1452          MOV A,R1         ;GET ND
040A AC         =1453          MOV R4,A         ;STORE ND IN R4
040B F8         =1454          MOV A,R0         ;GET THE STA
040C AF         =1455          MOV R7,A         ;STORE STA IN R7
040D FD         =1456          MOV A,R5         ;GET EW
040E 53C0       =1457          ANL A,#0C0H      ;KILLS VER. DATA. A=HORIZONTAL ERROR WORD=HEW
0410 C647       =1458          JZ VROUT         ;JUMPS TO VERTICAL ROUTINE IF NO H'S CHANGED
                =1459
                =1460          ;UPDATE HORIZ. DATA OF STATUS TABLE
                =1461
0412 97         =1462          CLR C            ;DO IT
0413 0340       =1463          ADD A,#40H       ;FORCE A CARRY IF TWO HORIZ. HAVE CHANGED
0415 E61E       =1464          JNC SINHOR       ;GO TO SINGLE HORIZ IF CARRY=0(1 HOR. CHANGED)
0417 F9         =1465          MOV A,R1         ;GET N D
0418 DD         =1466          XRL A,R5         ;A=ND XOR EW=OD
0419 F7         =1467          RLC A            ;PUT MSB OF OD INTO CARRY
041A A7         =1468          CPL C            ;CHANGE MSB OF OD TO NEW VALUE
041B 67         =1469          RRC A            ;PUT ND INTO CARRY WITH JUST ONE CHANGED HORIZ BIT
041C 8423       =1470          JMP UPHRST       ;GO TO UPDATE HORIZ STATUS TABLE SECTION
041E FD         =1471 SINHOR:  MOV A,R5         ;GET EW
041F 53C0       =1472          ANL A,#0C0H      ;KILLS VERT. DATA. A=H.E.W
0421 D9         =1473          XRL A,R1         ;A=ND XOR HEW=HOD
0422 DD         =1474          XRL A,R5         ;A=HOD XOR EW=HND
0423 90         =1475 UPHRST:  MOVX @R0,A       ;UPDATE STATUS TABLE
                =1476
                =1477          ;CALL GHLRUT. GHLW IN R0
                =1478
0424 FD         =1479          MOV A,R5         ;GET THE EW
0425 B448       =1480          CALL GHLRUT      ;DO IT
                =1481
                =1482          ;IS HORIZ. CHANGE BUSY OR IDLE?
                =1483
0427 FC         =1484          MOV A,R4         ;GET ND
0428 53C0       =1485          ANL A,#0C0H      ;A=NEW HORIZ. DATA
042A 59         =1486          ANL A,R1         ;A=(NHD)&(EW)=IDLE/BUSY TEST WORD
042B 963A       =1487          JNZ HZBY         ;JUMP TO HORIZ BSY ROUTINE IF TRUNK CHANGE IS BUSY
042D BB00       =1488          MOV R3,#00H      ;SET R3(FLAG) TO 0 IF HORIZ IS IDLE
                =1489
                =1490          ;CALCULATE DM ADD. OF GROUP COUT. AND RESET DEBOUNCE COUNTER TO 6.
                =1491
042F F8         =1492          MOV A,R0         ;GET THE GHLW
0430 53F0       =1493          ANL A,#0F0H      ;KILL LOW NIBBLE
0432 035A       =1494          ADD A,#05AH      ;ADD REST OF DM CTR. ADD. TO GR#
0434 A9         =1495          MOV R1,A         ;LOADS R1 WITH DM CTR. ADD.
0435 2306       =1496          MOV A,#006       ;LOADS A WITH MAX. COUNT 6 FOR T2'S DEBOUNCE TIME
0437 91         =1497          MOVX @R1,A       ;SETS DM CTR. TO 6
0438 843C       =1498          JMP HZCON        ;BYPASS NEXT STEP
                =1499
                =1500          ;UPDATE BIT 7 OF LK TABLE TO 1 IF BUSY & 0 IF IDLE
                =1501
043A BB80       =1502 HZBY:    MOV R3,#80H      ;SETS R3 TO 80 IF HZ IS BUSY
043C F8         =1503 HZCON:   MOV A,R0         ;GET GHLW
043D 0350       =1504          ADD A,#50H       ;FORM LK. TB. ADD.
043F A8         =1505          MOV R0,A         ;PUT "  IN R0
0440 80         =1506          MOVX A,@R0       ;GET THE LK. TBLE DATA
0441 537F       =1507          ANL A,#7FH       ;SET BIT 7 TO 0
0443 4B         =1508          ORL A,R3         ;SET BIT 7 TO 1 IF BSY AND 0 IF IDLE
0444 90         =1509          MOVX @R0,A       ;UPDATE LK. TBLE. WITH NEW DATA
0445 FF         =1510          MOV A,R7         ;GET STA
```

```
0446 A8      =1511          MOV R0,A          ;PUT STA IN R0
             =1512
             =1513          ;VERTICAL ROUTINE. HAVE ANY VERTICALS CHANGED?
             =1514
0447 FD      =1515 VROUT:   MOV A,R5          ;GET THE EW
0448 533F    =1516          ANL A,#03FH       ;KILL HORIZ. DATA. A=VEW
044A C661    =1517          JZ RCDCON         ;RETURN IF NO VERTICALS HAVE CHANGED
             =1518
             =1519          ;TEST BITS 0,1,2 OF SYSW
             =1520
044C B922    =1521          MOV R1,#34D       ;SET R1 TO POINT TO SYSW
044E F1      =1522          MOV A,@R1         ;GET THE SYSW
044F 1261    =1523          JB0 RCDCON        ;LEAVE SINCE VER. DEB. TIMER IS STILL GOING
0451 3261    =1524          JB1 RCDCON        ;    "                "
0453 5263    =1525          JB2 SCANAG        ;TAKE 2ND SCAN SINCE TIMER HAS TIMED OUT
             =1526
             =1527          ;SET BITS 0,1,2 OF SYSW TO 1 & STORE EW & STA OF PENDING ACTIVE VERTICAL
             =1528
0455 4307    =1529          ORL A,#07H        ;SET BITS 0,1,2 OF SYSW TO 1
0457 A1      =1530          MOV @R1,A         ;UPDATE VERTICAL DEBOUNCE CTR. IN SYSW
0458 FD      =1531          MOV A,R5          ;GET THE EW
0459 533F    =1532          ANL A,#03FH       ;KILL HORIZ DATA. A=VERTICAL ERROR WORD(VEW)
045B B92A    =1533          MOV R1,#42D       ;POINT R1 TO DM#42D
045D A1      =1534          MOV @R1,A         ;STORE VEW OF PENDING ACTIVE VERTICAL IN DM#42
045E 19      =1535          INC R1            ;POINT R1 TO DM#43D
045F FF      =1536          MOV A,R7          ;GET THE STATUS TABLE ADDRESS
0460 A1      =1537          MOV @R1,A         ;STORE STA OF PENDING ACTIVE VERTICAL IN DM#43
0461 84C4    =1538 RCDCON:  JMP RCDCRT        ;GO TO RCDCOM
             =1539
             =1540          ;GET STA FROM DM AND CALCULATE GR#
             =1541
0463 B92B    =1542 SCANAG:  MOV R1,#43D       ;POINT R1 TO DM ADD OF STA
0465 F1      =1543          MOV A,@R1         ;GET THE STA OF PENDING ACTIVE VERTICAL
0466 A8      =1544          MOV R0,A          ;SAVE STA IN R0
0467 E7      =1545          RL A              ;SHIFT GR# TO HIGH NIBBLE
0468 53F0    =1546          ANL A,#0F0H       ;KILLS LOW NIBBLE. A=(GR#)(0)
             =1547
             =1548          ;LOAD & LATCH GR# INTO DECODING LATCH
             =1549
046A 17      =1550          INC A             ;SETS BIT 0=1 FOR P6 FORMATING
046B 8E      =1551          ORLD P6,A         ;SETS P6-0 TO 1 WHICH ENABLES THE IN GRP SEL DECODER
             =1552                            ;STROBE
046C 47      =1553          SWAP A            ;PUTS THE GR# INTO LOWER NIBBLE
046D 3C      =1554          MOVD P4,A         ;LOADS GR# INTO DECODER
046E 230E    =1555          MOV A,#0EH        ;FORMATS LOW NIBBLE FOR P6 DECODING
0470 9E      =1556          ANLD P6,A         ;SETS P6-0 TO 0 WHICH LATCHES GR# INTO DECODER
             =1557
             =1558          ;GET SCAN ADDRESS FROM STA
             =1559
0471 F8      =1560          MOV A,R0          ;GET THE STA
0472 5307    =1561          ANL A,#07H        ;A=(0)(SCAN ADDRESS)
0474 AA      =1562          MOV R2,A          ;STORE SA IN R2
             =1563
             =1564          ;FORMAT P1 WITH SCAN ADDRESS
             =1565
0475 15      =1566          DIS I             ;DISABLE EXT INTERRUPTS
0476 35      =1567          DIS TCNTI         ;DISABLE TI INTERRUPTS
0477 09      =1568          IN A,P1           ;GET P1
0478 53F0    =1569          ANL A,#0F0H       ;KILL LOW NIBBLE
047A 4A      =1570          ORL A,R2          ;ADD IN SCAN COUNT
047B 39      =1571          OUTL P1,A         ;PUTS THE SCAN ADDRESS TO SCAN BOARD
047C 25      =1572          EN TCNTI          ;ENABLE T1 INTERRUPTS
047D 05      =1573          EN I              ;ENABLE EXT INTERRUPTS
             =1574
             =1575          ;FORMAT P2 FOR SCAN BOARD A ENABLE,SET SETTLING TIME LOOP, & RESCAN
             =1576
```

```
047E 8A20    =1577           ORL P2,#20H         ;SETS P2-5,4 TO 1,0 WHICH DECODES TO 2 TO ENABLE SCAN
             =1578                               ;BOARD A
0480 BB04    =1579           MOV R3,#04H         ;SETS SETTLING TIME COUNTER TO 4
0482 00      =1580 SC2DLY:   NOP                 ;LOOP POINT
0483 EB82    =1581           DJNZ R3,SC2DLY      ;DECREMENT PORTION OF DELAY LOOP
0485 0D      =1582           MOVD A,P5           ;READ HIGH NIBBLE OF NEW SCAN DATA
0486 47      =1583           SWAP A              ;PUTS HIGH DATA NIBBLE INTO HIGH NIBBLE OF A
0487 AC      =1584           MOV R4,A            ;R4=(HND)(0)
0488 0C      =1585           MOVD A,P4           ;GET LOW DATA NIBBLE
0489 4C      =1586           ORL A,R4            ;A=(HND)(LND)=ND
048A 37      =1587           CPL A               ;MAKES + INPUTS=1
048B AC      =1588           MOV R4,A            ;R4=ND
             =1589
             =1590           ;GENERATE THE NEW ERROR WORD
             =1591
048C 80      =1592           MOVX A,@R0          ;GET OLD STATUS TABLE DATA
048D DC      =1593           XRL A,R4            ;A=NEW EW
048E 533F    =1594           ANL A,#03FH         ;KILL HORIZ DATA. A=NEW VEW
0490 AB      =1595           MOV R3,A            ;STORE NEW VEW IN R3
             =1596
             =1597           ;COMPARE NEW VEW TO OLD VEW
             =1598
0491 C9      =1599           DEC R1              ;R1=42D
0492 F1      =1600           MOV A,@R1           ;GET OLD VEW
0493 5B      =1601           ANL A,R3            ;COMPARE VEW'S. A=STEADY STATE VEW
0494 C6BE    =1602           JZ SETB20           ;LEAVE IF EW'S HAVE NO COMMON BIT=1
0496 AD      =1603           MOV R5,A            ;STORE NON 0 EW IN R5 FOR PROCESSING
             =1604
             =1605
             =1606           ;IS VERTICAL CHANGE TO BUSY OR IDLE?
             =1607
0497 5C      =1608           ANL A,R4            ;A=(VEW)&(ND)=VERTICAL IDLE/ BUSY TEST WORD
0498 C6BC    =1609           JZ VIDLE            ;JUMP TO VERTICAL IDLE ROUT. IF NO VERT'S WENT BUSY
             =1610
             =1611           ;HAS THE LAST VERTICAL SEIZURE BEEN PROCESSED?
             =1612
049A 769E    =1613           JF1 VCONT           ;IF F1=1, THE LAST VERTICAL HAS BEEN PROCESSED
049C 84C4    =1614           JMP RCDCRT          ;GO TO RCDCRT SINCE LST. VERT. HASN'T BEEN PROCESSED
             =1615
             =1616           ;CLEAR F1 AND UPDATE STATUS TABLE
             =1617
049E A5      =1618 VCONT:    CLR F1              ;SET F1 TO 0. INDICATES AN OFF HOOK SEIZURE REQUEST
049F FC      =1619           MOV A,R4            ;GET ND
04A0 90      =1620           MOVX@R0,A           ;UPDATE STATUS TABLE
             =1621
             =1622           ;CALCULATE VAW
             =1623
             =1624           VAWC R5,R2,R3       ;USE VAWC MACRO
04A1 BBFF    =1625+          MOV R3,#0FFH        ;SETS BPC UP AS A COUNTER
04A3 FD      =1626+          MOV A,R5            ;GETS THE EW
04A4 67      =1627+??0003:   RRC A               ;CHECK LSB
04A5 1B      =1628+          INC R3              ;INCREMENT COUNTER
04A6 E6A4    =1629+          JNC ??0003          ;GO UNTIL ERROR BIT IS FOUND
04A8 FB      =1630+          MOV A,R3            ;GET BIT ERROR POSITION #
04A9 47      =1631+          SWAP A              ;PUT POSITION # IN HIGH NIBBLE
04AA 6A      =1632+          ADD A,R2            ;ADD IN SCAN ADDRESS. A=VERTICAL ADDRESS
             =1633+                              ;WORD=VAW
             =1634
             =1635           ;LOAD VAW AND GR# INTO DM
             =1636
04AB B924    =1637           MOV R1,#36D         ;LOAD P1 WITH DM ADD OF VAW
04AD A1      =1638           MOV @R1,A           ;LOAD DM#36 WITH VAW
04AE AE      =1639           MOV R6,A            ;STORE VAW IN R6 FOR XDCOM
04AF F8      =1640           MOV A,R0            ;GET S.T.A
04B0 E7      =1641           RL A                ;PUT GR# IN HIGH NIBBLE
04B1 53F0    =1642           ANL A,#0F0H         ;KILL LOW NIBBLE. A=GR#
```

```
04B3 C9      =1643           DEC R1              ;R1=35D
04B4 A1      =1644           MOV @R1,A           ;LOAD GR# INTO DM#35D
04B5 AF      =1645           MOV R7,A            ;STORE GR# IN R7 FOR THE XDCOM
04B6 BD64    =1646           MOV R5,#64H         ;CONNECT CODE FOR THE XDCOM
04B8 D422    =1647           CALL XDCOM3         ;CALL XMIT DATA COM ROUTINE
04BA 84BE    =1648           JMP SETB20          ;GO TO RECEIVE DATA COM SECTION
             =1649
             =1650           ;VERTICAL IDLE ROUTINE. UPDATE STATUS TABLE
             =1651
04BC FC      =1652 VIDLE:    MOV A,R4            ;GET ND
04BD 90      =1653           MOVX@R0,A           ;UPDATE STATUS TABLE
             =1654
             =1655
             =1656           ;SET BIT 2 OF SYSW TO 0
             =1657
04BE B922    =1658 SETB20:   MOV R1,#34D         ;R1 POINTS TO DM#34D
04C0 F1      =1659           MOV A,@R1           ;GET THE SYSW
04C1 53FB    =1660           ANL A,#0FBH         ;SET BIT 2=0
04C3 A1      =1661           MOV@R1,A            ;STORE NEW SYSW IN DM
             =1662
04C4 F408    =1663 RCDCRT:   CALL RXDCOM         ;GO TO THE RECEIVE DATA COM PROG
04C6 84D4    =1664           JMP DEBOUP          ;GO TO DEBOUNCE SECTION
             =1665 $INCLUDE(:F1:DEBOU)
             1=1666          ;DEBOU IS TEXW#5'S INTERRUPT BRANCH PROGRAM. IT IS ONLY USED
             1=1667          ;IN THE RT WHERE IT IS GENERATED BY THE DEBOUNCE TIMER T2 EVERY
             1=1668          ;20 MSEC. ITS MAIN ACTION IS TO SET BIT 4 OF THE SYSTEM STATUS WORD
             1=1669          ;TO A 1. THIS BIT IS THEN TESTED AT THE END OF EVERY MNRTP CYCLE
             1=1670          ;WHERE IT WILL CAUSE THE MAIN PROGRAM TO DO A COMPLETE DEBOUNCE
             1=1671          ;ROUTINE IF IT IS SET TO A 1. DEBOU ALSO SETS T2'S TEXW IN DM#33
             1=1672          ;TO 05 TO KEEP T2 PERMANENTLY IN THE DEBOUNCE ROUTINE
             1=1673
             1=1674          ;SET BIT 4 OF SYSW TO 1
             1=1675
             1=1676
04C8 2310    1=1677 DEBOU:   MOV A,#10H          ;FORMATS A FOR DEBOUNCE FLAG
04CA B822    1=1678          MOV R0,#34D         ;SET R0 TO POINT TO SYSW IN DM
04CC 40      1=1679          ORL A,@R0           ;A=SYSW WITH BIT 4 =1
04CD A0      1=1680          MOV @R0,A           ;PUT NEW SYSW INTO DM#34
             1=1681
             1=1682          ;SET T2 TEXW TO 05
             1=1683
04CE C8      1=1684          DEC R0              ;SET R0 TO POINT TO DM#33
04CF 2305    1=1685          MOV A,#05           ;LOAD A WITH TEXW #05
04D1 A0      1=1686          MOV @R0,A           ;LOAD TEXW INTO DM#33
04D2 0413    1=1687          JMP TMIREX          ;LEAVE
             =1688 $INCLUDE(:F1:DEBOUP)
             1=1689          ;DEBOUP IS THE FINAL SEGMENT OF THE MNRTP PROGRAM. IT IS ENTERED
             1=1690          ;ONLY IF BIT-4 OF THE SYSW=1 WHICH MEANS THAT THE T2 DEBOUNCE TIMER
             1=1691          ;HAS TIMED OUT(20MSEC). ONCE ENTERED, THE VERTICAL DEBOUNCE ROUTINE IS FIRST SERVICED.
             1=1692          ;IF T1 IS IN USE, THE SYSW VERTICAL DEBOUNCE BITS 1,0 ARE CHECKED
             1=1693          ;FOR=1,1 OR 0,0. IF THEY ARE THEN EITHER THERE IS NO PENDING
             1=1694          ;VERTICAL(0,0) OR A VERTICAL IS PENDING BUT T1 HAS NOT BECOME FREE(1,1)
             1=1695          ;THIS INTERROGATION OF T1 FORCES THE VERTICAL DEBOUNCE TIMER TO REFRAME
             1=1696          ;FROM COUNTING UNTIL AFTER THE 20 MSEC CO RELAY DISCONNECT TIME HAS OCCURED
             1=1697          ;WHEN A VERTICAL CHANGE OCCURS DURING THE CO RELAY DEBOUNCE PROCESS
             1=1698          ;AFTER THIS THE MIN/MAX GR# IS FETCHED
             1=1699          ;FROM DM AND USED TO DETERMINE THE MIN AND MAX DEBOUNCE COUNTER
             1=1700          ;ADDRESSES WHICH RANGE FROM 5A TO EA IN DM. THERE IS ONE SUCH COUNTER
             1=1701          ;PER GROUP. THESE COUNTERS ARE SET TO #6 EVERY TIME A DISCONNECT IS
             1=1702          ;DETECTED IN ANY OF THE 10 HORIZONTALS SERVING THE GROUP. BIT 7 OF THE
             1=1703          ;LINK TABLE DATA IS SET TO 0 FOR A DISCONNECT. A CONNECT WILL SET THIS
             1=1704          ;BIT 7 TO 1 BUT WILL HAVE NO EFFECT ON THE COUNTERS. THIS PROGRAM
             1=1705          ;EXAMINES BIT 7 OF THE LINK TABLE DATA OF EACH BUSY HORIZ. IN A GROUP
             1=1706          ;WHEN IT FINDS ITS DEBOUNCE COUNTER=0. THOSE WHOSE BIT 7=0 ARE
             1=1707          ;DISCONNECTED. THIS THUS SIMULATES A SLOW TO RELEASE RELAY WHICH PREVENTS DIAL
             1=1708          ;PULSES FROM CAUSING PREMATURE CROSSPOINT DISCONNECTS. A HORIZ
```

```
                    1=1709          ;MUST BE IDLE FOR AT LEAST 120 MSEC. BEFORE A CROSSPOINT WILL
                    1=1710          ;BE DISCONNECTED. A,R0,R1,AND R2 ARE USED
                    1=1711
                    1=1712          ;IS BIT 4 OF THE SYSW=1?
                    1=1713
04D4 B822           1=1714 DEBOUP:  MOV R0,#34D      ;SET R0 TO POINT TO DM#34D
04D6 F0             1=1715          MOV A,@R0        ;GET THE SYSW
04D7 92DB           1=1716          JB4 DEBC01       ;IF BIT 4 =1, CONTINUE
04D9 8400           1=1717          JMP RTSRT        ;RETURN TO MAIN PROGRAM IF BIT 4=0
                    1=1718
                    1=1719          ;RESET BIT 4 OF SYSW
                    1=1720
04DB 53EF           1=1721 DEBC01:  ANL A,#0EFH      ;SET BIT 4 TO 0
04DD A9             1=1722          MOV R1,A         ;STORE NEW SYSW IN R1
04DE A0             1=1723          MOV @R0,A        ;PUT NEW SYSW INTO DM#34
                    1=1724
                    1=1725
                    1=1726          ;--------VERTICAL DEBOUNCE ROUTINE---------
                    1=1727
                    1=1728          ;IF T1 IS IN USE SET B0 OF SYSW=0
                    1=1729
04DF B820           1=1730          MOV R0,#32D      ;SET R0 TO POINT TO T1'S TEXW IN DM
04E1 F0             1=1731          MOV A,@R0        ;GET T1'STEXW
04E2 96EB           1=1732          JNZ T1IU         ;GO TEST SYSW IF T1 IS BUSY
04E4 F9             1=1733          MOV A,R1         ;GET THE SYSW
04E5 53FE           1=1734          ANL A,#0FEH      ;SET B0 OF SYSW=0
04E7 B822           1=1735          MOV R0,#34D      ;R1 POINTS TO DMA OF SYSW
04E9 A0             1=1736          MOV@R0,A         ;UPDATE SYSW
04EA A9             1=1737          MOV R1,A         ;STORE NEW SYSW IN R1
                    1=1738
                    1=1739          ;DO B0&B1 OF SYSW=0,0 OR 1,1?
                    1=1740
04EB F9             1=1741 T1IU:    MOV A,R1         ;GET THE SYSW
04EC 12F2           1=1742          JB0 X1           ;GO TO X,1 IF B0=1
04EE 32F4           1=1743          JB1 DECSTW       ;GO TO DEC THE SYSW SINCE B1,0=1,0
04F0 84F8           1=1744 LVVEDB:  JMP HZDEB        ;GO TO HZDEB SINCE B1,0=0,0 OR 1,1
04F2 32F0           1=1745 X1:      JB1 LVVEDB       ;GO TO HZDEB SINCE B1,0=1,1
04F4 07             1=1746 DECSTW:  DEC A            ;DEC THE SYSW
04F5 B822           1=1747          MOV R0,#34D      ;R0 POINTS TO SYSW
04F7 A0             1=1748          MOV@R0,A         ;UPDATE SYSW
                    1=1749
                    1=1750          ;FORMAT THE MIN DEBOUNCE COUNTER ADDRESS (DCA)
                    1=1751
04F8 B826           1=1752 HZDEB:   MOV R0,#38D      ;SET R0 TO POINT TO DM#38D
04FA F0             1=1753          MOV A,@R0        ;GET MIN/MAX GR#
04FB A8             1=1754          MOV R0,A         ;STORE THE MIN/MAX GR# IN R0
04FC 53F0           1=1755          ANL A,#0F0H      ;KILL MAX GR#. A=MIN GR# 0000
04FE 035A           1=1756          ADD A,#5AH       ;A=MIN DCA=(MIN GR# + 5)(A)
0500 AA             1=1757          MOV R2,A         ;STORE THE MIN DCA IN R2
                    1=1758
                    1=1759          ;FORMAT MAX DCA
                    1=1760
0501 F8             1=1761          MOV A,R0         ;GET MIN/MAX GR#
0502 47             1=1762          SWAP A           ;A=MAX/MIN GR#
0503 53F0           1=1763          ANL A,#0F0H      ;A=(MAX GR#)(0)
0505 036A           1=1764          ADD A,#6AH       ;ADD IN DCA OFFSET + 1. A=MAX DCA + 1 =(MAX GR#+6)(A)
0507 A8             1=1765          MOV R0,A         ;STORE MAX DCA IN R0
                    1=1766
                    1=1767          ;CHECK IF CURRENT DCA=MIN DCA
                    1=1768
0508 F8             1=1769 DEBRET:  MOV A,R0         ;A=CURRENT DCA. THIS SEEMINGLY REDUNDENT STEP SAVES CODE
0509 DA             1=1770          XRL A,R2         ;COMPARE CURRENT DCA TO THE MIN DCA IN R2
050A C633           1=1771          JZ DEBEX         ;LEAVE WHEN CURRENT DCA=MIN DCA
                    1=1772
                    1=1773          ;DEC THE CURRENT DCA, GET THE COUNT, AND SEE IF =0
                    1=1774
```

```
050C F8      1=1775           MOV A,R0        ;GET THE CURRENT DCA
050D 47      1=1776           SWAP A          ;A=(A)(GR#+5)
050E 07      1=1777           DEC A           ;A=(A)(GR#-1)+5
050F 47      1=1778           SWAP A          ;A=NEW DCA
0510 A8      1=1779           MOV R0,A        ;UPDATE R0 WITH NEW DCA
0511 80      1=1780           MOVX A,@R0      ;GET COUNT
0512 C608    1=1781           JZ DEBRET       ;EXAMINE NEXT COUNTER IF THIS COUNT=0
             1=1782
             1=1783           ;DECREMENT COUNT AND UPDATE COUNTER IN DM
             1=1784
0514 07      1=1785           DEC A           ;DECREMENT COUNT
0515 90      1=1786           MOVX @R0,A      ;UPDATE DM WITH NEW COUNT
             1=1787
             1=1788           ;CHECK FOR COUNT=0
             1=1789
0516 C61A    1=1790           JZ CE0          ;SERVICE TRUNKS IF =0
0518 A408    1=1791           JMP DEBRET      ;EXAMINE NEXT COUNTER IF NOT=0
             1=1792
             1=1793           ;FORMAT MIN LINK TABLE ADD
             1=1794
051A BD00    1=1795  CE0:     MOV R5,#00H     ;SET THE DISCONNECT FLAG TO 0
051C F8      1=1796           MOV A,R0        ;GET THE DCA
051D 53F0    1=1797           ANL A,#0F0H    ;KILL LOW NIBBLE. A=(GR#+5)(0)=GR#X16 + 50H=
             1=1798                           ;MIN LK TBL ADD IN GR
051F AC      1=1799           MOV R4,A        ;STORE MIN LK TAB ADD IN R4
             1=1800
             1=1801           ;GET LINK TABLE DATA AND TEST IT
             1=1802
0520 FC      1=1803  LKTBDA:  MOV A,R4        ;GET THE LK. TB. ADD.
0521 A9      1=1804           MOV R1,A        ;STORE THE LK. TB. ADD. IN R1
0522 81      1=1805           MOVX A,@R1      ;GET THE LINK TABLE DATA
0523 9637    1=1806           JNZ DEBC02      ;CONTINUE IF DATA NOT=0(BUSY HORIZ)
             1=1807
             1=1808           ;INC LK TABLE ADD AND CHECK FOR MAX
             1=1809
0525 FC      1=1810  INLKAD:  MOV A,R4        ;GET LK TB ADD.
0526 17      1=1811           INC A           ;INCREMENT LINK TB ADD
0527 AC      1=1812           MOV R4,A        ;PUT NEW LK TB ADD INTO R4
0528 530F    1=1813           ANL A,#0FH      ;KILL UPPER NIBBLE
052A D30A    1=1814           XRL A,#0AH      ;DOES LK TB ADD=MAX?
052C C630    1=1815           JZ ONEDIS       ;GO TEST THE DISCONNECT FLAG ,R5, IF=0.
052E A420    1=1816           JMP LKTBDA      ;EXAMINE DATA OF NEXT LINK
0530 FD      1=1817  ONEDIS:  MOV A,R5        ;GET THE "HAS A DISCONNECT OCCURED" FLAG
0531 C635    1=1818           JZ HDOFE0       ;GO TO NEXT COUNTER IF LK TB ADD=MAX
             1=1819                           ;AND NO DISCONNECTS HAVE OCCURED.
0533 8400    1=1820  DEBEX:   JMP RTSRT       ;LEAVE SINCE ONE DISCONNECT HAS ALREADY OCCURED.
0535 A408    1=1821  HDOFE0:  JMP DEBRET      ;GO TO NEXT COUNTER SINCE LK TB ADD=MAX
             1=1822
             1=1823           ;TEST BIT 7 OF LINK TABLE DATA FOR 1(BUSY) OR 0(IDLE)
             1=1824
0537 F225    1=1825  DEBC02:  JB7 INLKAD      ;IF BIT 7=1,HORIZ IS STILL BUSY. GO EXAMINE NEXT LINK
             1=1826
             1=1827           ;CALCULATE GHLW AND DISCONNECT TRUNK
             1=1828
0539 BDFF    1=1829           MOV R5,#0FFH    ;SET THE "HAS A DISCONNECT OCCURED" FLAG TRUE.
             1=1830                           ;THIS WILL ALLOW ONLY ONE DISCONNECT TO OCCUR
             1=1831                           ;PER CYCLE DUE TO A LACK OF REGISTERS.
053B 2350    1=1832           MOV A,#50H      ;GET LINK TABLE ADD. OFFSET
             1=1833           SUBAR R1        ;MACRO WHICH FORMS GHLW=LK TB. ADD. -50=R1-A
053D 97      1=1834+          CLR C           ;CLEAR CARRY
053E 37      1=1835+          CPL A           ;COMPL. ACCUM
053F 69      1=1836+          ADD A,R1        ;DO IT
0540 0301    1=1837+          ADD A,#01H      ;COMPLETE 2'S COMPLEMENT SUBTRACTION
0542 85      1=1838           CLR F0          ;FORMAT F0 FOR A DISCONNECT IN MXDIS
0543 AF      1=1839           MOV R7,A        ;STORES GHLW INTO R7 FOR USE BY MXDIS
0544 00      1=1840           NOP             ;THIS WILL CHANGE TO "CALL MXDIS" WHEN DEBOUP IS REINSERTED
```

```
0545 00      1=1841            NOP              ;PROVIDES ROOM FOR THE SECOND BYTE OF "CALL MXDIS"
0546 A425    1=1842            JMP INLKAD       ;GO TO NEXT LINK
             1843 $INCLUDE(:F1:GHLRUT)
             =1844             ;GHLRUT(GROUP HORIZONTAL LINK ROUTINE) IS A SUBROUTINE
             =1845             ;WHICH CALCULATES THE HORIZONTAL LINK # FROM THE ERROR
             =1846             ;WORD IN THE ACC AND THE SCAN ADDRESS IN R2.
             =1847             ;THE GROUP # IS FORMED FROM THE XRAM STATUS TABLE ADDRESS
             =1848             ;IN R0 .
             =1849             ;THESE TWO NIBBLES ARE COMBINED INTO A (G#)(HL#) BYTE IN R0
             =1850
0548 F24F    =1851 GHLRUT:     JB7 GHRT1        ;TEST FOR HS FROM 0 TO 6
054A FA      =1852             MOV A,R2         ;GET SCAN ADDRESS
054B 07      =1853             DEC A            ;ACCOUNT FOR TEST #'S
054C AB      =1854             MOV R3,A         ;STORE THE HL# IN R3
054D A453    =1855             JMP GHRT2        ;BYPASS GHRT1
054F FA      =1856 GHRT1:      MOV A,R2         ;GET SCAN ADDRESS
0550 0306    =1857             ADD A,#06H       ;ADD OFFSET FOR HL#7-9
0552 AB      =1858             MOV R3,A         ;STORE HL# IN R3
0553 F8      =1859 GHRT2:      MOV A,R0         ;GET STATUS TABLE ADDRESS
0554 E7      =1860             RL A             ;PUT G# IN HIGH NIBBLE
0555 53F0    =1861             ANL A,#0F0H      ;KILLS LOW NIBBLE
0557 6B      =1862             ADD A,R3         ;ADDS IN HL#
0558 A8      =1863             MOV R0,A         ;STORES GHL WORD IN R0
0559 83      =1864             RET
             1865 $INCLUDE(:F1:MXDIS)
             =1866             ;MXDIS/MXCON ARE USED AT THE RT ONLY . THEY ARE CALLED BY THE RCDCOM
             =1867             ;AND EITHER CONNECT (MXCON) OR DISCONNECT (MXDIS) A XPOINT.
             =1868             ;BOTH PROGRAMS USE ACC,R0,R1,R2,R3,R6,R7 AND CALL SOCPGM
             =1869             ;THE FOLLOWING VERTICAL ADDRESS WORD(VAW) IS IN R6
             =1870             ;VAW=B7(0);B6,5,4(3 BIT POSITION #);B3(0);B2,1,0(SCAN ADDRESS)
             =1871             ;THE FOLLOWING GROUP HORIZONTAL LINK WORD(GHLW) IS IN R7
             =1872             ;GHLW=B7,6,5,4(GROUP#);B3,2,1,0(HORIZONTAL LINK#)
             =1873             ;IF A DISCONNECT IS CALLED(MXDIS) F0 IS SET TO 1. THIS ASSUMES
             =1874             ;THAT IT WAS CLEARED BY RCDCOM BEFORE EITHER MXDIS OR
             =1875             ;MXCON WERE CALLED. THEN THE VAW OF THIS DISCONNECT IS RETRIVED
             =1876             ;FROM THE LINK TABLE . THE STATUS TABLE DATA OF THIS
             =1877             ;VAW IS SET TO 1 TO PREVENT A TRANSIENT CONNECT CAUSED BY THE
             =1878             ;DISCONNECT PROCESS FROM BEING DETECTED.
             =1879             ; THIS WILL FLOW INTO THE MXCON ENTRY
             =1880             ;POINT WHERE IT DETERMINES IF A MATRIX REED RLY. OPERATION IS IN PROGRESS.
             =1881             ;IF ONE IS,EXIT. IF NOT CONTINUE
             =1882             ;CALL SOCPGM WHICH SETS THE SCAN ADDRESS INTO BOTH THE "A" AND
             =1883             ;"B" SCAN BOARDS AND LOADS AND STROBES THE "B" BOARD
             =1884             ;NEXT DETERMINE IF A CONNECT OR DISCONNECT IS TO BE MADE BY CHECKING F0
             =1885             ;IF CONNECT THEN:
             =1886             ;     SET TIMER EXIT WORD(TEXW) IN R1 TO #01
             =1887             ;     SET P1 WITH HORIZ. LINK ADDRESS AND "A" BOARD ENABLE
             =1888             ;     TOGGLE OUT A LINE WHICH LOADS AND STROBES MATRIX BOARD
             =1889             ;IF DISCONNECT THEN:
             =1890             ;     SET TEXW IN R1 TO #02
             =1891             ;NOW DETERMINE IF TIMER1 OR TIMER2 IS AVAILABLE
             =1892             ;IF TIMER1 IS USED ,LOAD DM#32D WITH TEXW,CALL SETT1, AND RETURN
             =1893             ;IF TIMER2 IS USED ,LOAD DM#33D WITH TEXW,CALL SETT2, AND RETURN
             =1894             ;NOTE WHEN TEXW#01 IS EXECUTED P1-6,7 WILL BE SET TO 1,1. THIS
             =1895             ;ENERGIZES THE C. O. RLY AND COMPLETES THE CONNECT OPERATION
             =1896             ;WHEN TEXW#02 IS EXECUTED P1-0,1,2,3 WILL BE SET TO 0FH( THE
             =1897             ;DISCONNECT CODE ). THEN OUT A WILL BE TOGGLED. THIS WILL STROBE
             =1898             ; THE MATRIX BOARD AND TURN THE REED OFF
             =1899             ;THE LOW COUNT LENGTH BYTES ARE STORED IN R2,THE HIGHS IN R3
             =1900             ;THE VAW & GHLW OF THE CONNECT ARE STORED IN DM#41 & 40 RES.
             =1901
             =1902
             =1903             ;SET F0 TO 1 & GET VAW OF THE DISCONNECT.
             =1904
055A 95      =1905 MXDIS:      CPL F0           ;SET F0 TO 1 FOR DISCONNECT
055B FF      =1906             MOV A,R7         ;GET THE GHLW
```

```
055C 0350    =1907            ADD A,#50H      ;FORM LK. TB. ADD.
055E A8      =1908            MOV R0,A        ;PUT   "    INTO R0
055F 80      =1909            MOVX A,@R0      ;GET VAW
0560 AE      =1910            MOV R6,A        ;STORE VAW IN R6
             =1911
             =1912            ;OBTAIN THE 3 BIT ERROR POSITION # FROM THE VAW
             =1913            ;& CREATE NEW STATUS TABLE DATA
             =1914
0561 53F0    =1915            ANL A,#0F0H     ;KILL THE SCAN ADDRESS. A=BIT ERROR POSITION
             =1916                            ;# IN HIGH NIBBLE
0563 47      =1917            SWAP A          ;A= BIT ERROR POSITION # IN LOW NIBBLE
0564 17      =1918            INC A           ;INC FOR FIRST DECREMENT
0565 A9      =1919            MOV R1,A        ;SET UP R1 AS A COUNTER
0566 2380    =1920            MOV A,#80H      ;SET BIT 7=1 FOR ROTATION TO FOLLOW
0568 E7      =1921 BEPLP:     RL A            ;ROTATE LEFT TO FORM NEW DATA WORD
0569 E968    =1922            DJNZ R1,BEPLP   ;LOOP UNTIL DATA BIT IS IN PROPER POSITION
056B A9      =1923            MOV R1,A        ;STORE NEW DATA WORD IN R1
             =1924
             =1925            ;GET THE EXISTING STATUS TABLE DATA
             =1926
056C FE      =1927            MOV A,R6        ;GET THE VAW
056D 5307    =1928            ANL A,#07H      ;KILL BIT ERROR POSITION #. A=SCAN ADDRESS
056F AA      =1929            MOV R2,A        ;STORE SCAN ADDRESS IN R2
0570 FF      =1930            MOV A,R7        ;GET THE GHLW
0571 53F0    =1931            ANL A,#0F0H     ;KILL LK#. A=GR#
0573 77      =1932            RR A            ;SHIFT GR# ONE BIT TO THE RIGHT
0574 DA      =1933            XRL A,R2        ;FORM STA
0575 A8      =1934            MOV R0,A        ;R0=STA
0576 80      =1935            MOVX A,@R0      ;GET STATUS TABLE DATA
             =1936
             =1937            ;UPDATE STATUS TABLE DATA & RESTORE TO DM
             =1938
0577 D9      =1939            XRL A,R1        ;SET THE VERTICAL IN QUESTION TO BUSY
0578 90      =1940            MOVX@R0,A       ;UPDATE STATUS TABLE
             =1941
             =1942            ;CONNECT ENTRY POINT. IS A RLY. OPERATION IN PROGRESS?
             =1943
0579 09      =1944 MXCON:     IN A,P1         ;LOADS A WITH P1
057A 37      =1945            CPL A           ;COMPLIMENTS A
057B 53C0    =1946            ANL A,#0C0H     ;PUTS XX000000 IN A
057D 9679    =1947            JNZ MXCON       ;JUMPS TO MXCON UNTIL TIMER IS AVAILABLE
             =1948
             =1949
             =1950            ;CALL SOCPGM
             =1951
057F B482    =1952            CALL SOCPGM     ;CALL SCAN OUTPUT CONTROL PROGRAM
             =1953
             =1954            ;CONNECT OR DISCONNECT?
             =1955
0581 95      =1956            CPL F0          ;SET F0 TO 0 FOR A DISCONNECT OR TO A 1 FOR
             =1957                            ;A CONNECT.
0582 A484    =1958            JMP EOP         ;JUMP ACROSS END OF PAGE EOP
0584 B68E    =1959 EOP:       JF0 CONCON      ;JUMP TO CONNECT SECTION IF F0=1
             =1960
             =1961            ;SET TEXW FOR DISCONNECT & STORE GHLW OF DISCONNECT IN DM#37
             =1962
0586 B902    =1963            MOV R1,#002H    ;SETS TEXW TO 02 FOR DISCONNECT.
0588 B825    =1964            MOV R0,#37D     ;R0 POINTS TO DM#37
058A FF      =1965            MOV A,R7        ;GET THE GHLW
058B A0      =1966            MOV@R0,A        ;STORE GHLW IN DM#37
058C A4A5    =1967            JMP MXCNT1      ;JUMPS TO TIMER SELECT SECTION
             =1968
             =1969            ;SET TEXW AND INITIATE A REED CLOSURE FOR A CONNECT.
             =1970
058E B901    =1971 CONCON:    MOV R1,#001H    ;SETS TEXW TO 01 FOR CONNECT.
0590 FF      =1972            MOV A,R7        ;GET GHLW
```

```
0591 530F      =1973           ANL A,#0FH      ;KILLS GR #. LEAVES LK#
0593 A8        =1974           MOV R0,A        ;PUTS LK# INTO R0
0594 FA        =1975           MOV A,R2        ;PUTS P1 IN A
0595 53F0      =1976           ANL A,#0F0H     ;PUTS XX010000 IN A
0597 0310      =1977           ADD A,#10H      ;PUTS XX100000 IN A
0599 68        =1978           ADD A,R0        ;PUTS XX10(L#) IN A
059A 39        =1979           OUTL P1,A       ;  "       "   IN P1 WHICH TURNS "A" BOARD ON
               =1980                           ;AND "B" BOARD OFF
059B 99CF      =1981           ANL P1,#0CFH    ;PUTS XX00(L#) IN P1. THIS TURNS "A" BOARD OFF AND
               =1982                           ;"B" BOARD ON. OUT A HAS BEEN TOGGLED. THE REED RLY
               =1983                           ;STARTS TO CLOSE FOR A CONNECT.
               =1984
               =1985
               =1986           ;STORE VAW OF CONNECT IN DM#41
               =1987
059D B829      =1988           MOV R0,#41D     ;GET DM. ADD. OF MOST RECENT CONN. REQUEST
059F FE        =1989           MOV A,R6        ;GET VAW
05A0 A0        =1990           MOV @R0,A       ;STORE VAW IN DM#41
               =1991
               =1992           ;STORE GHLW OF CONN IN DM#40
               =1993
05A1 B828      =1994           MOV R0,#40D     ;LOADS R0 WITH ADD. OF GHLW OF MOST RECENT CONN
05A3 FF        =1995           MOV A,R7        ;GET THE GHLW
05A4 A0        =1996           MOV @R0,A       ;STORE GHLW IN DM#40
               =1997
               =1998           ;FORMAT THE TIMER COUNT LENGTH BYTES AND CALL FTM1
               =1999
05A5 BA00      =2000 MXCNT1:   MOV R2,#00H     ;LOADS R2 WITH THE LOW COUNT LENGTH BYTE(20 MSEC)
               =2001                           ;IN T1'S EXACT FORMAT
05A7 BB80      =2002           MOV R3,#080H    ;LOADS R3 WITH THE HIGH COUNT LENGTH BYTE IN T2'S
               =2003                           ;EXACT FORMAT
05A9 34DA      =2004           CALL FTM1       ;GO TO TIMER FORMAT PROGRAM
05AB 83        =2005 MXEXIT:   RET             ;RETURN
               2006 $INCLUDE(:F1:SOCPGM)
               =2007           ;SOCPGM USES ACC,R0,R2,R6,R7
               =2008           ;THE FOLLOWING VERTICAL ADDRESS WORD(VAW) IS IN R6
               =2009           ;VAW=B7(0),B6,5,4(3 BIT POSITION #),B3(0),B2,1,0(SCAN ADDRESS)
               =2010           ;THE FOLLOWING GROUP HORIZONTAL LINK WORD(GHLW) IS IN R7
               =2011           ;GHLW=B7,6,5,4(GROUP #);B3,2,1,0(HORIZONTAL LINK#)
               =2012           ;IT BEGINS BY GETTING THE P.S.W. FROM THE DM & STORING IT IN R0
               =2013           ;IT NEXT FORMATS P6-1 TO 1 FOR SELECTION OF THE OUTPUT
               =2014           ;SCAN CONTROL GROUP LATCH
               =2015           ;LATCHES THE GROUP # INTO THE OUT GRP SEL DECODER
               =2016           ;FORMAT P1 IN THE FOLLOWING SEQUENCE;SCAN # IN P1-0,1,2;LSB OF
               =2017           ;POSITION # IN P1-3;HIGHER TWO POSITION BITS IN P1-6,7;STROBE
               =2018           ;A/B SCAN BOARD SELECT IN P1-4,5.
               =2019           ;LOAD AND STROBE P1 INTO THE SCAN BOARD
               =2020           ;THE P.S.W. IS TESTED TO DETERMINE IF THE RT OR COT IS BEING USED
               =2021           ;NOTE,WHEN USED IN THE COT, P1 IS FORMATED TO SELECT THE A SCAN BD.
               =2022           ;AND THE PROGRAM IS ENTERED AT "STDATA" IN ORDER TO STORE THE GR#
               =2023           ;AND VAW OF THE OFF HOOK REQUEST IN DM
               =2024
               =2025           ;STORE THE GR# AND VAW IN DM
               =2026
05AC 18        =2027 STDATA:   INC R0          ;R0=35D
05AD FF        =2028           MOV A,R7        ;A=GR# OF OFF HOOK REQUEST
05AE A0        =2029           MOV @R0,A       ;LOAD DM#35D WITH GR# OF OFF HOOK REQUEST
05AF 18        =2030           INC R0          ;R0=36D
05B0 FE        =2031           MOV A,R6        ;A=VAW OF OFF HOOK REQUEST
05B1 A0        =2032           MOV @R0,A       ;LOAD DM#36D WITH VAW OF OFF HOOK REQUEST
               =2033
               =2034           ;PUT THE P S W INTO R0
               =2035
               =2036
05B2 B822      =2037 SOCPGM:   MOV R0,#34D     ;GET ADD. OF P.S.W.
05B4 F0        =2038           MOV A,@R0       ;PUT P.S.W. INTO A
```

```
05B5 A8        =2039           MOV R0,A         ;STORE P.S.W. IN R0
               =2040
               =2041           ;LATCH GR# INTO OUT GRP SEL DECODER
               =2042
05B6 2302      =2043           MOV A,#02        ;PREPARES A FOR P6 FORMATTING
05B8 8E        =2044           ORLD P6,A        ;SETS P6-1 TO 1 WHICH ENABLES THE STROBE ON THE OUT GRP
               =2045                            ;SEL DECODER
05B9 FF        =2046           MOV A,R7         ;LOADS A WITH GHLW
05BA 47        =2047           SWAP A           ;PUTS GR# INTO LOW NIBBLE
05BB 3C        =2048           MOVD P4,A        ;LOADS GR # INTO DECODER
05BC 230D      =2049           MOV A,#0DH       ;PREPARES A FOR P6 FORMATTING
05BE 9E        =2050           ANLD P6,A        ;SETS P6-1 TO 0 WHICH LATCHES GR# INTO DECODER
               =2051
               =2052           ;FORMAT P1 WITH NEW YAW DATA
               =2053
05BF FE        =2054           MOV A,R6         ;LOADS A WITH YAW
05C0 47        =2055           SWAP A           ;LOADS A WITH WAY
05C1 67        =2056           RRC A            ;SAVE LSB IN CARRY
05C2 E7        =2057           RL A             ;SHIFTS LEFT ONE BIT
05C3 E7        =2058           RL A             ;PUTS SCAN # IN UPPER 3 BITS
05C4 67        =2059           RRC A            ;PUTS LSB OF POSITION # NEXT TO SCAN #
05C5 47        =2060           SWAP A           ;PUTS LSB AND SCAN # IN LOW NIBBLE
05C6 530F      =2061           ANL A,#00FH      ;KILLS UPPER NIBBLE
05C8 AA        =2062           MOV R2,A         ;STORES P1 IN R2
05C9 FE        =2063           MOV A,R6         ;PUTS YAW IN A
05CA E7        =2064           RL A             ;PUTS POSITION BITS IN 7,6
05CB 53C0      =2065           ANL A,#0C0H      ;KILLS ALL BUT BITS 7,6
05CD 4A        =2066           ORL A,R2         ;ADDS BITS 7,6 TO P1
               =2067
               =2068           ;TEST PSW FOR RT OR COT
               =2069
05CE 28        =2070           XCH A,R0         ;GET THE P.S.W.
05CF 37        =2071           CPL A            ;SET B6=0 IF RT
05D0 D2DB      =2072           JB6 COTOP        ;B6=1 IF COT
               =2073
               =2074           ;FORMAT P1 FOR SCAN BD "B" OUTPUT SELECT & STROBE ENABLE
               =2075
05D2 28        =2076           XCH A,R0         ;RESTORE A
05D3 0310      =2077           ADD A,#010H      ;FORMATS P1 FOR BOARD "B" OUTPUT SELECT(P1-5=0) AND
               =2078                            ;SO STROBE ENABLE(P1-4=1)
05D5 AA        =2079           MOV R2,A         ;STORES P1 IN R2 FOR FUTURE USE BY MXCON
               =2080
               =2081           ;SELECT AND LATCH SCAN OUTPUT BD
               =2082
05D6 39        =2083 COTCON:   OUTL P1,A        ;AT THE RT THIS LOADS & STROBES P1 INTO THE SCAN B BOARD.
               =2084                            ;THE B BOARD TURNS ON AND EITHER STARTS TURNING THE
               =2085                            ;CO RLY OFF FOR A DISCONNECT OR KEEPS IT OFF FOR A
               =2086                            ;CONNECT. THIS INSTR. ALSO LOADS THE SCAN ADDRESS
               =2087                            ;INTO THE A BOARD BUT DOES NOT TURN IT ON. AT THE COT
               =2088                            ;THIS TURNS THE A SCAN BOARD ON WHICH GROUNDS THE
               =2089                            ;RING LEAD.
05D7 53EF      =2090           ANL A,#0EFH      ;SETS SO STRB BIT OFF P1-4=0
05D9 39        =2091           OUTL P1,A        ;LATCHES SCAN ADDRESS DATA INTO BOTH BOARDS AT THE RT
               =2092                            ;"B" BOARD IS ON AND CO RLY. IS OFF
               =2093                            ;"A" BOARD IS OFF. AT THE COT THIS FINISHES THE LATCHING
               =2094                            ; OF THE SCAN BR.
05DA 83        =2095           RET              ;DONE
05DB 28        =2096 COTOP:    XCH A,R0         ;RESTORES A
05DC 0330      =2097           ADD A,#30H       ;FORMATS P1 FOR SCAN BOARD A SELECT P1-5=1
               =2098                            ;AND SO STRB. ENABLE P1-4=1
05DE A4D6      =2099           JMP COTCON       ;FINISH THE JOB
               =2100 $INCLUDE(:F1:CALSW)
               =2101           ;CALSW CALCULATES THE SCANWORD=(GROUP#)@(SCAN ADDRESS) TO BE USED
               =2102           ;WHEN THE MAIN COT PROGRAM IS ENTERED THE LAST GR.# SCANNED IS
               =2103           ;COMPARED TO THE MIN STORED IN DM#38. IF THEY ARE=, A NEW SCAN WORD IS
               =2104           ;GENERATED USING THE MAX GR#. IF THEY ARE NOT=, THE LAST GR#
```

```
                =2105         ;SCANNED IS DECREMENTED BY 1 AND IT IS USED TO FORM A NEW SCANWORD.
                =2106         ;ONLY A AND R0 ARE USED.
                =2107
                =2108         ;WAS LAST GR# SCANNED= TO MIN GR#?
                =2109
                =2110
85E0 B827       =2111 CALSW: MOV R0,#039D      ;LOAD R0 WITH ADD. OF LAST GR# SCANNED
85E2 F0         =2112         MOV A,@R0        ;LOAD A WITH LAST GROUP # SCANNED
85E3 47         =2113         SWAP A           ;A=(LAST GR# SCANNED)(MIN GR#)
85E4 C8         =2114         DEC R0           ;LOADS R0 WITH ADD. OF MIN/MAX GR#(38)
85E5 D0         =2115         XRL A,@R0        ;COMPARE LST. GR# SCANNED TO MIN
85E6 53F0       =2116         ANL A,#0F0H      ;KILL LOW NIBBLE
85E8 96F3       =2117         JNZ DECGRN       ;TEST FOR LAST GR.#=MIN
                =2118
                =2119         ;GET MAX. GR# AND RELOAD DM#39 WITH MAX GROUP#.
                =2120
85EA F0         =2121         MOV A,@R0        ;GET MIN/MAX GR#
85EB 18         =2122         INC R0           ;LOAD R0 WITH DM#39,THE ADD. OF LAST GR# SCANNED
85EC A0         =2123         MOV@R0,A         ;PUT MIN/MAX GR# IN DM#39
                =2124
                =2125         ;FORMAT NEW SCANWORD
                =2126
85ED 47         =2127 FORSW: SWAP A            ;PUT MAX/MIN GR# IN HIGH NIBBLE
85EE 53F0       =2128         ANL A,#0F0H      ;KILLS LOW NIBBLE
85F0 0307       =2129         ADD A,#007       ;ADD MAX. SCAN ADDRESS TO GR# A=SCANWORD
85F2 83         =2130         RET
                =2131
                =2132         ;REDUCE LAST GR#. SCANNED BY 1
                =2133
85F3 18         =2134 DECGRN: INC R0           ;LOAD R0 WITH DM ADD #39
85F4 F0         =2135         MOV A,@R0        ;GET LAST MIN/MAX GR# SCANNED
85F5 07         =2136         DEC A            ;REDUCE LAST GR# SCANNED BY 1
85F6 A0         =2137         MOV@R0,A         ;UPDATE DM#39 WITH NEW GR# TO BE SCANNED
85F7 A4ED       =2138         JMP FORSW        ;GO FORMAT SCAN WORD
0600            2139          ORG 600H
                2140 $INCLUDE(:F1:XDCOM)
                =2141
                =2142 ;XDCOM IS THE PROGRAM TO ENCODE AND STORE ON THE TRANSMIT STACK
                =2143 ;ALL REGISTES ARE USED AND OR ALTERED BY THIS PROGRAM SEGMENT
                =2144 ;THE DATA AS INPUT IN REGISTERS R5,R6,AND R7 WHEN R5 IS THE 1ST BYTE
                =2145 ;XDCOM 2 IS THE ENTRY POINT FOR ENCODEING THE DISCONNECT DATA INTO 2 BYTES
                =2146 ;       IT ASSUMES R5=44H,R6=GROUPT#,HORIZ#,R7=0
                =2147 ;       R2 IS USED TO HOLD HORIZ. # FOR ENC01
                =2148 ;XDCOM 3 IS THE ENTRY POINT FOR THREE BYTE COMANDS
                =2149 ;       FOR CONNECT R5=OPCODE,R6=VERTICLE # IN LS 6 BITS,R7=GROUP#,HORIZ#
                =2150
0600 530F       =2151 ENCO1: ANL A,#0FH        ;GET HORIZ #
0602 AA         =2152         MOV R2,A         ;SAVE IT IN R2
0603 FE         =2153         MOV A,R6         ;GET GROUP#,HORIZ#
0604 BE0B       =2154         MOV R6,#0BH      ;SETUP R6 AS DATA REG
0606 5310       =2155         ANL A,#10H       ;GET LSB OF GROUP #
0608 E7         =2156         RL A             ;ROTATE IT LEFT
0609 4E         =2157         ORL A,R6         ;ADD IN EITHER 20H OR 0 TO R6
060A AE         =2158         MOV R6,A         ;SAVE IT
060B FA         =2159         MOV A,R2         ;GET HORIZ #
060C 530C       =2160         ANL A,#0CH       ;GET 2 MSB
060E C618       =2161         JZ ENCON1        ;IF 0 THEN HORIZ<4
0610 FE         =2162         MOV A,R6         ;GET INTERMIDIATE RESULTS
0611 0310       =2163         ADD A,#10H       ;INCREMENT TOP NIBBLE
0613 AE         =2164         MOV R6,A         ;SAVE IT
0614 FA         =2165         MOV A,R2         ;GET HORIZ. #
0615 03FB       =2166         ADD A,#0FBH      ;SUBTRACT 5 FROM HORIZ #
0617 AA         =2167         MOV R2,A         ;SAVE IT
0618 FE         =2168 ENCON1: MOV A,R6         ;GET INTERMIDIATE RESULTS
0619 6A         =2169         ADD A,R2         ;ADD HORIZ #
061A AE         =2170         MOV R6,A         ;RESTORE IT
```

```
061B C422          =2171          JMP XDCOM3     ;GO ENCODE AND TRANSMIT THE 2 BYTES
061D FE            =2172 XDCOM2:  MOV A,R6       ;GET HORIZ AND GROUP #
061E F200          =2173          JB7 ENCO1      ;CHECK MSB OF GROUP TO SEE IF ENCODEING REQUIRED
0620 C422          =2174          JMP XDCOM3     ;JUMP ACROSS END OF PAGE
                   =2175 ;------------------------------------------------------------
                   =2176 ;3 BYTE ENCODE AND STORE ROUTINE
0622 B880          =2177 XDCOM3:  MOV R3,#80H    ;SET R3 TO 1ST CARRY BIT POSTION
0624 B9FF          =2178          MOV R1,#0FFH   ;SET R1 FOR XMIT HAMMING MASK
0626 D46D          =2179 XDLOP1:  CALL HMCODE    ;CALL THE HAMMING CODEING SUBROUTINE
0628 FB            =2180          MOV A,R3       ;GET CHECK BIT COUNTER
0629 E7            =2181          RL A           ;UPDATE R3
062A 9230          =2182          JB4 XDLOP2     ;LAST BIT FOUND
062C AA            =2183          MOV R2,A       ;SAVE CHECK BIT COUNT IN R2 FOR DEC. CONVERSION
062D AB            =2184          MOV R3,A       ;SAVE IT
                   =2185          BINDEC R2      ;CONVERT R2 TO DEC.
062E 97            =2186+         CLR C          ;CLEAR CARRY BIT
062F A7            =2187+         CPL C          ;SET CARRY BIT
0630 27            =2188+         CLR A          ;ZERO ACCUM.
0631 F7            =2189+??0004:  RLC A          ;ROTATE ACCUM. LEFT THRU CARRY
0632 EA31          =2190+         DJNZ R2,??0004 ;DEC. AND TEST REG TO SEE IF DONE
0634 AA            =2191          MOV R2,A       ;SAVE IT IN R2
0635 FC            =2192          MOV A,R4       ;SET UP ACCUM FOR PARITY
0636 D480          =2193          CALL PARITY    ;GET PARITY
0638 5A            =2194          ANL A,R2       ;GET PROPER CHECK BIT
0639 4D            =2195          ORL A,R5       ;ADD IN CHECK BIT
063A AD            =2196          MOV R5,A       ;SAVE IT
063B C426          =2197          JMP XDLOP1     ;JMP BACK FOR NEXT CHECK BIT
063D FC            =2198 XDLOP2:  MOV A,R4       ;SETUP FOR PARITY
063E D480          =2199          CALL PARITY    ;DOIT
0640 5380          =2200          ANL A,#80H     ;GET CHECK BIT
0642 4E            =2201          ORL A,R6       ;ADD IT IN
0643 AE            =2202          MOV R6,A       ;RESOTRE IT
0644 FD            =2203 XDCOM1:  MOV A,R5       ;GET OP CODE IN A
0645 D488          =2204          CALL BLNGTH    ;GET NUMBER OF BYTES IN R2
                   =2205
                   =2206 ;------------------------------------------------------------
                   =2207 ;XMIT DATA TRANSFER PROGRAM SEGMENT
                   =2208 ;R0=POINTER TO DATA MEMORY
                   =2209 ;R1=POINT TO R5,R6,R7
                   =2210 ;R2=COUNT OF BYTES TO TRANSFER
                   =2211 ;R3=STATUS WORD AND SCRATCH
0647 15            =2212 XDTRAN:  DIS I          ;DISABLE INTERUPTS
                   =2213 XDTR1:   XSTAUS R0,07H  ;GET XMIT STATUS WORD
0648 B83F          =2214+         MOV R0,#63D    ;SET UP REG AS POINTER TO STATUS WORD
064A F0            =2215+         MOV A,@R0      ;GET IT
064B 5307          =2216+         ANL A,#07H     ;MASK OFF TOP NIBBLE
064D AB            =2217          MOV R3,A       ;SAVE IN R3
064E 6A            =2218          ADD A,R2       ;ADD # TO BE TRAN TO STATUS
                   =2219          LESSTH 06H     ;CHECK TO SEE IF ROOM ENOUGH
064F 37            =2220+         CPL A          ;COMPL. THE ACCUM
0650 17            =2221+         INC A          ;INCREMENT THE ACCUM
0651 0306          =2222+         ADD A,#06H     ;DO THE SUBTRACTION
0653 F658          =2223          JC XDTR2       ;JMP IF ROOM ENOUGH
0655 05            =2224          EN I
0656 C448          =2225          JMP XDTR1      ;LOOPBACK UNTIL THERE IS
0658 B83F          =2226 XDTR2:   MOV R0,#63D    ;SET R0 TO POINT TO STATUS WORD
065A F0            =2227          MOV A,@R0      ;GET STATUS WORD
065B 6A            =2228          ADD A,R2       ;ADD OFFSET TO XMIT STATUS WORD
065C A0            =2229          MOV @R0,A
065D FB            =2230          MOV A,R3       ;RECOVER STATUS WORD
                   =2231          LESSTH 62D     ;CALCULATE ADDRESS TO STACK
065E 37            =2232+         CPL A          ;COMPL. THE ACCUM
065F 17            =2233+         INC A          ;INCREMENT THE ACCUM
0660 033E          =2234+         ADD A,#62D     ;DO THE SUBTRACTION
0662 A8            =2235          MOV R0,A       ;SAVE IN R0
0663 B905          =2236          MOV R1,#05H    ;SET R1 AS POINTER TO REG R5
```

```
0665 F1         =2237 LDTR3:  MOV A,@R1         ;GET 1ST DATA BYTE
0666 A0         =2238         MOV @R0,A         ;STORE IT ON THE STACK
0667 C8         =2239         DEC R0            ;DEC STACK POINTER
0668 19         =2240         INC R1            ;POINT R1 TO NEXT DATA BYTE
0669 EA65       =2241         DJNZ R2,LDTR3     ;CHECK # OF BYTES TO TRANSFER
066B 05         =2242         EN I
066C 83         =2243         RET
                 2244 $INCLUDE(:F1:RXDCOM)
                =2245
                =2246 $ INCLUDE (:F1:HMCODE)
                1=2247 ;HMCODE (HAMMING CODE) SUBROUTINE USES A MASK LOCATED IN PROGRAM MEMORY
                1=2248 ;POINTED TO BY R1-- MUST BE TOP OF MASK ARRAY
                1=2249 ;USES REGS R0,R1,R2,& R4 TO WORK ON DATA IN REGS R5-1ST BYTE,R6=2ND BYTE AND R7
                1=2250 ;THE OUTPUT IS THE MOD 2 SUM OF THE 3 DATA BYTES ANDED WITH THEIR RESP MASKS IN R4
066D 27         1=2251 HMCODE: CLR A           ;ZERO ACCUM
066E AC         1=2252         MOV R4,A        ;ZERO R4
066F B807       1=2253         MOV R0,#07H     ;SET R0 TO POINT TO R7
0671 F9         1=2254 HAMCD1: MOV A,R1        ;GET ADDRESS TO MASK BIT
0672 A3         1=2255         MOVP A,@A       ;GET MASK BYTE
0673 AA         1=2256         MOV R2,A        ;SAVE MASK BYTE IN R2
0674 F0         1=2257         MOV A,@R0       ;GET DATA BYTE
0675 5A         1=2258         ANL A,R2        ;FORM AND OF MASK AND DATA BYTE
0676 DC         1=2259         XRL A,R4        ;ACCUMULATE MOD 2 SUM
0677 AC         1=2260         MOV R4,A        ;SAVE IT IN R4
0678 C8         1=2261         DEC R0          ;DECREMENT R0 TO POINT TO NEXT REGISTER TO BE USED
0679 C9         1=2262         DEC R1          ;DECREMENT R1 TO POINT TO NEXT MASK TO BE USED
067A F8         1=2263         MOV A,R0        ;RECOVER REGISTER POINTER
067B 5303       1=2264         ANL A,#03H      ;CHECK LS 2 BITS
067D 9671       1=2265         JNZ HAMCD1      ;IF NOT 0 THE LOOP BACK TO DO ALL OF THE DATA WORDS
067F 83         1=2266         RET
                =2267 $ INCLUDE(:F1:PARITY)
                1=2268
                1=2269 ;SUBROUTINE TO CHECK PARITY OF DATA IN A
                1=2270 ;USES R4 AS SCRATCH REGISTER--OUTPUT IN A AS EITHER FFH OR 00H
                1=2271
0680 AC         1=2272 PARITY: MOV R4,A        ;SAVE DATA IN R4
0681 47         1=2273         SWAP A          ;SWAP NIBBLES
0682 DC         1=2274         XRL A,R4        ;ACCUMULATE FIRST SUM
0683 AC         1=2275         MOV R4,A        ;SAVE
0684 E7         1=2276         RL A
0685 E7         1=2277         RL A
0686 DC         1=2278         XRL A,R4        ;ACCUM. 2ND SUM
0687 AC         1=2279         MOV R4,A        ;SAVE
0688 E7         1=2280         RL A
0689 DC         1=2281         XRL A,R4        ;ACCUM. 3RD SUM IN A
068A 83         1=2282         RET
                =2283 $ INCLUDE(:F1:BLNGTH)
                1=2284 ;BLNGTH (BYTE LENGTH IS A SUBROUTINE TO DECODE THE OPCODES INTO THEIR LENGTH
                1=2285 ;INPUT IS IN THE ACUM. WHICH MUST BE THE OPCODE
                1=2286 ;THE OUPUT IS IN R2 AS A BINARY NUMBER IN THE RANGE OF 1 TO 3.
                1=2287 ;THE ACUM AND R2 ARE USED
068B AA         1=2288 BLNGTH: MOV R2,A        ;SAVE INPUT DATA IN R2
068C 5344       1=2289         ANL A,#44H      ;CHECK FOR SINGLE BYTE OPCODE
068E 9693       1=2290         JNZ BLNG2       ;JMP TO CHECK FOR 2 BYTE OPCODES IF <>0
0690 BA01       1=2291         MOV R2,#01H     ;STORE RESULTS IN R2
0692 83         1=2292         RET
0693 2330       1=2293 BLNG2:  MOV A,#30H      ;SET UP MASK FOR DISCONNECT OPCODES (2)
0695 5A         1=2294         ANL A,R2        ;CHECK INPUT AGAINST MASK
0696 969B       1=2295         JNZ BLNG3       ;JMP TO SET UP 3 IF <>0
0698 BA02       1=2296         MOV R2,#02H     ;SET UP 2 BYTE IN R2
069A 83         1=2297         RET
069B BA03       1=2298 BLNG3:  MOV R2,#03H     ;SET R2 TO INDICATE 3 BYTE OPCODE FOUND
069D 83         1=2299         RET
                =2300
06E2            =2301         ORG 6E2H
06E2 00         =2302         DB 00H,80H,0FFH
```

```
06E3 80      =
06E4 FF      =
06E5 80      =2303      DB 80H,7FH,80H
06E6 7F      =
06E7 80      =
06E8 78      =2304      DB 78H,78H,78H
06E9 78      =
06EA 78      =
06EB 66      =2305      DB 66H,66H,66H
06EC 66      =
06ED 66      =
06EE 55      =2306      DB 55H,55H,55H
06EF 55      =
06F0 55      =
06F1 00      =2307      DB 00H,00H,0FFH ;START OF XMIT HAMMING MASK
06F2 00      =
06F3 FF      =
06F4 00      =2308      DB 00H,7FH,80H
06F5 7F      =
06F6 80      =
06F7 78      =2309      DB 78H,78H,78H
06F8 78      =
06F9 78      =
06FA 64      =2310      DB 64H,66H,66H
06FB 66      =
06FC 66      =
06FD 54      =2311      DB 54H,55H,55H
06FE 55      =
06FF 55      =
             =2312 ;--------------------------------------------
             =2313
             =2314 ;BRANCH TABLE TO THE JMP TABLE FOR THE DECODE OF THE SINGLE AND MULTIPLE OPCODES
V 0700 7E    =2315 SBBTBL: DB BTABL1,BTABL1+2H,BTABL1+4H,BTABL1+5H
  0701 80    =
  0702 82    =
  0703 83    =
  ( 0)
V 0704 89    =2316 MBBTBL: DB BTABL2,BTABL2+2H,BTABL2+4H,BTABL2+6H
  0705 8B    =
  0706 8D    =
  0707 8F    =
 (2315)
             =2317
             =2318
             =2319 ;--------------------------------------------
             =2320
             =2321 ;RXDECOM (RECEIVE DATA COMM.) EVAULATES THE RECEIVE STACK STATUS WORD
             =2322 ;AND IF A RECEVIE WORD EXISTS ON THE RECEIVE STACK IT TRANSFERS IT
             =2323 ;TO REGISTERS R5,R6 AND R7 WHERE R5=1ST BYTE. THE DATA IS THEN DECODED
             =2324 ;,ERROR CORRECTED, AND DECODED TO INITIATE THE REQUIRED ACTION PROGRAMS.
             =2325 ;ALL REGISTERS IN THE MAIN BANK ARE USED AND OR ALTERED
             =2326 ;SUBROUTINES CALLED-PARITY,HMCODE,
             =2327
0708 15      =2328 RXDCOM: DIS I
             =2329         RSTAUS R0,0FH    ;GET RECEIVE STATUS WORD
0709 B83F    =2330+        MOV R0,#63D      ;SETUP REG AS POINTER TO STATUS WORD
070B F0      =2331+        MOV A,@R0        ;GET IT
070C 47      =2332+        SWAP A           ;GET REC NIBBLE IN LOWEST POSITION
070D 530F    =2333+        ANL A,#0FH       ;MASK IT
070F C6C1    =2334         JZ RXDME         ;IF NO DATA EXIT
0711 AB      =2335         MOV R3,A         ;SAVE STATUS IN R3
0712 37      =2336         CPL A            ;COMPLEMENT THE ACCUM
0713 033A    =2337         ADD A,#58D       ;FORM POINTER TO REC. STACK DATA
0715 A9      =2338         MOV R1,A         ;SAVE STACK POINTER IN R1
0716 F1      =2339         MOV A,@R1        ;GET OPCODE BYTE
0717 D488    =2340         CALL BLNGTH      ;CALCULATE # OF BYTE AND SAVE IN R2
             =2341         SUBREG R3,R2     ;CALCULATE R3-R2
```

```
0719 97       =2342+          CLR C
071A FA       =2343+          MOV A,R2         ;GET CONTENTS OF REG2
071B 37       =2344+          CPL A            ;COMPL. REG2
071C 17       =2345+          INC A            ;INCREMENT THE ACCUM
071D 6B       =2346+          ADD A,R3         ;COMPLETE SUBTRACTION
071E E6C1     =2347           JNC RXDNE        ;EXIT IF ALL OF THE DATA IS NOT AVAILABLE
0720 47       =2348           SWAP A           ;A CONTAINS # OF BYTE LEFT IN STACK IN MS NIBBLE
0721 AB       =2349           MOV R3,A         ;STORE IN R3 FOR STATUS UPDATE
0722 F0       =2350           MOV A,@R0        ;GET STATUS WORD
              =2351 ;--------UPDATE RX STATUS WORD------------
0723 530F     =2352           ANL A,#0FH       ;SAVE XMIT STATUS
0725 6B       =2353           ADD A,R3         ;ADD IN R3
0726 A0       =2354           MOV @R0,A        ;RESTORE IT
              =2355 ;--------POINT TO GET DATA FROM STACK AND SAVE IN R5--R7-------
0727 27       =2356           CLR A            ;ZERO ACCUM
0728 AF       =2357           MOV R7,A         ;ZERO R7
0729 AE       =2358           MOV R6,A         ;ZERO R6
072A B805     =2359           MOV R0,#05H      ;SET UP R0 AS REGISTER POINTER
072C F1       =2360 RXDLP1:   MOV A,@R1        ;GET STACK CONTENTS
072D A0       =2361           MOV @R0,A        ;SAVE IN REGISTER
072E 19       =2362           INC R1           ;UPDATE R1
072F 18       =2363           INC R0           ;UPDATE R0
0730 EA2C     =2364           DJNZ R2,RXDLP1   ;LOOP UNTIL R2=0
0732 05       =2365           EN I
              =2366 ;--------START OF RECEIVE HAMMING CODE PROGRAM------
0733 BBF8     =2367 RXHAM:    MOV R3,#0F8H     ;SET R3 AS A COUNTER AND REG TO HOLD CHECK BITS
0735 B9F0     =2368           MOV R1,#0F0H     ;SET R1 AS POINTER TO RECEVIE HAMMING MASKS
0737 D46D     =2369 RXDLP2:   CALL HMCODE      ;FORM MASKED SUM
0739 FC       =2370           MOV A,R4         ;SET UP FOR PARITY
073A D480     =2371           CALL PARITY      ;GET PARITY
073C 67       =2372           RRC A            ;SAVE PARITY (CHECK BIT) IN CARRY BIT
073D FB       =2373           MOV A,R3         ;GET R3
073E F7       =2374           RLC A            ;ADD IN CHECK BIT
073F AB       =2375           MOV R3,A         ;SAVE IN R3
0740 F237     =2376           JB7 RXDLP2       ;LOOP BACK UNTIL HAVE ALL FIVE CHECK BITS
0742 C66A     =2377           JZ RXDECD        ;IF ZERO GO TO DECODE AREA
              =2378 ;--------R3 CONTAINS CHECK BITS IN 000C1...C5 ORDER-----
              =2379           BYTREV R3,R2,5   ;REVERSE 5 BITS USING R3 AS DESTINATION AND R2 AS CNTR
0744 BA05     =2380+          MOV R2,#5        ;SET UP COUNTER
0746 BB00     =2381+          MOV R3,#00H      ;ZERO REG1
0748 67       =2382+MLP1:     RRC A            ;GET LSB OF INPUT IN A AND SAVE IN CARRY BIT
0749 2B       =2383+          XCH A,R3         ;XCHANGE ACCUM AND REG1
074A F7       =2384+          RLC A            ;ADD IN LSB
074B 2B       =2385+          XCH A,R3         ;GO BACK TO INPUT
074C EA48     =2386+          DJNZ R2,MLP1     ;LOOP UNTIL DONE
              =2387 ;--------R3 NOW CONTAINS CHECK BITS IN 000C5....C1 ORDER
              =2388 ;--------TIME TO FIX BAD BIT----
              =2389 ;FIRST CHECK FOR C5,C4=11
074E FB       =2390           MOV A,R3         ;GET CHECK BITS
074F 5318     =2391           ANL A,#18H       ;SAVE C5 AND C4
0751 E7       =2392           RL A             ;GET IN LSBITS OF MS NIBBLE
0752 A9       =2393           MOV R1,A         ;SAVE IN R1
0753 D330     =2394           XRL A,#30H       ;CHECK FOR 3--INVALID CODE
0755 C6C2     =2395           JZ REXMIT        ;IF =3 THEN ASK FOR RETRANSMIT
0757 FB       =2396           MOV A,R3         ;GET CHECK BITS
0758 5307     =2397           ANL A,#07H       ;GET C3...C1
075A AB       =2398           MOV R3,A         ;SAVE LAST THREE BITS IN R3
              =2399           BINDEC R3        ;CONVERT TO DECIMEL
075B 97       =2400+          CLR C            ;CLEAR CARRY BIT
075C A7       =2401+          CPL C            ;SET CARRY BIT
075D 27       =2402+          CLR A            ;ZERO ACCUM.
075E F7       =2403+??0005:   RLC A            ;ROTATE ACCUM. LEFT THRU CARRY
075F EB5E     =2404+          DJNZ R3,??0005   ;DEC. AND TEST REG TO SEE IF DONE
0761 AB       =2405           MOV R3,A         ;SAVE IN R3
0762 2350     =2406           MOV A,#50H       ;SET A TO REG 5 IN UPPER NIBBLE
0764 69       =2407           ADD A,R1         ;FORM REGISTER POINTER
```

```
0765 47         =2408            SWAP A
0766 A9         =2409            MOV R1,A        ;SAVE RESISTER POINTER IN R1
0767 F1         =2410            MOV A,@R1       ;GET THE CONTENTS
0768 DB         =2411            XRL A,R3        ;CORRECT THE BAD BIT
0769 A1         =2412            MOV @R1,A       ;RESTORE IT
                =2413 ;--------AT THIS POINT CORRECTED DATA IS IN R5-R7--POINT TO START DECODE
076A FE         =2414 RXDECD:    MOV A,R6        ;GET SECOND BYTE OF DATA
076B 537F       =2415            ANL A,#7FH      ;GET RID OF CHECK BIT
076D AE         =2416            MOV R6,A        ;RESTORE DATA
076E FD         =2417            MOV A,R5        ;GET THE OPCODE IN R5
076F D488       =2418            CALL BLNGTH     ;GET THE LENGTH IN R2
0771 FD         =2419            MOV A,R5        ;GET OP CODE
0772 5330       =2420            ANL A,#30H      ;SAVE JUST OPCODE BITS
0774 47         =2421            SWAP A          ;PUT IN LS 2 BITS
0775 AD         =2422            MOV R5,A        ;SAVE IN R5
0776 FA         =2423            MOV A,R2        ;GET LENGTH
0777 07         =2424            DEC A           ;GET LENGTH IN 0-2
0778 9685       =2425            JNZ MULTOP      ;JMP TO MULTIBYTE OPCODE DECODE IS <>0
                =2426 ;CALCULATE OFFSET --------
077A FD         =2427            MOV A,R5        ;GET OPCODE
V 077B 0300     =2428            ADD A,#SBBTBL   ;FORM TABLE ADDRESS FOR SINGLE BYTE OPCODES
(2316)
077D B3         =2429            JMPP @A         ;JMP TO TABLE JMP POINT
077E E4C4       =2430 BTABL1:    JMP CLROHR      ;JMP TO CLEAR OFFHOOK REQUEST
0780 E4C5       =2431            JMP INSTRT      ;JMP TO START OF SYNC INITILIZATION
0782 93         =2432            RET             ;RETURN IF SYNC MESSAGE
0783 E4C2       =2433            JMP REXMIT      ;JMP TO RETRANSMIT LAST MESSAGE
                =2434 ;---START OF MULTIBYTE DECODE--------
0785 FD         =2435 MULTOP:    MOV A,R5        ;GET OPCODE
V 0786 0304     =2436            ADD A,#MBBTBL   ;FORM BRANCH TABLE ADDRESS
(2428)
0788 B3         =2437            JMPP @A         ;JMP TO BRANCH TABLE
0789 E49B       =2438 BTABL2:    JMP DISCON      ;GO TO DISCONNECT PGM
078B E4C3       =2439            JMP RALARM      ;JMP TO ALARM PGM
078D E491       =2440            JMP OHCONR      ;JMP  TO OFFHOOK OR CONNECT REQUEST PGMS
078F E4C6       =2441            JMP LTVER       ;JMP TO LINK TABLE VERIFY
0791 B822       =2442 OHCONR:    MOV R0,#34D     ;FORM POINTER TO STATUS WORD
0793 F0         =2443            MOV A,@R0       ;GET IT
0794 85         =2444            CLR F0  ;CLEAR F0 FLAG BIT
0795 D299       =2445            JB6 TEMP        ;IF RT THEN JMP TO CONNECT REQUEST
0797 A4AC       =2446            JMP STDATA      ;JMP TO OFF HOOK REQUEST PGM
0799 A479       =2447 TEMP:      JMP RXCON       ;DO IT
                =2448
                =2449 $INCLUDE(:F1:DISCON)
                1=2450 ;DISCON IS A PROGRAM SEGMENT TO DECODE THE 2 BYTE COMPACT FORM OF THE
                1=2451 ;DISCONNECT CMD INTO THE STANDARD GROUP/HORIZ. LINK WORD
                1=2452 ;R6 CONTAINS THE INPUT--- AND OUTPUT
                1=2453
079B FE         1=2454 DISCON:   MOV A,R6        ;GET DATA
079C AF         1=2455            MOV R7,A       ;STORE THE DATA IN R7 FOR USE BY MXDIS
079D 530F       1=2456            ANL A,#0FH     ;GET HORIZ #
079F 03F6       1=2457            ADD A,#0F6H    ;CHECK TO SEE IF HORIZ >9
07A1 E6BE       1=2458            JNC RXCON4     ;USE AS IS IF HORIZ# <9
07A3 2308       1=2459            MOV A,#08H     ;SETUP OFFSET
                1=2460            SUBAR R6       ;SUBTRACT 08H FROM R6
07A5 97         1=2461+           CLR C          ;CLEAR CARRY
07A6 37         1=2462+           CPL A          ;COMPL. ACCUM
07A7 6E         1=2463+           ADD A,R6       ;DO IT
07A8 0301       1=2464+           ADD A,#01H     ;COMPLETE 2'S COMPLEMENT SUBTRACTION
07AA AA         1=2465            MOV R2,A       ;SAVE IN R2
07AB 37         1=2466            CPL A          ;COMPLEMENT A
07AC 92B1       1=2467            JB4 RXCON1     ;CKECK LSB OF MSNIBBLE=0
07AE 03FA       1=2468            ADD A,#0FAH    ;ADD (NOT 5) TO A
07B0 17         1=2469            INC A          ;INC TO MAKE =TO 4+HORIZ #
07B1 B2B7       1=2470 RXCON1:   JB5 RXCON2      ;CHECK NEXT BIT IN MSNIBBLE
07B3 BE90       1=2471            MOV R6,#90H    ;SET UP GROUP # TO 9
07B5 E4B9       1=2472            JMP RXCON3     ;GOON
```

```
07B7 BE88    1=2473 RXCON2: MOV R6,#80H    ;SETUP GROUP # TO 8
07B9 37      1=2474 RXCON3: CPL A          ;RESOTRE A TO PROPER POLARITY
07BA 530F    1=2475         ANL A,#0FH     ;SAVE HORIZ #
07BC 6E      1=2476         ADD A,R6       ;ADD IN GROUP #
07BD AE      1=2477         MOV R6,A       ;RESOTORE IT
07BE 85      1=2478 RXCON4: CLR F0         ;SET F0=0 FOR PROPER ENTRY INTO HXDIS
07BF A45A    1=2479         JMP HXDIS      ;GO TO DISCONNECT PGM
07C1 05      =2480 RXDME:  EN I
07C2 00      =2481 REXMIT: NOP
07C3 00      =2482 RALARM: NOP
07C4 00      =2483 CLROHR: NOP
07C5 00      =2484 INSTRT: NOP
07C6 00      =2485 LTVER:  NOP
07C7 83      =2486         RET
             =2487
             2488          END
```

USER SYMBOLS

```
ALR1   0256  ALRDR  025E  AMPDLY 01A5  BEGIN  0089  BEGIN1 008D  BEPLP  0568  BINDEC 0006  BIT7   0248
BLNG2  0693  BLNG3  0698  BLNGTH 068B  BTBBL0 0074  BTABL1 077E  BTABL2 0789  BTPOIZ 00F4  BYTREV 000C
CALSW  05E0  CE0    051A  CLDM   0258  CLROHR 07C4  CLRRA1 00C7  CLRRAM 00C4  CONCON 058E  CONNIR 01EE
CONVEC 0227  CONVER 0209  CORCL  0260  CORCL1 0279  COSRT  028D  COTCON 05D6  COTOP  05DB  CVAW   0300
CVDLY  023B  DCPCOT 0295  DCPRT  0408  DEBC01 04DB  DEBC02 0537  DEBEX  0533  DEBOU  04C8  DEBOUP 0404
DEBRET 0508  DECGRN 05F3  DECSTW 04F4  DISCOI 01FA  DISCON 079B  DNZRO  008C  ENC01  0600  ENCON1 0618
EOP    0584  EW0    02D0  FORSW  05ED  FTM1   01DA  FTM2   01E4  GHLRUT 0548  GHRT1  054F  GHRT2  0553
GOTORD 038F  GOTOXD 038D  GRPTST 0166  GRTST  0113  HAMCD1 0671  HDOFE0 0535  HMCODE 066D  HOZWID 027E
HSCNT1 02D2  HSCONN 02CE  HZBY   043A  HZCON  043C  HZDEB  04F8  IFRYIZ 0102  IFRYLP 010B  IFRYRL 011B
IMBRTB 006E  INLKAD 0525  INLOP1 004C  INLOP3 005A  INSTRT 07C5  INSYNC 0145  INTLP2 002A  INTRPT 0032
IZCON  0173  LDTR3  0665  LESSTH 0008  LKHI   021E  LKTB   024A  LKTBDA 0520  LKTC   024B  LTVER  07C6
LVVEDB 04F0  MBBTBL 0704  MLP1   0748  MULTOP 0785  MXCNT1 05A5  MXCON  0579  MXDIS  055A  MXEXIT 05AB
OHCONR 0791  OHEDIS 0530  PARITY 0680  RALARM 07C3  RCDCON 0461  RCDCRT 04C4  RDGRN  0096  RDSTAT 0140
RELRLY 00E0  RESCAN 019A  REXMIT 07C2  RGGRRL 0281  RRIZ   00D0  RRIZLP 00DB  RROG   031C  RSTAUS 0004
RTEND  017A  RTSRT  0400  RURTS  003E  RXCON1 07B1  RXCON2 07B7  RXCON3 07B9  RXCON4 07BE  RXDCOM 0708
RXDECD 076A  RXDLP1 072C  RXDLP2 0737  RXDME  07C1  RXHMM  0733  SBBTBL 0700  SC2DLY 0482  SCADIZ 00EB
SCAGR1 0322  SCANAG 0463  SCANS  0185  SCEXT  01B8  SCNRT  0293  SETB20 04BE  SETT1  01B9  SETT2  01C5
SEVEN  0007  SINHO  02A7  SINHOR 041E  SOCPGM 05B2  STDATA 05AC  STIZ   0158  STIZLP 015B  STKSYN 0150
STOTMR 032E  SUBAR  000A  SUBRA  000B  SUBREG 0009  SYNCON 00FC  SYNIZ  0121  T1IU   04EB  T1RST  0337
T2INT  006C  T2RST  033C  TEMP   0799  TERCON 038B  TERM1  0393  TERM2  03A2  TJMPBR 0082  TMIREX 0013
TSOSE  037C  TSTP1  00E2  TXOUT  0015  UPHRS  02AA  UPHRST 0423  USARTS 0035  VAWC   0000  VCONT  049E
VIDLE  04BC  VRECON 0285  VROUT  0447  VSCNT1 034A  VSCONN 0316  VSDIS  02F1  VSROUT 02EB  X1     04F2
XDCOM1 0644  XDCOM2 061D  XDCOM3 0622  XDLOP1 0626  XDLOP2 063D  XDTR1  0648  XDTR2  0658  XDTRAN 0647
XMDA   0021  XSTAUS 0003
```

What is claimed is:

1. Remote switching apparatus for use with central office equipment of a type connecting any selected one of a plurality of local subscriber lines to a selected one of a lesser number of line-links through crossbar switch means in response to a reference voltage applied to the subscriber line, comprising: a remote terminal including matrix switching means for connecting any one of a plurality of remote subscriber lines at the remote terminal to a lesser number of line pairs extending from the remote terminal to the central office; a central office terminal including means responsive to an address for applying a reference voltage to one of the terminals of said local subscriber lines selected by the address for initiating a connection through one of said line-links at the central office equipment, switch means at the central office terminal for connecting one of said line pairs directly to the selected line-link in the central office equipment; means transferring a remote subscriber phone address from the remote terminal to the central office terminal identifying a particular one of a plurality of remote subscriber lines; means at the central office terminal responsive to the address from the remote terminal for activating said means for applying a reference voltage to a selected one of the terminals of the local subscriber lines to cause said central office equipment to select one of said line-links; means transferring a line-link address from the central office terminal to the remote terminal identifying the selected line-link and connected line pair; and means at the remote terminal responsive to the remote subscriber phone address and line-link address for operating said matrix switch to complete a connection between the connected line pair and the remote subscriber phone.

2. Apparatus of claim 1 further including means transferring an address from the central office terminal to the remote terminal identifying the selected terminal of the local subscriber lines; and means at the remote terminal responsive to the local subscriber terminal address and the line-link address from the central office terminal for operating said matrix switch to complete a connection between the line pair associated with the received line-link address and the remote subscriber phone identified by the received local subscriber terminal address.

3. Apparatus of claim 1 further including means at the remote terminal sensing current flow in any of said line pairs to the central office, means responsive to interruption of said line current when a call is terminated for disconnecting the matrix switch connection between the remote subscriber phone and the line pair.

4. Apparatus of claim 3 further comprising means transferring an address of the disconnected line pair to the central office terminal, means at the central office terminal responsive to said address for disconnecting the line pair from the line-link in the crossbar switching equipment.

5. Apparatus of claim 1 further including means sensing when a line-link is disconnected by the crossbar switching equipment, and means responsive to said sensing means for disconnecting the line pair from the associated line-link.

6. Apparatus of claim 5 further including means transferring the address of the disconnected line pair to the remote terminal, and means at the remote terminal responsive to the received address for disconnecting the matrix switch connected between the addressed line pair and the remote subscriber phone.

7. Apparatus for providing remote switching of a plurality of subscriber telephone lines at a remote location to a limited number of line pairs less than the number of subscriber lines extending to and connected through a central office automatic switching system of a type having a crossbar concentrator switch for connecting a group of vertical three-conductor lines to a smaller number of horizontal three-conductor lines selectively at each crosspoint, the three conductors of each vertical and horizontal line of the crossbar switch being designated as the tip, ring, and sleeve conductors, said apparatus comprising: a central office terminal including a first processing unit, a first scanner means controlled by the processing unit for scanning the voltage level status on the sleeve conductors of the horizontal crossbar lines and the sleeve conductors of the vertical crossbar lines and storing the status in the processing unit, means controlled by the first processing unit for selectively connecting the ring conductor of any of the vertical crossbar lines to a reference voltage to initiate a connection between the associated vertical crossbar line and one of the horizontal crossbar lines by the central office switching system, and interface switching means controlled by the processing unit for selectively connecting any of said line pairs to associated one of said tip and ring conductors of said horizontal crossbar lines, a remote switching terminal including a second processing unit, matrix switch means having a plurality of matrix crosspoint switches for selectively connecting any one of said line pairs to any one of said subscriber telephone lines, off-hook sensor means associated with each subscriber phone generating a signal indicating if the phone is off-hook, current sensing means for sensing current flow in any of the line pairs between the central office and remote terminals, second scanner means controlled by the second processor unit for scanning the off-hook sensor means and the current sensing means and storing the off-hook status and line current status in the second processing unit, means controlled by the second processor unit for activating selectively any of the crosspoint switches of the matrix switch to complete or interrupt a connection between a subscriber phone and a line pair to the central office terminal; and data transfer means for transferring addresses of crosspoint connections between the two terminals.

8. Apparatus of claim 7 further including means responsive to a change of a subscriber phone to an off-hook status at the remote location for transmitting the identification of the subscriber phone in electrically coded form to the processing unit of the central office terminal, the processing unit in the central office selectively connecting the ring conductor of a corresponding crossbar line to said reference voltage to activate the central office switching system to complete a connection to a selected one of the horizontal lines of the crossbar switch.

9. Apparatus of claim 8 further including means at the central office terminal for transmitting the identification of the horizontal line selected by the central office switching system to the remote terminal, the processing unit in the remote terminal selectively connecting the remote subscriber phone to the line pair associated with the identified horizontal line through the matrix switch.

10. Apparatus of claim 9 further including means responsive to an interruption of line current in a line pair connected to a subscriber phone at the remote terminal for breaking the connection through the matrix switch.

* * * * *

6

3. Apparatus of claim 1 further including means at the remote terminal sensing current flow in any of said line pairs to the central office, means responsive to interruption of said line current when a call is terminated for disconnecting the matrix switch connection between the remote subscriber phone and the line pair.

4. Apparatus of claim 3 further comprising means transferring an address of the disconnected line pair to the central office terminal, means at the central office terminal responsive to said address for disconnecting the line pair from the line-link in the crossbar switching equipment.

5. Apparatus of claim 1 further including means sensing when a line-link is disconnected by the crossbar switching equipment, and means responsive to said sensing means for disconnecting the line pair from the associated line-link.

6. Apparatus of claim 5 further including means transferring the address of the disconnected line pair to the remote terminal, and means at the remote terminal responsive to the received address for disconnecting the matrix switch connected between the addressed line pair and the remote subscriber phone.

7. Apparatus for providing remote switching of a plurality of subscriber telephone lines at a remote location to a limited number of line pairs less than the number of subscriber lines extending to and connected through a central office automatic switching system of a type having a crossbar concentrator switch for connecting a group of vertical three-conductor lines to a smaller number of horizontal three-conductor lines selectively at each crosspoint, the three conductors of each vertical and horizontal line of the crossbar switch being designated as the tip, ring, and sleeve conductors, said apparatus comprising: a central office terminal including a first processing unit, a first scanner means controlled by the processing unit for scanning the voltage level status on the sleeve conductors of the horizontal crossbar lines and the sleeve conductors of the vertical crossbar lines and storing the status in the processing unit, means controlled by the first processing unit for selectively connecting the ring conductor of any of the vertical crossbar lines to a reference voltage to initiate a connection between the associated vertical crossbar line and one of the horizontal crossbar lines by the central office switching system, and interface switching means controlled by the processing unit for selectively connecting any of said line pairs to associated one of said tip and ring conductors of said horizontal crossbar lines, a remote switching terminal including a second processing unit, matrix switch means having a plurality of matrix crosspoint switches for selectively connecting any one of said line pairs to any one of said subscriber telephone lines, off-hook sensor means associated with each subscriber phone generating a signal indicating if the phone is off-hook, current sensing means for sensing current flow in any of the line pairs between the central office and remote terminals, second scanner means controlled by the second processor unit for scanning the off-hook sensor means and the current sensing means and storing the off-hook status and line current status in the second processing unit, means controlled by the second processor unit for activating selectively any of the crosspoint switches of the matrix switch to complete or interrupt a connection between a subscriber phone and a line pair to the central office terminal; and data transfer means for transferring addresses of crosspoint connections between the two terminals.

8. Apparatus of claim 7 further including means responsive to a change of a subscriber phone to an off-hook status at the remote location for transmitting the identification of the subscriber phone in electrically coded form to the processing unit of the central office terminal, the processing unit in the central office selectively connecting the ring conductor of a corresponding crossbar line to said reference voltage to activate the central office switching system to complete a connection to a selected one of the horizontal lines of the crossbar switch.

9. Apparatus of claim 8 further including means at the central office terminal for transmitting the identification of the horizontal line selected by the central office switching system to the remote terminal, the processing unit in the remote terminal selectively connecting the remote subscriber phone to the line pair associated with the identified horizontal line through the matrix switch.

10. Apparatus of claim 9 further including means responsive to an interruption of line current in a line pair connected to a subscriber phone at the remote terminal for breaking the connection through the matrix switch.

* * * * *

UNITED STATES PATENT AND TRADEMARK OFFICE
CERTIFICATE OF CORRECTION

PATENT NO. : 4,258,231
DATED : March 24, 1981
INVENTOR(S) : Vernon C. Lenz et al It is certified that error appears in the above-identified patent and that said Letters Patent are hereby corrected as shown below:

Column 1, line 45, "line" should be -- link --.

Column 2, line 5, "switcing" should be -- switching --.

Column 5, line 56, "of" first occurrence should be -- on --.

Column 8, line 15, "and" should be -- an --.

Column 9, line 62, "relay" should be -- relays --.

Column 94, line 2, claim 7, "one" should be -- ones --.

Signed and Sealed this

Eleventh Day of August 1981

[SEAL]

Attest:

Attesting Officer

GERALD J. MOSSINGHOFF

Commissioner of Patents and Trademarks